(12) United States Patent
Xu

(10) Patent No.: US 11,567,637 B2
(45) Date of Patent: Jan. 31, 2023

(54) DISPLAY CONTROL METHOD AND DEVICE

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/041,885

(22) PCT Filed: Mar. 29, 2019

(86) PCT No.: PCT/CN2019/080286
§ 371 (c)(1),
(2) Date: Sep. 25, 2020

(87) PCT Pub. No.: WO2019/185003
PCT Pub. Date: Oct. 3, 2019

(65) Prior Publication Data
US 2021/0132758 A1    May 6, 2021

(30) Foreign Application Priority Data

Mar. 30, 2018    (CN) .......................... 201810277465.X

(51) Int. Cl.
G06F 3/0484    (2022.01)
G06F 3/01      (2006.01)
G06F 3/0488    (2022.01)
G06F 3/16      (2006.01)
G06F 21/84     (2013.01)

(52) U.S. Cl.
CPC ............ G06F 3/0484 (2013.01); G06F 3/012 (2013.01); G06F 3/0488 (2013.01); G06F 3/167 (2013.01); G06F 21/84 (2013.01)

(58) Field of Classification Search
CPC ...... G06F 3/0484; G06F 3/012; G06F 3/0488; G06F 3/167; G06F 21/84; G06F 21/32; G06F 3/04842; G06F 3/04847
See application file for complete search history.

(56) References Cited

U.S. PATENT DOCUMENTS

| 8,396,265    B1 * | 3/2013 | Ross ...................... G06V 40/40 |
| | | 382/103 |
| 2013/0174094 A1 * | 7/2013 | Heo ..................... G06F 3/04883 |
| | | 715/835 |
| 2013/0185788 A1 | 7/2013 | Picard |

FOREIGN PATENT DOCUMENTS

| CN | 104298434 A | 1/2015 |
| CN | 104932824 A | 9/2015 |
| CN | 104978109 A | 10/2015 |

(Continued)

Primary Examiner — Andrey Belousov
(74) Attorney, Agent, or Firm — Conley Rose, P.C.

(57) ABSTRACT

Embodiments of this application provide a screen display method and a device after face unlock, and relate to the field of electronic device technologies, so that a lock screen and a desktop can be intuitively displayed after face unlock, to improve interaction efficiency and user experience. Specific solutions are as follows: After head information is successfully verified, an electronic device displays a lock screen and a desktop in a superimposition manner, and when a preset condition is met, displays the desktop or a screen corresponding to a control on the desktop or the lock screen. The embodiments of this application are used to display an unlocked screen.

20 Claims, 120 Drawing Sheets

(56) References Cited

FOREIGN PATENT DOCUMENTS

| CN | 105094679 A | 11/2015 |
| CN | 107450806 A | 12/2017 |

* cited by examiner

CONT. FROM FIG. 12(a)

TO FIG. 12(c)

CONT. FROM FIG. 13(a)

TO FIG. 13(c)

CONT. FROM FIG. 13(b)

CONT.
FROM

CONT. FROM FIG. 19-2(a)

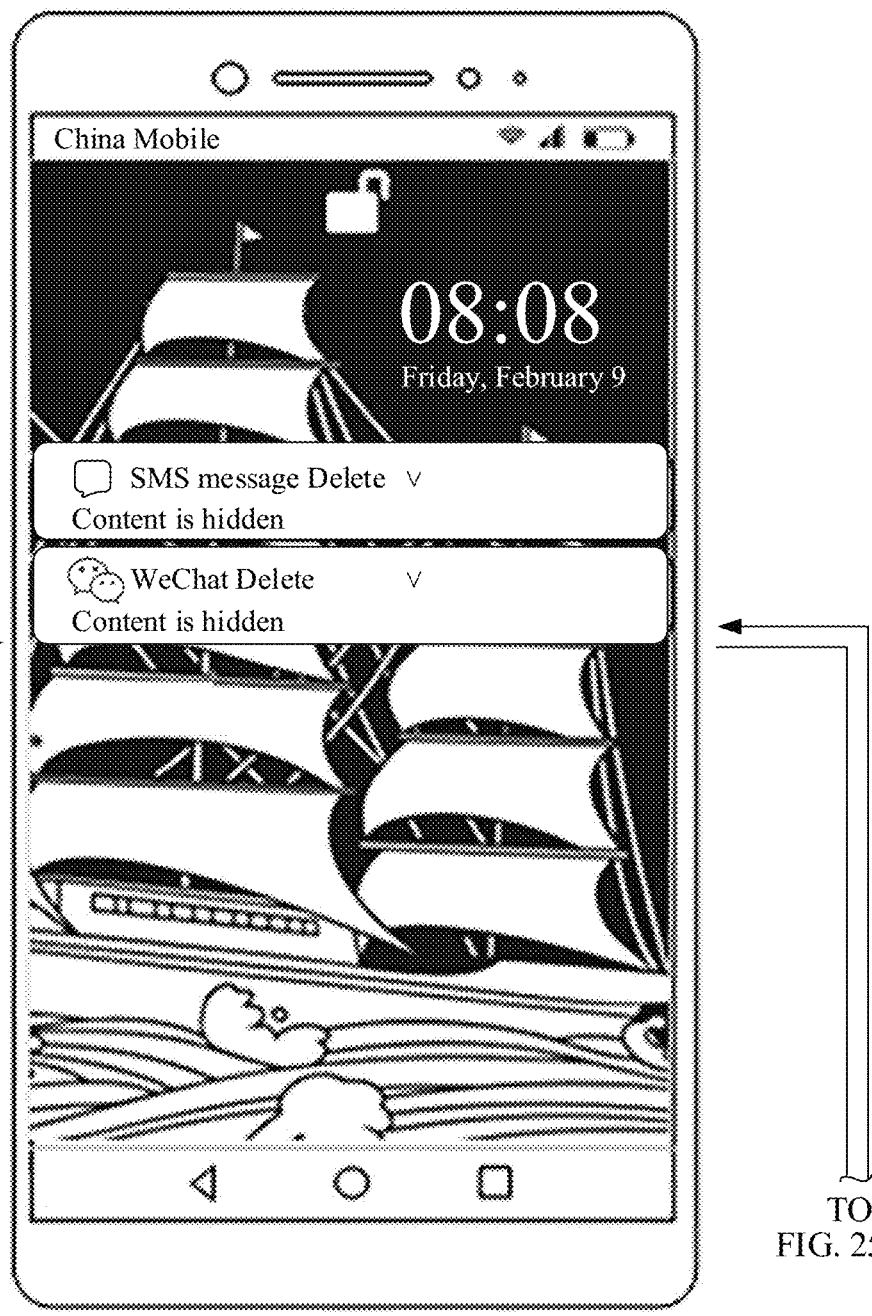

TO FIG. 25(e)

CONT. FROM FIG. 25(c)

Second screen
Third screen

CONT. FROM FIG. 27(b)

TO FIG. 27(d)

CONT. FROM FIG. 27(d)

CONT. FROM FIG. 28-1(b)

TO FIG. 28-1(d)

China Mobile

→ TO FIG. 29(b)

FIG. 29(f)
China Mobile
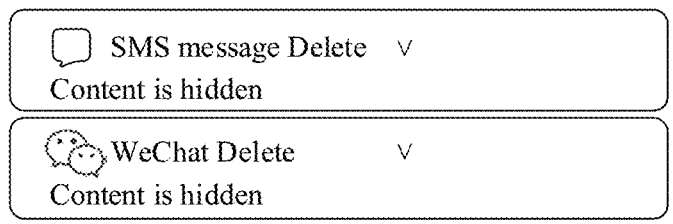
CONT.
FROM
FIG. 29(a)
TO
FIG. 29(c)
FIG. 29(b)

CONT. FROM FIG. 29(b)

CONT. FROM FIG. 29(d)

DISPLAY CONTROL METHOD AND DEVICE

CROSS-REFERENCE TO RELATED APPLICATIONS

This application is a national stage of International Application No. PCT/CN2019/080286, filed on Mar. 29, 2019, which claims priority to Chinese Patent Application No. 201810277465.X, filed on Mar. 30, 2018. Both of the aforementioned applications are hereby incorporated by reference in their entireties.

TECHNICAL FIELD

This application relates to the field of communications technologies, and in particular, to a display control method and a device.

BACKGROUND

Currently, screens on increasingly more electronic devices such as mobile phones are unlocked by using a facial information recognition technology such as facial recognition or iris recognition. The facial information recognition technology may usually be used to complete unlocking in a process in which a user lifts an electronic device such as a mobile phone. Therefore, how to display a screen after facial information is successfully recognized to better reduce unnecessary interaction, improve interaction efficiency, and improve user experience is one of important problems currently faced.

SUMMARY

Embodiments of this application provide a display control method and a device. After facial information is successfully verified, content on a lock screen and another screen such as a desktop or an application screen opened before screen locking can be intuitively displayed, to improve interaction efficiency and user experience.

To achieve the foregoing objective, the following technical solutions are used in the embodiments of this application.

According to a first aspect, an embodiment of this application provides a display control method, applied to an electronic device with a touch display screen, and including: displaying, by the electronic device, a lock screen including a first control; then verifying, by the electronic device, head information; after the head information is successfully verified, displaying, by the electronic device, an unlock screen including the first control and a second control, where the lock screen does not include the second control; and then displaying, by the electronic device, a first screen on the unlock screen when detecting that a preset condition is met, where the first screen includes the second control, or the first screen is a screen corresponding to the first control, or the first screen is a screen corresponding to the second control; and the first screen does not include the first control.

In this solution, when the first screen includes the second control, after being unlocked, the electronic device can intuitively present, to a user, the first control on the lock screen and the second control on the first screen such as a desktop, so that the user can conveniently see, when seeing content displayed by the first control on the lock screen, content displayed by the second control on the first screen such as the desktop intended to be viewed or operated. In addition, it may be further convenient for the user to see a location of the second control on the first screen, to help the user efficiently operate the control on the first screen, and improve interaction efficiency.

In this solution, when the first screen is the screen corresponding to the first control or the second control, after being unlocked, the electronic device can intuitively present, to the user, the first control on the lock screen and the second control outside the lock screen, so that the user can conveniently see the second control when seeing the first control on the lock screen. In this way, it is convenient for the user to directly operate the first control on the lock screen or directly operate another control outside the lock screen, to improve interaction efficiency.

In a possible design, the unlock screen is formed after a second screen and a third screen are superimposed, the second screen includes the first control but does not include the second control, and the third screen includes the second control but does not include the first control.

In another possible design, the second screen is the same as the lock screen. In other words, the unlock screen may be obtained after the lock screen and another screen are superimposed.

In another possible design, the third screen is a desktop, an application screen opened before screen locking, a shortcut screen, or HiBoard. In other words, the unlock screen may be obtained after the desktop, the application screen opened before screen locking, the shortcut screen, or HiBoard and the lock screen are superimposed.

In another possible design, the first screen is the third screen, and that a preset condition is met specifically includes at least one of the following: a floating event is detected; or a time difference between a current moment and a moment at which the head information is successfully recognized is greater than or equal to preset duration; or the head information is continuously detected within first preset duration after the head information is successfully recognized, and another input operation of a user is not received; or an included angle between the electronic device and a horizontal plane is greater than or equal to a preset angle value; or a preset expression is detected; or a preset head action is detected; or a preset voice indication is detected.

When the electronic device displays the first screen, in this solution, a quantity of manual operations of the user may be reduced, or the user does not need to perform a manual operation, or the first screen may be displayed by using a natural action used in a process in which the user lifts the mobile phone during head information authentication, to improve user experience.

In another possible design, the displaying, by the electronic device, a first screen when detecting that a preset condition is met, where the first screen includes the second control, or the first screen is a screen corresponding to the first control, or the first screen is a screen corresponding to the second control specifically includes: if the electronic device detects a preset operation on the first control, displaying, by the electronic device, the screen corresponding to the first control; or if the electronic device detects a preset operation on the second control, displaying, by the electronic device, the screen corresponding to the second control.

To be specific, after the unlock screen is displayed, the user may directly operate the unlock screen obtained after unlocking, namely, the second screen, or may directly operate the third screen such as the desktop, the application screen opened before screen locking, the shortcut screen, or HiBoard, so that the user can operate both the second screen and the third screen, and an intention of the user can be directly reached, to improve interaction efficiency and use experience.

In another possible design, the unlock screen includes a second screen function area; and the displaying, by the electronic device, a first screen when detecting that a preset condition is met, where the first screen includes the second control, or the first screen is a screen corresponding to the first control, or the first screen is a screen corresponding to the second control specifically includes: if the electronic device detects a preset operation in the second screen function area, displaying, by the electronic device, the screen corresponding to the first control, where the screen corresponding to the first control includes an application screen corresponding to the first control and a screen corresponding to the second screen on which the first control is located; or if the electronic device detects a preset operation in another area, displaying, by the electronic device, the screen corresponding to the second control, where the screen corresponding to the second control includes an application screen corresponding to the second control and a screen corresponding to the third screen on which the second control is located.

In another possible design, the unlock screen includes a second screen function area and a third screen function area; and the displaying, by the electronic device, a first screen when detecting that a preset condition is met, where the first screen includes the second control, or the first screen is a screen corresponding to the first control, or the first screen is a screen corresponding to the second control specifically includes: if the electronic device detects a preset operation in the second screen function area, displaying, by the electronic device, the screen corresponding to the first control, where the screen corresponding to the first control includes an application screen corresponding to the first control and a screen corresponding to the second screen on which the first control is located; or if the electronic device detects a preset operation in the third screen function area, displaying, by the electronic device, the screen corresponding to the second control, where the screen corresponding to the second control includes an application screen corresponding to the second control and a screen corresponding to the third screen on which the second control is located.

In another possible design, the displaying, by the electronic device, a first screen when detecting that a preset condition is met, where the first screen includes the second control, or the first screen is a screen corresponding to the first control, or the first screen is a screen corresponding to the second control specifically includes: when detecting a preset operation performed on the unlock screen, if a first response event corresponding to the preset operation exists on the second screen, displaying, by the electronic device, a first screen corresponding to the first response event, where the first screen corresponding to the first response event is the screen corresponding to the first control, and the screen corresponding to the first control includes an application screen corresponding to the first control and a screen corresponding to the second screen on which the first control is located; or if a second response event corresponding to the preset operation exists on the third screen, but the first response event corresponding to the preset operation does not exist on the second screen, displaying, by the electronic device, a first screen corresponding to the second response event, where the first screen corresponding to the second response event is the screen corresponding to the second control, and the screen corresponding to the second control includes an application screen corresponding to the second control and a screen corresponding to the third screen on which the second control is located.

In another possible design, the displaying, by the electronic device, an unlock screen specifically includes: first displaying, by the electronic device, the second screen; and then displaying, by the electronic device, the third screen by superimposing the third screen on the second screen, to form the unlock screen.

In another possible design, the displaying, by an electronic device, an unlock screen specifically includes: displaying, by the electronic device, the second screen; and when detecting that the preset condition is met, increasing, by the electronic device, transparency of a part of an area or an entire area of the second screen or transparency of a part of an area or an entire area of the third screen, to display the unlock screen. In this solution, the electronic device may display, by increasing transparency of the second screen when displaying the second screen, the third screen disposed behind the second screen.

In another possible design, the displaying, by the electronic device, a first screen when detecting that a preset condition is met, where the first screen includes the second control, or the first screen is a screen corresponding to the first control, or the first screen is a screen corresponding to the second control specifically includes: displaying, by the electronic device, the first screen when transparency of a part of an area or an entire area of the second screen or transparency of a part of an area or an entire area of the third screen is greater than or equal to a first preset value, where the first screen is the third screen. To be specific, when the second screen has relatively high transparency, the electronic device may exit the second screen, and enter the first screen such as the desktop or the application screen opened before screen locking.

According to a second aspect, an embodiment of this application provides a display control method, applied to an electronic device with a touch display screen, and including: first displaying, by the electronic device, a lock screen including a first control; then verifying, by the electronic device, head information; after the head information is successfully verified, displaying a fourth screen including the first control; and when detecting that a preset condition is met, displaying, by the electronic device, a fifth screen that does not include the first control. That a preset condition is met includes at least one of the following: a floating event is detected; or a time difference between a current moment and a moment at which the head information is successfully recognized is greater than or equal to preset duration; or the head information is continuously detected within first preset duration after the head information is successfully recognized, and another input operation of a user is not received; or an included angle between the electronic device and a horizontal plane is greater than or equal to a preset angle value; or a preset expression is detected; or a preset head action is detected; or a preset voice indication is detected.

In this solution, after a screen is unlocked, when the user does not need to touch a surface of the screen to perform an operation, the electronic device may conveniently enter, automatically or based on a natural expression or head action used in a process in which the user lifts the electronic device, a screen such as a desktop, an application screen opened before screen locking, a shortcut screen, or HiBoard. Therefore, a quantity of manual operations of the user may be reduced or the user does not need to perform a manual operation, to improve interaction efficiency and user experience.

According to a third aspect, an embodiment of this application provides an electronic device, including: a touch display screen, configured to display a lock screen including a first control; and a verification unit, configured to verify head information, where the touch display screen is further configured to: display an unlock screen after the verification performed by the verification unit succeeds, where the unlock screen includes the first control and a second control, and the lock screen does not include the second control; and display a first screen on the unlock screen when it is detected that a preset condition is met, where the first screen includes the second control, or the first screen is a screen corresponding to the first control, or the first screen is a screen corresponding to the second control; and the first screen does not include the first control.

In a possible design, the unlock screen is formed after a second screen and a third screen are superimposed, the second screen includes the first control but does not include the second control, and the third screen includes the second control but does not include the first control.

In another possible design, the second screen is the same as the lock screen.

In another possible design, the third screen is a desktop, an application screen opened before screen locking, a shortcut screen, or HiBoard.

In another possible design, the first screen is the third screen, and that a preset condition is met specifically includes at least one of the following: a floating event is detected; or a time difference between a current moment and a moment at which the head information is successfully recognized is greater than or equal to preset duration; or the head information is continuously detected within first preset duration after the head information is successfully recognized, and another input operation of a user is not received; or an included angle between the electronic device and a horizontal plane is greater than or equal to a preset angle value; or a preset expression is detected; or a preset head action is detected; or a preset voice indication is detected.

In another possible design, the display unit is specifically configured to: if a preset operation on the first control is detected, display the screen corresponding to the first control; or if a preset operation on the second control is detected, display the screen corresponding to the second control.

In another possible design, the unlock screen includes a second screen function area; and the display unit is specifically configured to: if a preset operation is detected in the second screen function area, display the screen corresponding to the first control, where the screen corresponding to the first control includes an application screen corresponding to the first control and a screen corresponding to the second screen on which the first control is located; or if a preset operation is detected in another area, display the screen corresponding to the second control, where the screen corresponding to the second control includes an application screen corresponding to the second control and a screen corresponding to the third screen on which the second control is located.

In another possible design, the unlock screen includes a second screen function area and a third screen function area; and the display unit is specifically configured to: if a preset operation is detected in the second screen function area, display the screen corresponding to the first control, where the screen corresponding to the first control includes an application screen corresponding to the first control and a screen corresponding to the second screen on which the first control is located; or if a preset operation is detected in the third screen function area, display the screen corresponding to the second control, where the screen corresponding to the second control includes an application screen corresponding to the second control and a screen corresponding to the third screen on which the second control is located.

In another possible design, the display unit is specifically configured to: when a preset operation performed on the unlock screen is detected, if a first response event corresponding to the preset operation exists on the second screen, display a first screen corresponding to the first response event, where the first screen corresponding to the first response event is the screen corresponding to the first control, and the screen corresponding to the first control includes an application screen corresponding to the first control and a screen corresponding to the second screen on which the first control is located; or if a second response event corresponding to the preset operation exists on the third screen, but the first response event corresponding to the preset operation does not exist on the second screen, display a first screen corresponding to the second response event, where the first screen corresponding to the second response event is the screen corresponding to the second control, and the screen corresponding to the second control includes an application screen corresponding to the second control and a screen corresponding to the third screen on which the second control is located.

In another possible design, the display unit is specifically configured to: display the second screen; and display the third screen by superimposing the third screen on the second screen, to form the unlock screen.

In another possible design, the display unit is specifically configured to: display, by the electronic device, the second screen; and when it is detected that the preset condition is met, increase, by the electronic device, transparency of a part of an area or an entire area of the second screen or transparency of a part of an area or an entire area of the third screen, to display the unlock screen.

In another possible design, the display unit is specifically configured to display, by the electronic device, the first screen when transparency of a part of an area or an entire area of the second screen or transparency of a part of an area or an entire area of the third screen is greater than or equal to a first preset value, where the first screen is the third screen.

According to a fourth aspect, an embodiment of this application provides an electronic device. The electronic device includes: a touch display screen, configured to display a lock screen including a first control; and a verification unit, configured to verify head information, where the touch display screen is further configured to: after the verification performed by the verification unit succeeds, display a fourth screen including the first control; and when the electronic device detects that a preset condition is met, display a fifth screen that does not include the first control. That a preset condition is met includes at least one of the following: a floating event is detected; or a time difference between a current moment and a moment at which the head information is successfully recognized is greater than or equal to preset duration; or the head information is continuously detected within first preset duration after the head information is successfully recognized, and another input operation of a user is not received; or an included angle between the electronic device and a horizontal plane is greater than or equal to a preset angle value; or a preset expression is detected; or a preset head action is detected; or a preset voice indication is detected.

According to a fifth aspect, an embodiment of this application provides an electronic device, including one or more processors and one or more memories. The one or more memories are coupled to the one or more processors. The one or more memories are configured to store computer program code, and the computer program code includes a computer instruction. When the one or more processors execute the computer instruction, the electronic device is enabled to perform the display control method according to any one of the possible designs of any one of the foregoing aspects.

According to a sixth aspect, an embodiment of this application provides a computer storage medium, including a computer instruction. When the computer instruction is run on an electronic device, the electronic device is enabled to perform the display control method according to any one of the possible designs of any one of the foregoing aspects.

According to a seventh aspect, an embodiment of this application provides a computer program product. When the computer program product is run on a computer, the computer is enabled to perform the display control method according to any one of the possible designs of any one of the foregoing aspects.

BRIEF DESCRIPTION OF DRAWINGS

FIG. 5-2(a) and FIG. 5-2(b) are another schematic diagram of a comparison between a lock screen and a second screen according to an embodiment of this application;

FIG. 9-1(a), FIG. 9-1(b), and FIG. 9-1(c) are a schematic diagram of a group of screens according to an embodiment of this application;

FIG. 9-2(a), FIG. 9-2(b), and FIG. 9-2(c) are a schematic diagram of another group of screens according to an embodiment of this application;

FIG. 9-3(a), FIG. 9-3(b), and FIG. 9-3(c) are a schematic diagram of another group of screens according to an embodiment of this application;

FIG. 15-1(a) and FIG. 15-1(b) are a schematic diagram of another group of screens according to an embodiment of this application;

FIG. 15-2(a) and FIG. 15-2(b) are a schematic diagram of another group of screens according to an embodiment of this application;

FIG. 15-3(a), FIG. 15-3(b), and FIG. 15-3(c) are a schematic diagram of another group of screens according to an embodiment of this application;

FIG. 16-1(a) and FIG. 16-1(b) are a schematic diagram of another group of screens according to an embodiment of this application;

FIG. 16-2(a) and FIG. 16-2(b) are a schematic diagram of another group of screens according to an embodiment of this application;

FIG. 17-1(a) and FIG. 17-1(b) are a schematic diagram of another group of screens according to an embodiment of this application;

FIG. 17-2(a) and FIG. 17-2(b) are a schematic diagram of another group of screens according to an embodiment of this application;

FIG. 17-3(a) and FIG. 17-3(b) are a schematic diagram of another group of screens according to an embodiment of this application;

FIG. 17-4(a) and FIG. 17-4(b) are a schematic diagram of another group of screens according to an embodiment of this application;

FIG. 19-1(a) and FIG. 19-1(b) are a schematic diagram of another group of screens according to an embodiment of this application;

FIG. 19-2(a) and FIG. 19-2(b) are a schematic diagram of another group of screens according to an embodiment of this application;

FIG. 25(a) to FIG. 25(k) and FIG. 25(m) are a schematic diagram of another group of screens according to an embodiment of this application;

FIG. 28-1(a) to FIG. 28-1(f) and FIG. 28-1(h) are a schematic diagram of another group of screens according to an embodiment of this application;

FIG. 28-2(a) to FIG. 28-2(g) are a schematic diagram of another group of screens according to an embodiment of this application;

FIG. 29(a) to FIG. 29(f) and FIG. 29(h) are a schematic diagram of another group of screens according to an embodiment of this application;

DESCRIPTION OF EMBODIMENTS

For ease of understanding, some concepts related to the embodiments of this application are provided as examples for reference. Details are as follows:

Control: The control is an element presented in a graphical user interface, and included in an application program. The control controls all data processed by the application program and an interaction operation related to the data. A user may interact with the control through direct manipulation (direct manipulation), to read or edit information about the application program, and provide the user with a specific operation function or display specific content (content such as a display text, a display picture, or a display video). For example, the control may include visible interface elements such as an icon, a button, a menu, a tab, a text box, a dialog box, a status bar, a navigation bar, and a widget.

The following describes the technical solutions in the embodiments of this application with reference to the accompanying drawings in the embodiments of this application. In descriptions in the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

A display control method provided in the embodiments of this application may be applied to any electronic device that can display a screen such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). This is not limited in the embodiments of this application.

Figure 1:
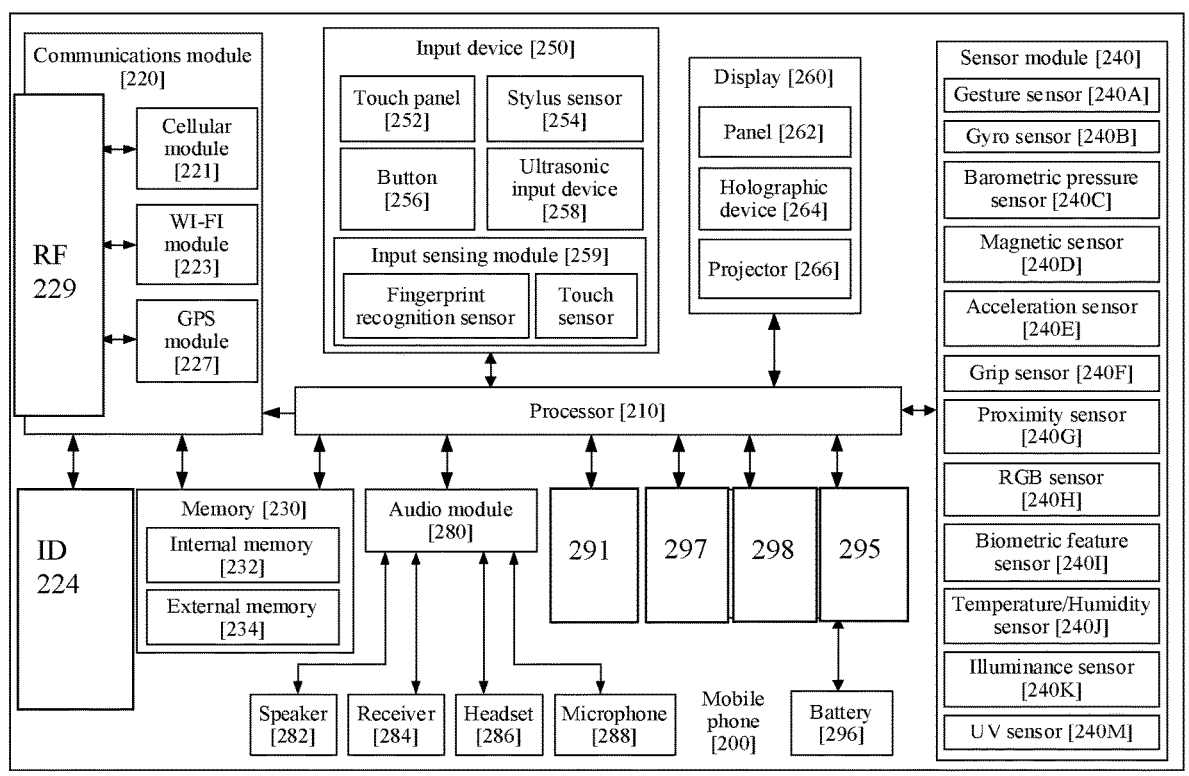
FIG. 1 is a schematic diagram of a hardware structure of a mobile phone according to an embodiment of this application.

For example, the electronic device in the embodiments of this application is the mobile phone, and a general hardware architecture of the mobile phone is described. As shown in FIG. 1, a mobile phone 200 may include a communications module 220, a memory 230, a sensor module 240, an input device 250, a display 260, an audio module 280, a processor 210, a camera module 291, a power management module 295, and the like. These components may be connected by using a bus, or may be directly connected. A person skilled in the art may understand that the structure of the mobile phone shown in FIG. 1 does not constitute a limitation on the mobile phone, and the mobile phone may include more components than those shown in FIG. 1, or combine some components, or have different component arrangements.

The communications module 220 is configured to communicate with another network entity, for example, receive information from a server or send related data to the server. The communications module 220 may include a radio frequency (radio frequency, RF) module 229, a cellular module 221, a wireless fidelity (wireless fidelity, Wi-Fi) module 223, a GPS module 227, and the like. The RF module 229 may be configured to: receive and send information, or receive and send signals in a call process, and in particular, send received information to the processor 210 for processing, and send a signal generated by the processor 210. Usually, the RF circuit 21 may include but is not limited to an antenna, at least one amplifier, a transceiver, a coupler, a low noise amplifier (low noise amplifier, LNA), a duplexer, and the like. In addition, the RF circuit 21 may further communicate with a network and another device through wireless communication. The cellular module 221 and the Wi-Fi module 223 may be configured to be connected to a network. The GPS module may be configured to perform positioning or navigation.

The processor 210 is a control center of the mobile phone 200, is connected to all parts of the entire mobile phone by using various interfaces and lines, and performs various functions of the mobile phone 200 and data processing by running or executing a software program and/or a module that are/is stored in the memory 230 and invoking data stored in the memory 230, to perform overall monitoring on the mobile phone 200. In a specific implementation, in an embodiment, the processor 210 may include one or more processing units. An application processor and a modem processor may be integrated into the processor 210. The application processor mainly processes an operating system, a graphical user interface, an application program, and the like. The modem processor mainly processes wireless communication. It may be understood that the modem processor may alternatively be not integrated into the processor 210.

The memory 230 may be configured to store data, a software program, and a module, and may be a volatile memory (volatile memory), for example, a random access memory (random access memory, RAM); or may be a nonvolatile memory (non-volatile memory), for example, a read-only memory (read-only memory, ROM), a flash memory (flash memory), a hard disk drive (hard disk drive, HDD), or a solid-state drive (solid-state drive, SSD); or may be a combination of the foregoing types of memories. Specifically, the memory 230 may store program code. The program code is used to enable the processor 210 to perform, by executing the program code, the display control method provided in the embodiments of this application. The memory 230 may include an internal memory 232 and an external memory 234.

The sensor module 240 may include a gesture sensor 240A, a gyro sensor 240B, a barometric pressure sensor 240C, a magnetic sensor 240D, an acceleration sensor 240E, and the like; and may be configured to detect magnitudes of acceleration of the mobile phone in all directions (usually three axes), may detect a magnitude and a direction of gravity in a static state, and may be used in an application for recognizing a mobile phone posture (such as a tilt angle of the mobile phone, switching between landscape mode and portrait mode, a related game, and magnetometer posture calibration), a function related to vibration recognition (such as a pedometer or a knock), or the like. It should be noted that the mobile phone 200 may further include another sensor, such as a grip sensor, a proximity sensor, a distance sensor, an RGB sensor, a biometric feature sensor, a temperature/humidity sensor, an illuminance sensor, or a UV sensor. Details are not described herein. The proximity sensor is a device that has a capability of sensing approach of an object. The proximity sensor may recognize approach of the object by using a sensitive characteristic of a displacement sensor for the approaching object, and output a corresponding on-off signal. The distance sensor may be configured to detect a floating event.

The input device 250 may include a touch panel 252, a stylus sensor 254, a button 256, an ultrasonic input device 258, an input sensing module 259, and the like, to implement input and output functions of the mobile phone 200.

The display 260 may include devices such as a display panel 262, a holographic device 264, and a projector 266. The display panel 262 may be configured to display a graphical user interface (graphical user interface, GUI) on the mobile phone. The graphical user interface includes various controls, various application screens, or the like.

The touch panel 252 and the display panel 262 may also be referred to as a touch display screen or a touchscreen. The touchscreen may collect a touch operation (for example, an operation performed by a user on the touchscreen or near the touchscreen by using any proper object or accessory such as a finger or a stylus) performed by the user on or near the touchscreen, and drive a corresponding connection apparatus based on a preset program. The display screen 11 may be further configured to display information entered by the user or information (for example, an image captured by using a camera) provided for the user, and various menus of the mobile phone. For example, the touchscreen may be implemented in a plurality of types such as a resistive type, a capacitive type, infrared light sensing, and an ultrasonic wave. This is not limited in this embodiment of the present invention. An operation performed by the user near the touchscreen may be referred to as floating touch, and a touchscreen on which floating touch can be performed may be implemented in a capacitive type, infrared light sensing, an ultrasonic wave, and the like.

For example, when a target such as a finger approaches or moves away from the capacitive touchscreen, currents of a self-capacitance and a mutual capacitance in the touchscreen change accordingly, so that the electronic device can detect floating measurement and control. For another example, the infrared light sensing touchscreen may emit light by using an infrared LED and an infrared light-emitting diode, and the mobile phone recognizes and tracks a floating gesture by detecting screen light reflected from a target such as a finger of the user.

The camera module 291 may be configured to collect an image to take a photo, record a video, scan a two-dimensional code/bar code, or the like, and may be further configured to perform facial information recognition, user expression recognition, user head action recognition, or the like.

The audio module 280 may include a speaker 282, a receiver 284, a headset 286, a microphone 288, or the like, and the user collects or plays an audio signal.

The power management module 295 may include a battery 296, configured to be logically connected to the processor 210 by using a power management system, so that the power management system implements functions such as charging and discharging management and power consumption management.

In addition, the mobile phone 200 may further include function modules such as a subscriber identification module, an indicator, and a motor. Details are not described herein.

Figure 2:
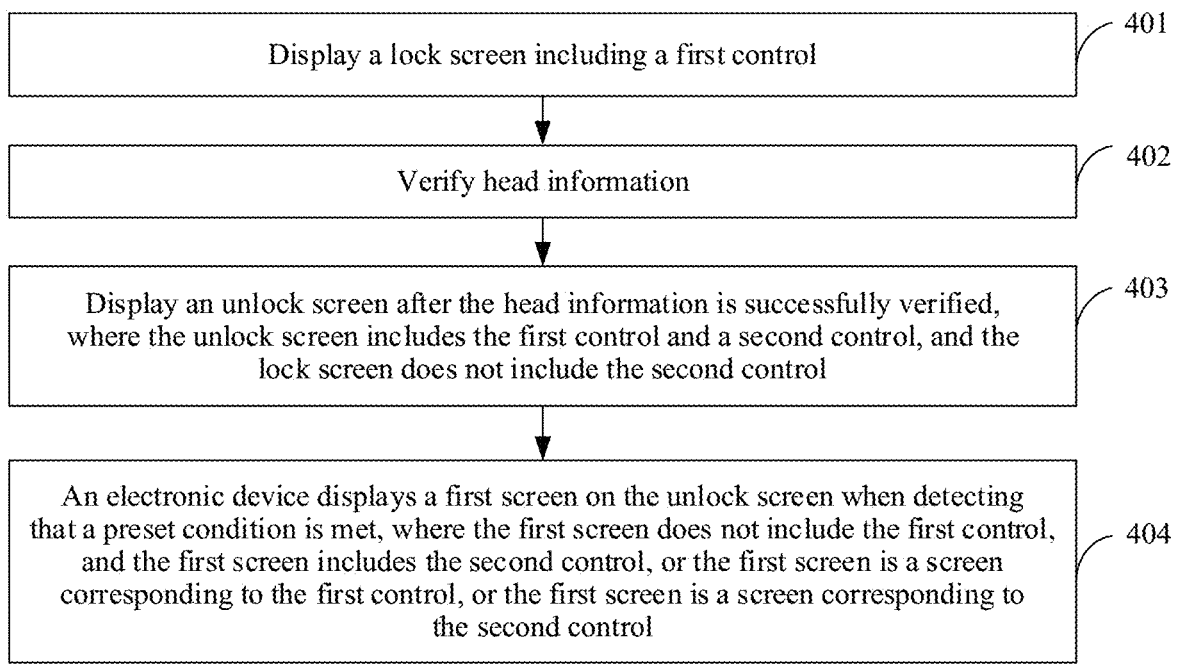
FIG. 2 is a flowchart of a display control method according to an embodiment of this application.

The following describes, in detail by using specific embodiments, the display control method provided in the embodiments of this application. Referring to FIG. 2, the method may include the following steps.

401: An electronic device displays a lock screen including a first control.

In a screen-locked state, the electronic device displays the lock screen including the first control. The first control may include one or more of a notification display control, a time display control, a date display control, a dual-clock display control, a step count display control, a call shortcut icon, a camera shortcut icon, or the like.

402: The electronic device verifies head information.

The head information includes information about a biometric feature of a head, such as facial information or iris information. The electronic device may detect the head information by using a camera, and compare the detected head information with preset head information for verification. If the detected head information matches the preset head information, the verification succeeds, and a current user is a valid user.

Facial recognition is used as an example. The electronic device may collect an image by using a camera module, determine information such as a location and a size of a face and a location of each main facial organ, collect one or more pieces of other information such as a head action, a facial expression, an iris, and a lipprint, and compare the information with stored verification information, to identify whether an identity corresponding to the face is valid. Specifically, how to collect and use the biometric information for authentication belongs to the prior art. Details are not described in the present invention.

403: The electronic device displays an unlock screen after the head information is successfully verified, where the unlock screen includes the first control and a second control, and the lock screen does not include the second control.

A screen of the electronic device is unlocked after the head information is successfully verified. The electronic device may display an unlock screen 120 including a first control 111 and a second control 121. The lock screen includes the first control, but does not include the second control. In other words, in addition to a control on the lock screen, the unlock screen may include another control outside the lock screen. For example, a schematic screen diagram of the unlock screen 120 may be shown in FIG. 3.

Specifically, after being unlocked, the electronic device may further provide a user with a sound, light, vibration, visual prompt, or the like, to notify the user that the screen is unlocked, and display the unlock screen. For example, after being unlocked, the electronic device may "beep" once, and display the unlock screen.

404: The electronic device displays a first screen on the unlock screen when detecting that a preset condition is met, where the first screen does not include the first control.

Figure 4:
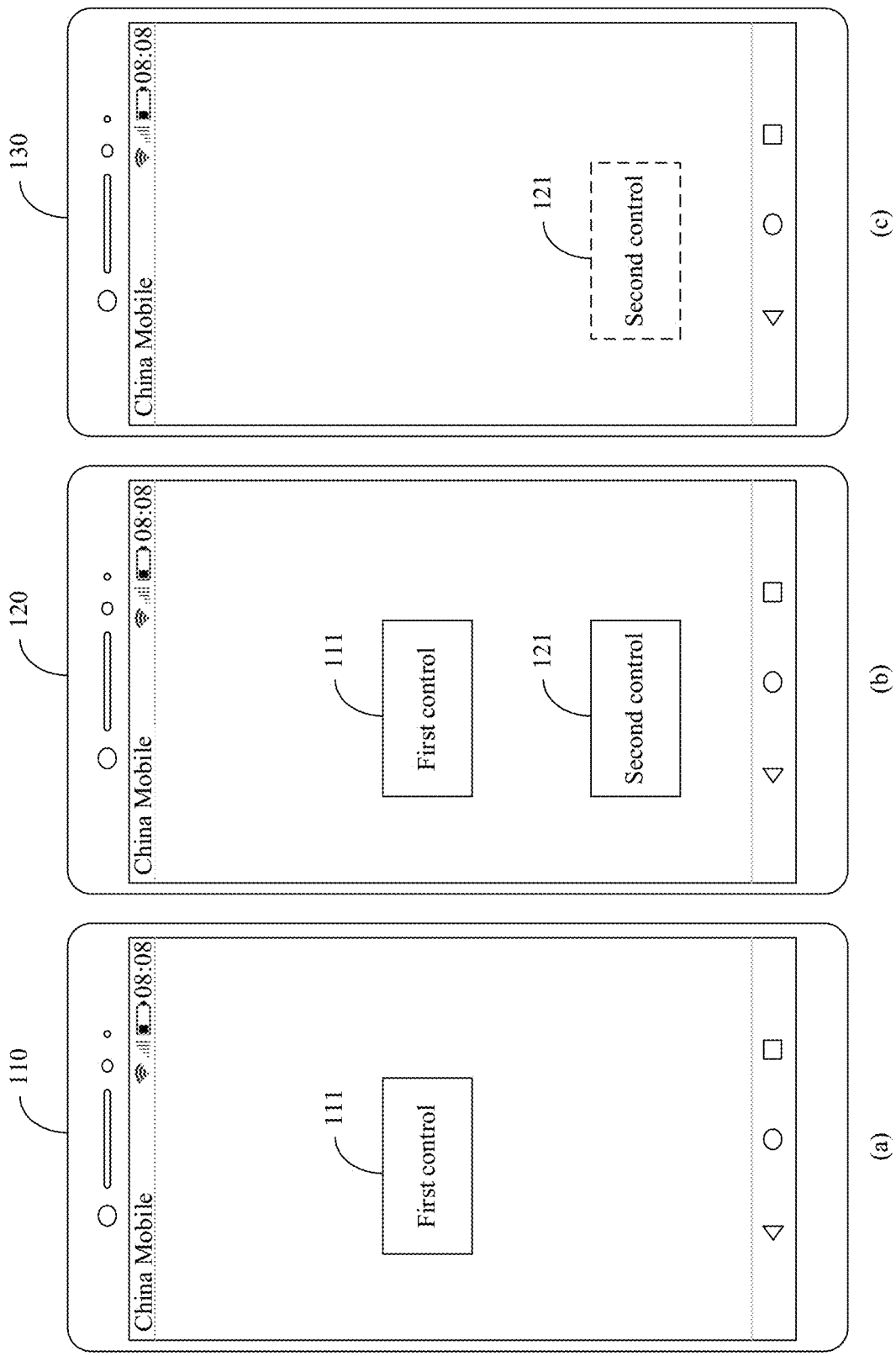
FIG. 4 is a schematic diagram of a comparison between a lock screen, an unlock screen, and a first screen according to an embodiment of this application.

To be specific, referring to FIG. 4, the electronic device displays, in a screen-locked state, a lock screen 110 that includes the first control 111 but does not include the second control, and displays, after being unlocked, the unlock screen 120 including the first control 111 and the second control 121. In other words, the unlock screen may include some or all controls on the lock screen, and further include another control outside the lock screen. When the preset condition is met, the electronic device displays a first screen 130 that does not include the first control 111 but includes the second control 121. Because controls included on the lock screen and the first screen are different, the first screen and the lock screen are also different.

In a possible implementation, the first screen includes the second control. The second control may be a control that the user intends to view or operate, and the first screen may be a screen that the user intends to view or operate. For example, the first screen including the second control may be a desktop, an application screen opened before screen locking, a shortcut screen, HiBoard, or the like.

The application screen opened before screen locking is a display screen for an application that has been being opened by the user before screen locking. The shortcut screen includes some controls recently used or most frequently used by the user or some controls set by the user. For example, the controls may include a WeChat icon, a news icon, or an Alipay Scan shortcut icon. HiBoard may be used to display a function, an application, a subscribed service, subscribed information, and the like that are frequently used by the user, and HiBoard may also be referred to as a desktop assistant, a shortcut menu, or the like.

In this possible implementation, after being unlocked, the electronic device can intuitively present, to the user, the first control on the lock screen and the second control on the first screen such as the desktop, so that the user can conveniently see, when seeing content displayed for the first control on the lock screen, content displayed for the second control on the first screen such as the desktop intended to be viewed or operated. In addition, the user can conveniently see a location of the second control on the first screen. In this way, the user can efficiently operate the control on the first screen, improving interaction efficiency.

In another possible implementation, the first screen is a screen corresponding to the first control, or the first screen is a screen corresponding to the second control. Specifically, the first screen may be specifically a screen displayed when the user operates the first control or a screen displayed when the user operates the second control. For example, when a screen including the second control is a desktop, an application screen opened before screen locking, a shortcut screen, HiBoard, or the like, the first screen may be a page corresponding to the first control such as a notification display control on the lock screen, and the page corresponding to the notification display control may be a detailed information page obtained after a notification is opened; or the first screen may be a page corresponding to the second control on a desktop, an application screen opened before screen locking, a shortcut screen, HiBoard, or the like. For example, when the second control is a WeChat icon, a screen corresponding to the WeChat icon may be a WeChat application screen.

In this possible implementation, after being unlocked, the electronic device can intuitively present, to the user, the first control on the lock screen and the second control outside the lock screen, so that the user can conveniently see the second control when seeing the first control on the lock screen. In this way, the user can conveniently and directly operate the first control on the lock screen or operate another control outside the lock screen, improving interaction efficiency.

In a possible design, the lock screen includes a second screen and a third screen, the second screen includes the first control but does not include the second control, and the third screen includes the second control but does not include the first control.

Figures 1A, 5:
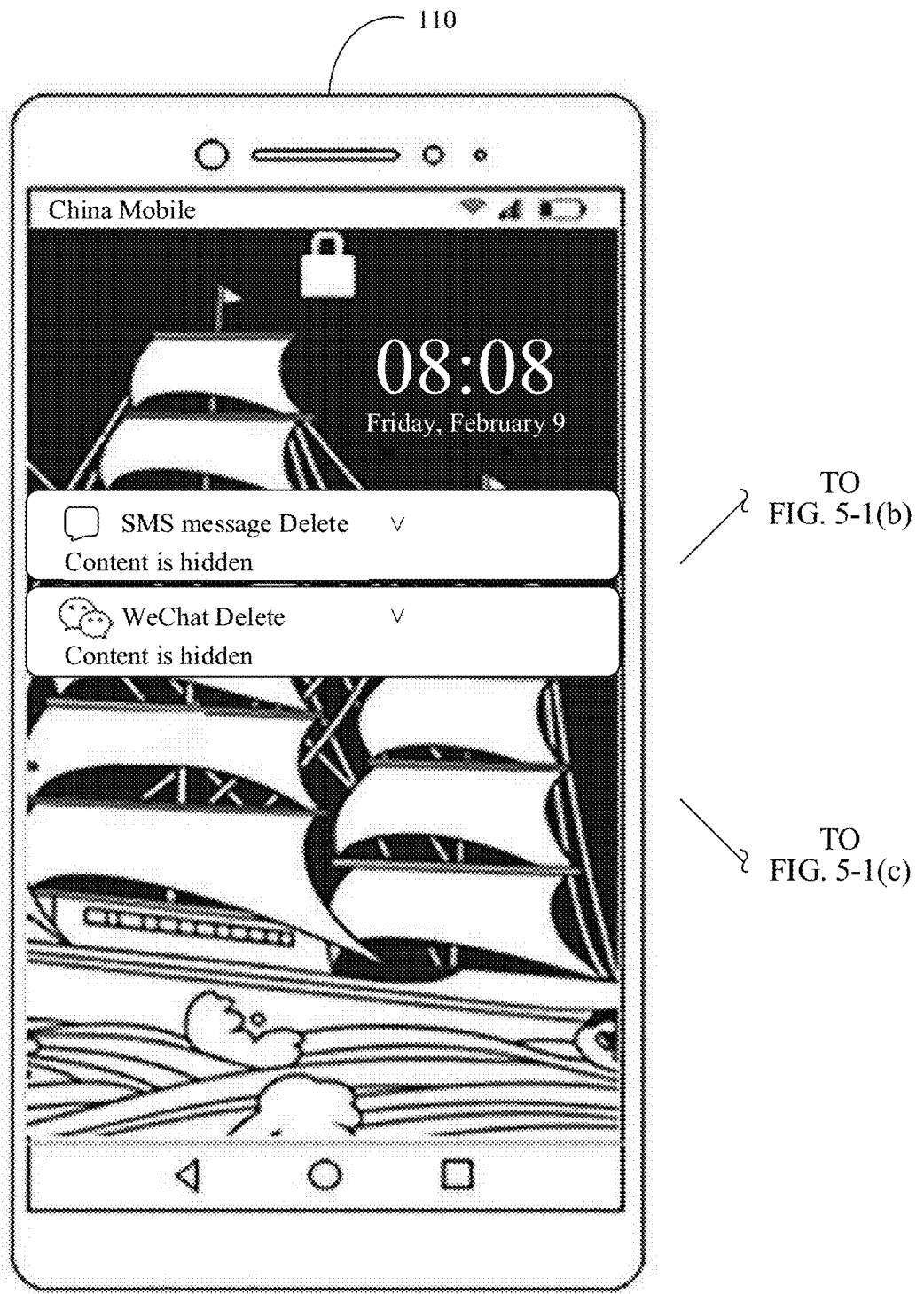
FIG. 5-1(a), FIG. 5-1(b), and FIG. 5-1(c) are a schematic diagram of a comparison between a lock screen and a second screen according to an embodiment of this application.

The second screen may be the same as the lock screen. Alternatively, the second screen is different from the lock screen, and a difference lies in that indication information indicating whether the screen is locked or unlocked is different. The indication information may be one or more of a pattern, a character, and an animation. This is not specifically limited in this embodiment of this application. For example, a difference between the second screen and the first screen lies in: Referring to FIG. 5-1(*a*), an identifier of a "locked lock" is displayed on the lock screen 110, and referring to FIG. 5-1(*b*), a pattern of an "unlocked lock" is displayed on the second screen 140. Alternatively, referring to FIG. 5-1(*c*), a pattern of a lock is not displayed on the second screen 140. Alternatively, referring to FIG. 5-2(*a*), a character "L" is displayed on the lock screen, and in FIG. 5-2(*b*), a character "O" is instantly displayed on the second screen. Alternatively, a pattern of a "smiling face" is not displayed on the lock screen, but a pattern of a "smiling face" is displayed on the second screen. Alternatively, the lock screen has a relatively dark hue and relatively low luminance, and the second screen has a relatively bright hue and relatively high luminance. Therefore, the second screen may be understood as a lock screen displayed after the screen is unlocked. In the following embodiments of this application, the "second screen" is also referred to as a "lock screen obtained after unlocking".

Figure 6A:
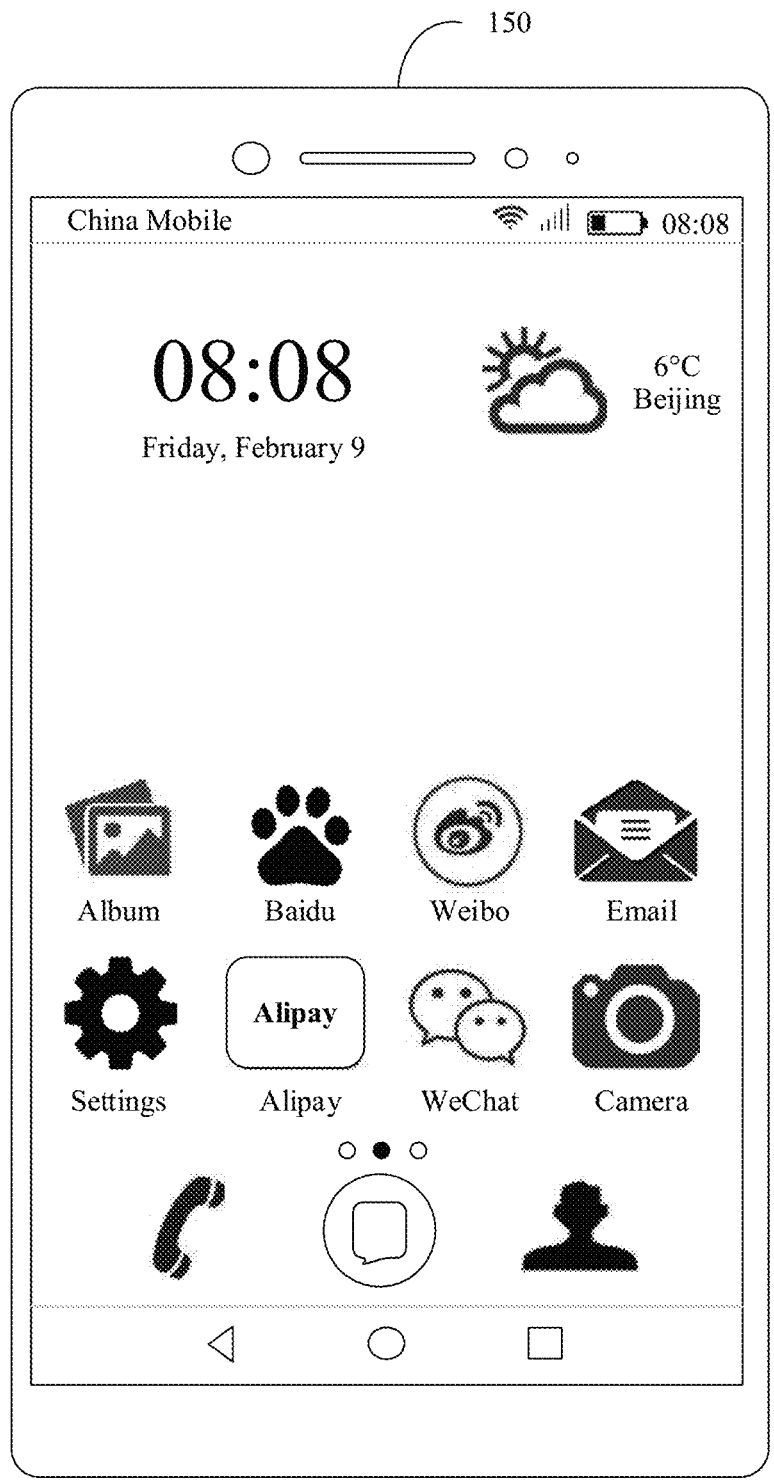
FIG. 6(a), FIG. 6(b), and FIG. 6(c) are a schematic diagram of several third screens according to an embodiment of this application.
Figure 6B:
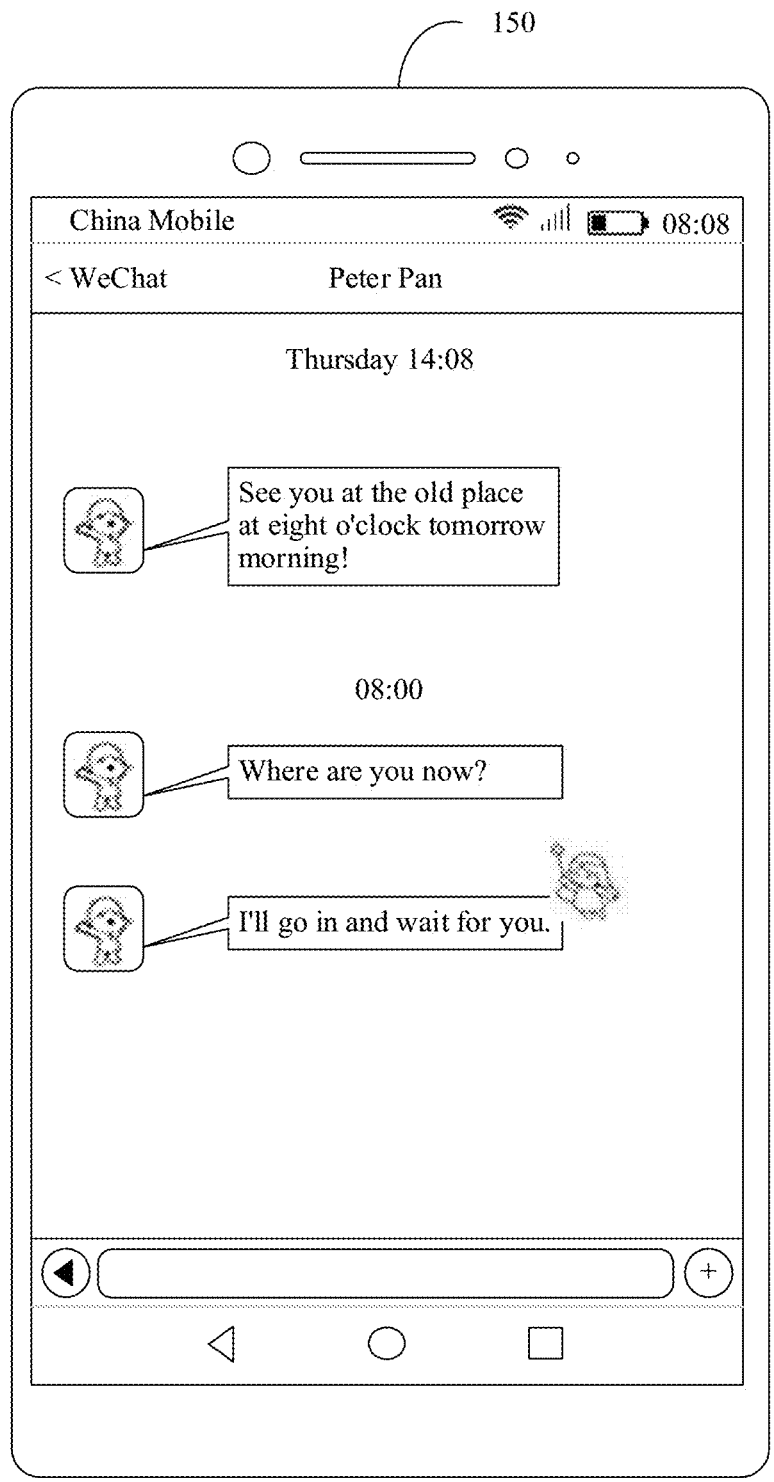
Figure 6C:
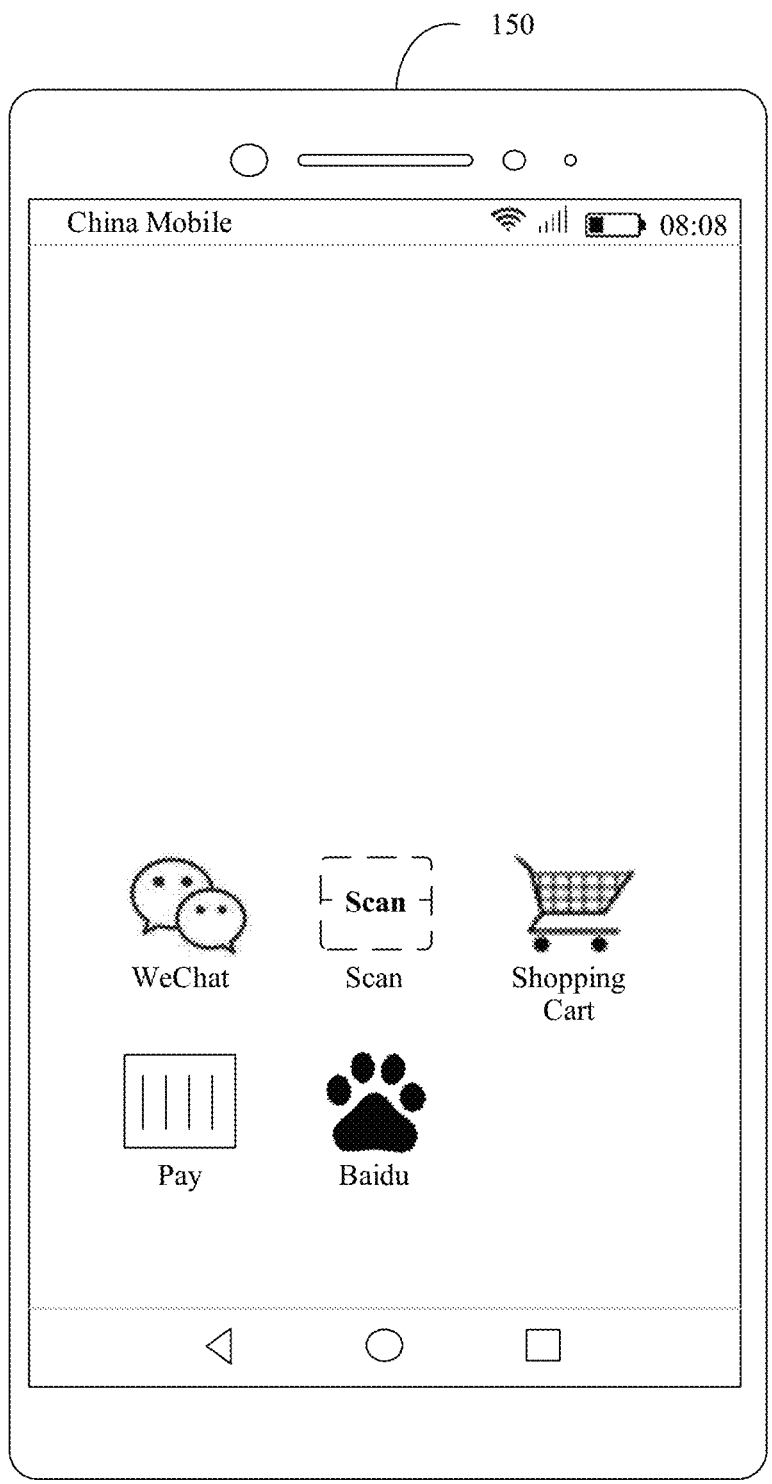

The third screen 150 may be a desktop shown in FIG. 6(*a*), an application screen opened before screen locking that is shown in FIG. 6(*b*), a shortcut screen shown in FIG. 6(*c*), HiBoard, or the like.

Figure 7:
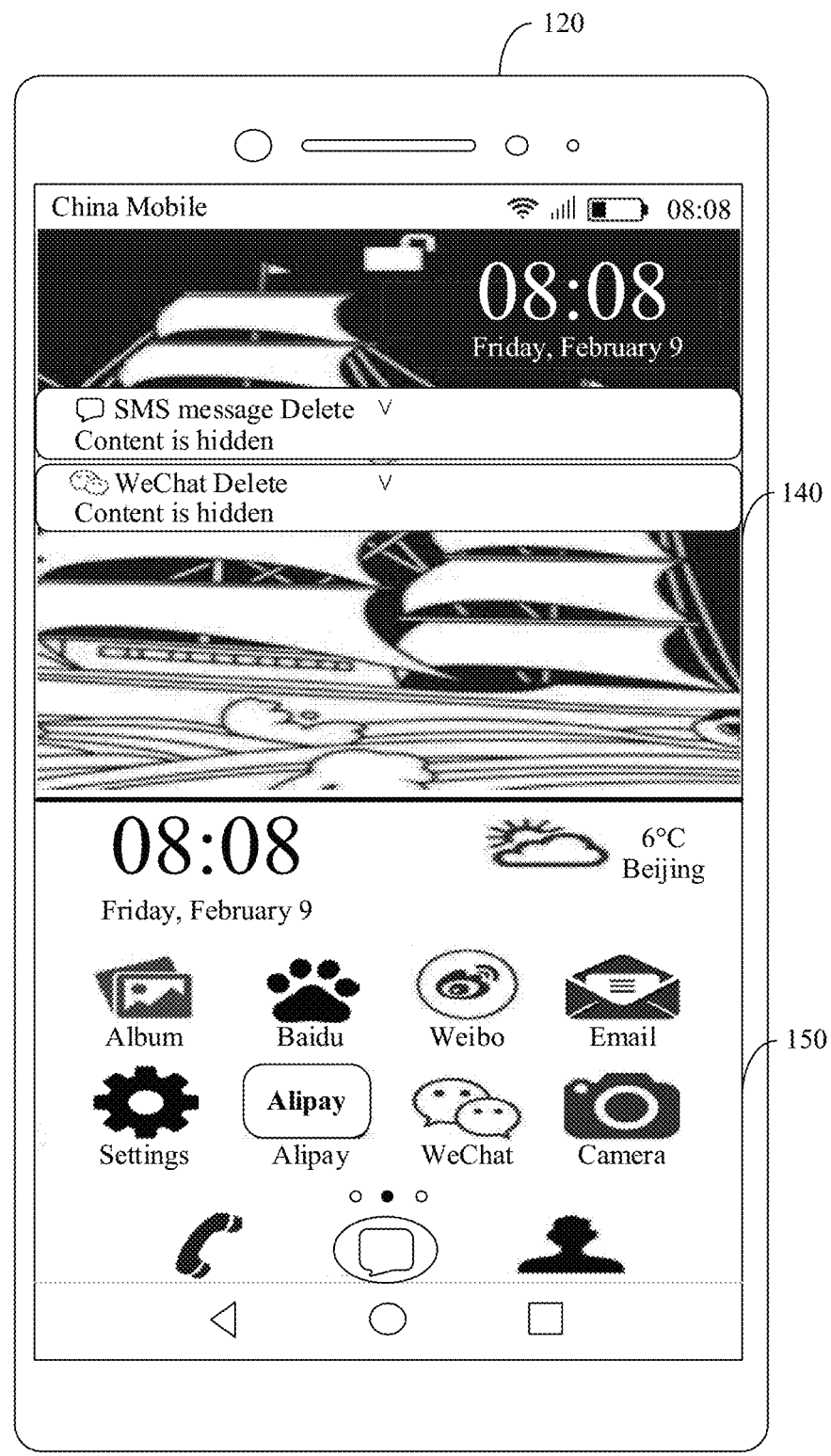
FIG. 7 is a schematic diagram of an unlock screen according to an embodiment of this application.

When the unlock screen includes the second screen and the third screen, in a possible implementation, the second screen and the third screen may be displayed in a split-screen mode. Specifically, the second screen and the third screen may occupy different areas on the screen. For example, the second screen and the third screen may be displayed in an up-down split-screen mode, in a left-right split-screen mode, or the like. For example, when the third screen 140 is a desktop, a schematic diagram of the unlock screen 120 may be shown in FIG. 7.

When the unlock screen includes the second screen and the third screen, in another possible implementation, the unlock screen is formed after the second screen and the third screen are superimposed. The second screen and the third screen may be displayed in a front-to-rear superimposition manner. In this case, when the screen disposed in the front is presented, the screen located in the rear may be presented to a user through the screen located in the front. Specifically, on the second screen and the third screen, a part of the screen disposed in the front or an entire screen area may be a translucent area, that is, transparency of the part of the screen disposed in the front or the entire screen area may be greater than 0, to achieve an effect of displaying the second screen and the third screen in a superimposition manner. In addition, a value of transparency of the screen disposed in the front may dynamically change, and an area that is on the screen disposed in the front and whose transparency is greater than 0 may also dynamically change.

Transparency refers to a degree of transparency and translucency of a screen, a control, a picture, or the like, and affects an effect of overlap between the screen, the control, the picture, or the like and a background or another screen, control, picture, or the like. Transparency refers to a degree of allowed light transmission. A percentage of 100% indicates that the screen, the control, or the picture is colorless and transparent, and the transparency is represented in percentage. In this embodiment of this application, the transparency of the screen disposed in the front includes transparency of a wallpaper, and transparency of a part of a wallpaper area or an entire wallpaper area may dynamically change. Further, the transparency of the screen disposed in the front may further include transparency of another component on the screen. For example, when the screen disposed in the front is the second screen, transparency of the second screen may further include transparency of another component such as a clock component, a calendar component, a notification component, a step count display component, an emergency call shortcut component, or a camera shortcut component. In addition, when the second screen and the third screen are displayed in a superimposition manner, the electronic device may further lighten colors of an image and a text that are displayed by each control on the screen disposed in the front (for example, change dark red to light red, or change black to gray). In this way, when seeing the front screen, the user can also see display content on the rear screen through the front screen relatively clearly.

Figures 1B, 5:
Figures 1C, 5:
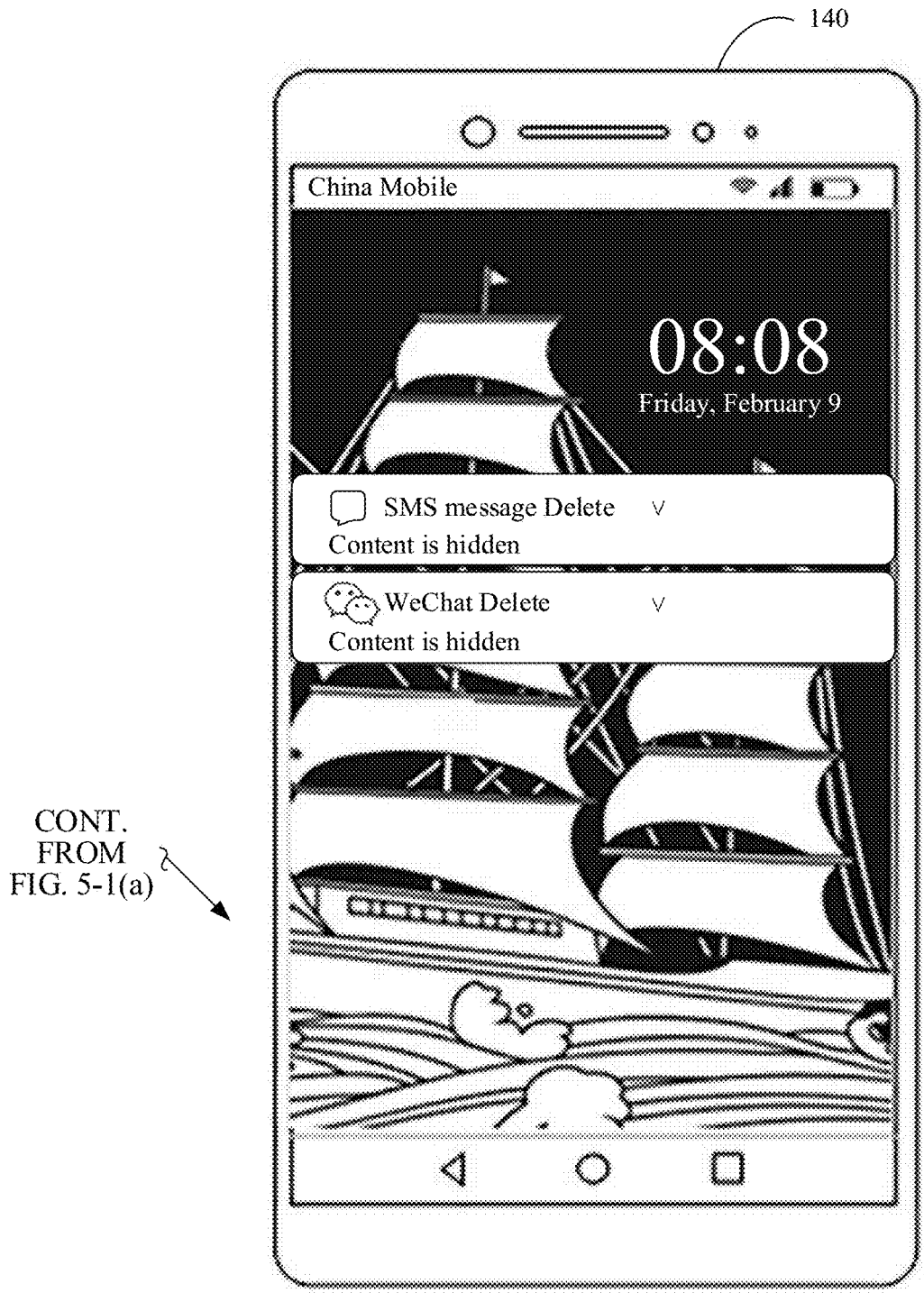
Figure 8A:
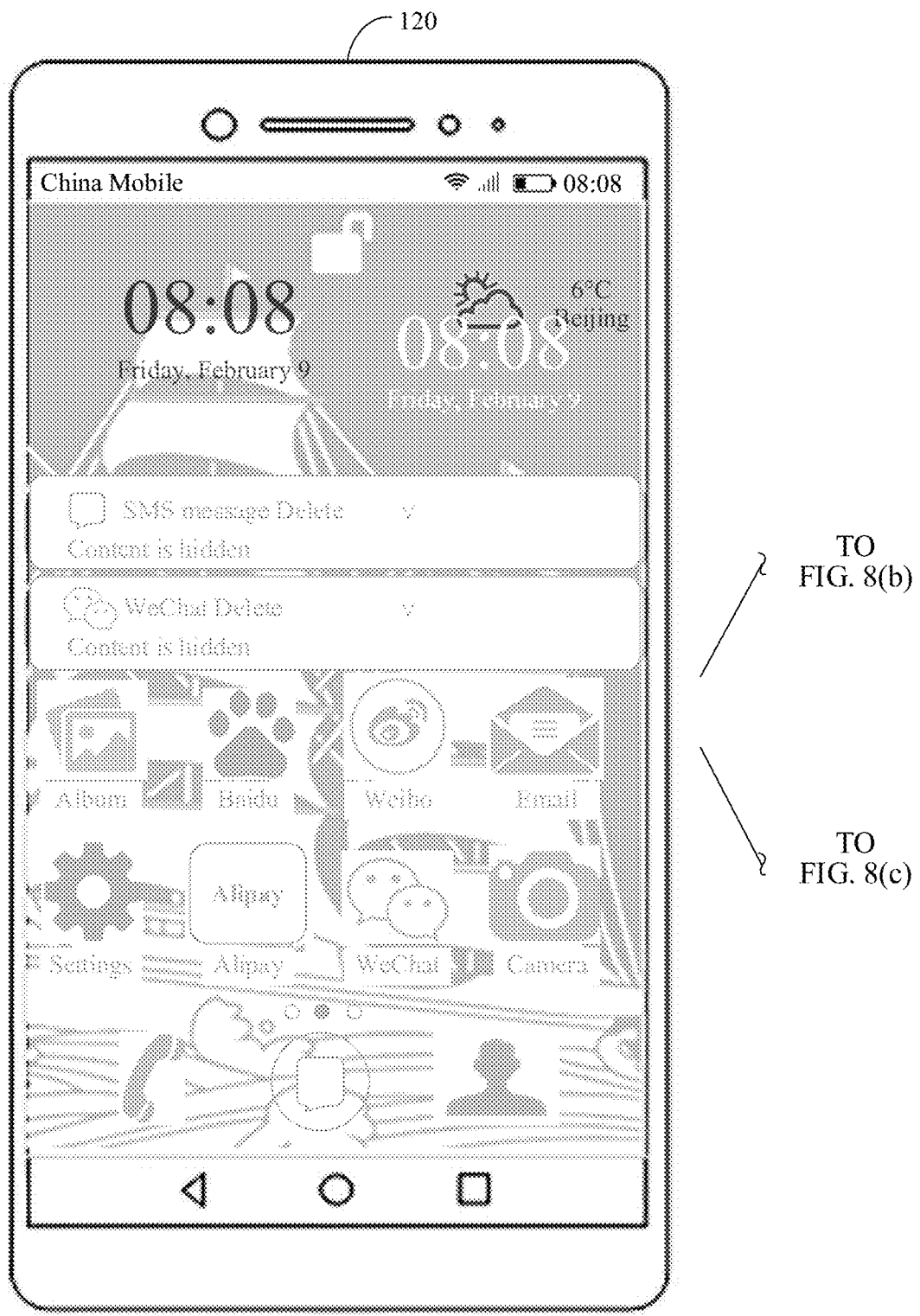
FIG. 8(a), FIG. 8(b), and FIG. 8(c) are a schematic diagram of another unlock screen according to an embodiment of this application.
Figure 8B:
Figure 8C:

For example, when the third screen is the desktop shown in FIG. 6(a), and the second screen is the screen shown in FIG. 5-1(b), the unlock screen 120 may be shown in FIG. 8(a). Referring to FIG. 8(b), the unlock screen 120 may include a second screen 140 disposed in the front and a third screen 150 disposed in the rear, and transparency of some or all areas on the second screen 140 disposed in the front is greater than 0. Alternatively, as shown in FIG. 8(c), the unlock screen 120 may include a third screen 150 disposed in the front and a second screen 140 disposed in the rear, and transparency of some or all areas on the third screen 150 disposed in the front is greater than 0. The following mainly uses a case shown in FIG. 8(b) as an example to describe a case in which the second screen and the third screen are displayed in a superimposition manner to implement the unlock screen.

When the unlock screen includes the second screen and the third screen, in a first solution in step 404, the first screen includes the second control, and the first screen may be the third screen. That is, after the electronic device is unlocked, when a preset condition is met, the electronic device displays the third screen, and the third screen includes the second control. Therefore, in this solution, the electronic device displays the lock screen before being unlocked, and displays, after being unlocked, superimposition of a "lock screen obtained after unlocking" (the second screen) and a desktop, an application screen opened before screen locking, a shortcut screen, or HiBoard (the third screen). Then, when the preset condition is met, the electronic device may display the third screen such as the desktop, the application screen opened before screen locking, the shortcut screen, or HiBoard.

For example, when the third screen is the desktop, schematic diagrams of the screen displayed on the electronic device in steps 401 to 404 may be shown in FIG. 9-1(a), FIG. 9-1(b), and FIG. 9-1(c). When the third screen is the application screen opened before screen locking, and the application screen opened before screen locking is a WeChat screen, schematic diagrams of the screen displayed on the electronic device in steps 401 to 404 may be shown in FIG. 9-2(a), FIG. 9-2(b), and FIG. 9-2(c). When the third screen is the shortcut screen, schematic diagrams of the screen displayed on the electronic device in steps 401 to 404 may be shown in FIG. 9-3(a), FIG. 9-3(b), and FIG. 9-3(c).

It should be noted that the preset condition may not include detecting a user's operation of touching a surface of the screen. To be specific, in this embodiment of this application, after being unlocked, the electronic device may enter a screen such as the desktop, the application screen opened before screen locking, the shortcut screen, or HiBoard, without the user's operation of touching the surface of the screen. Therefore, both hands of the user can be freed, and user experience can be better improved especially when both the hands of the user are occupied for other things.

In step 404, that the electronic device displays the third screen when detecting that the preset condition is met may include: When transparency of the second screen is 100%, the electronic device displays only the third screen; or the electronic device exits the second screen and displays only the third screen. The following uses an example in which the second screen is exited and only the third screen is displayed for description.

For example, in step 404, that the electronic device displays the third screen when detecting that the preset condition is met may specifically include the following.

In a possible implementation, referring to FIG. 10(a) to FIG. 10(d), in step 404, the electronic device displays the third screen when detecting a floating event. The floating event may be a floating event from a finger, a floating event from another target such as an electronic stylus, or the like. This is not specifically limited in this embodiment of this application. Alternatively, the electronic device may display the third screen when detecting that a finger or an electronic stylus approaches the screen or when detecting that a distance between a finger or an electronic stylus and the screen is less than or equal to a preset distance value.

In this case, after the screen is unlocked and the unlock screen is displayed, in a process in which the user operates the third screen by using a finger, that is, when the finger moves to the screen, the electronic device displays the third screen and exits the second screen, and the user does not need to perform a dedicated operation on the surface of the screen by using the finger to exit the second screen. Therefore, interaction efficiency can be improved, and user experience can be improved.

When the electronic device detects the floating event or detects that the finger or the electronic stylus approaches the screen, the user usually expects to view or operate the third screen such as the desktop, the application screen opened before screen locking, the shortcut screen, or HiBoard. In this case, it may be suggested that the user has an intention to operate the third screen instead of just expecting to browse through information such as a time and a date on the second screen. Therefore, the electronic device may exit the second screen and independently display the third screen, to help the user view and operate the third screen. In this case, the user does not need to first perform an operation such as sliding on the surface of the screen to display the third screen and then operate the third screen. Therefore, the electronic device can predict a behavior purpose of the user based on the operation of the user and make a corresponding response. This reduces a quantity of manual operations of the user, improves interaction efficiency, and improves user experience.

Specifically, the electronic device may detect, by using a self-capacitance and a mutual capacitance on the screen, whether the finger, the electronic stylus, or the like floats on or approaches the screen. Alternatively, the electronic device may emit light by using a light emitting LED or a photodiode, and detect, by detecting light reflected off the screen, whether the finger, the electronic stylus, or the like floats on or approaches the screen. Alternatively, the electronic device may detect, by using a proximity sensor, whether the finger, the electronic stylus, or the like approaches the screen. These are implemented in the prior art. Details are not described herein.

Figure 11A:
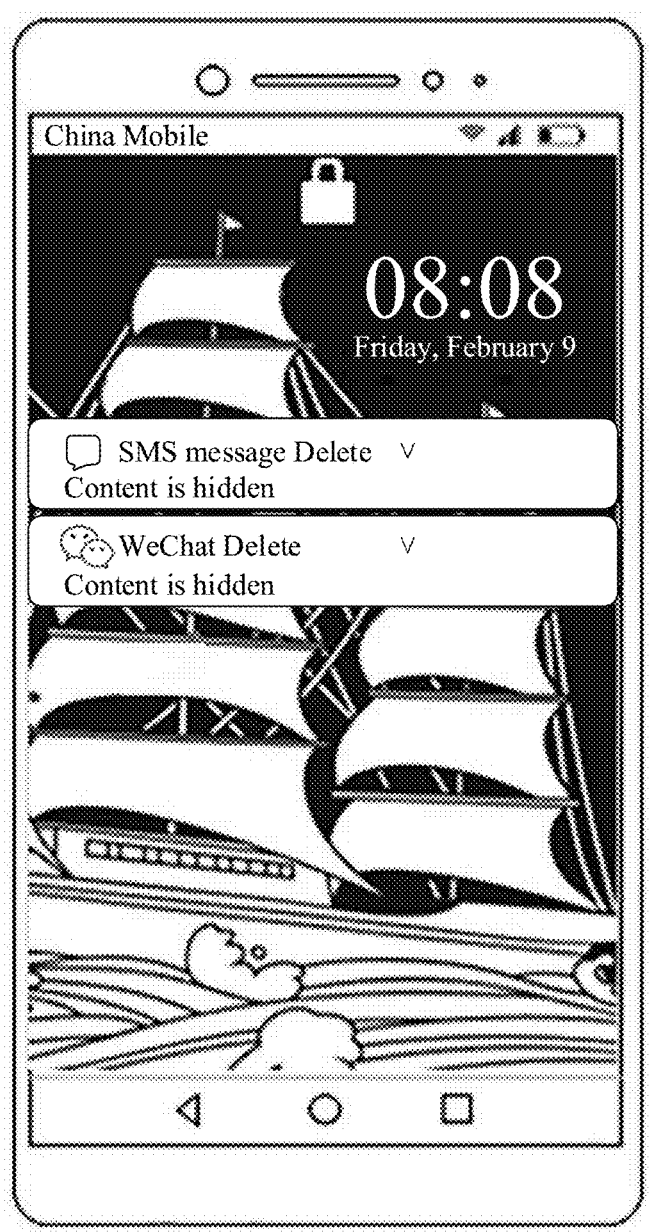
FIG. 11(a), FIG. 11(b), and FIG. 11(c) are a schematic diagram of another group of screens according to an embodiment of this application.
Figure 11B:
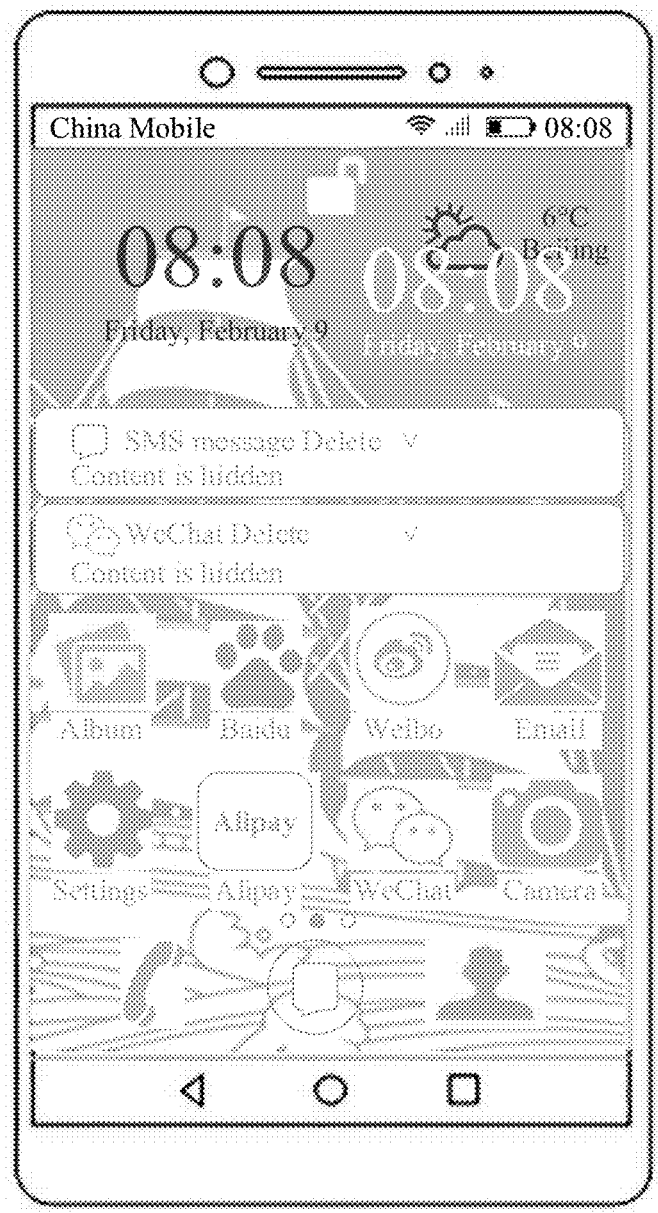
Figure 11C:
Figure 12D:
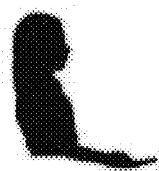
FIG. 12(a) to FIG. 12(f) are a schematic diagram of another group of screens according to an embodiment of this application.
Figure 12A:
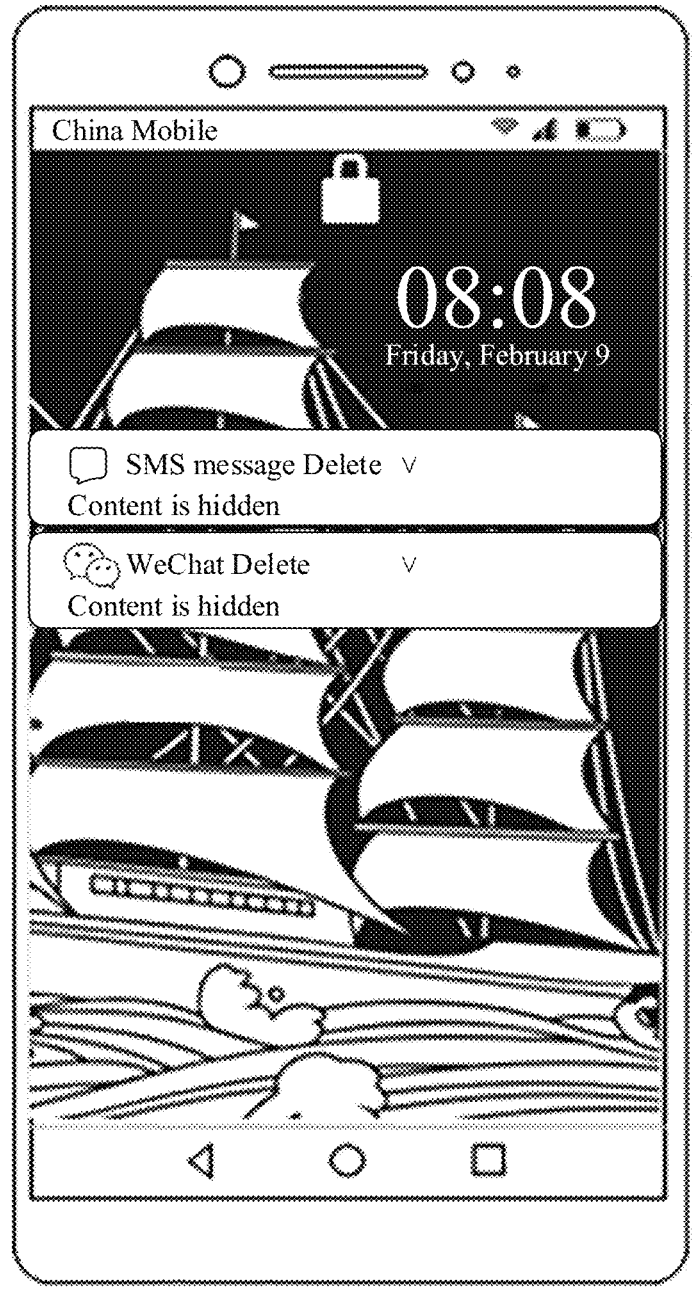
Figure 12E:
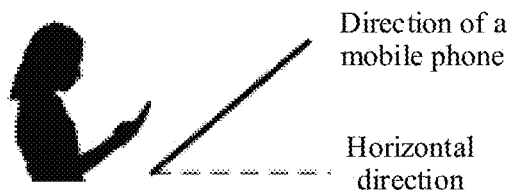
Figure 12B:
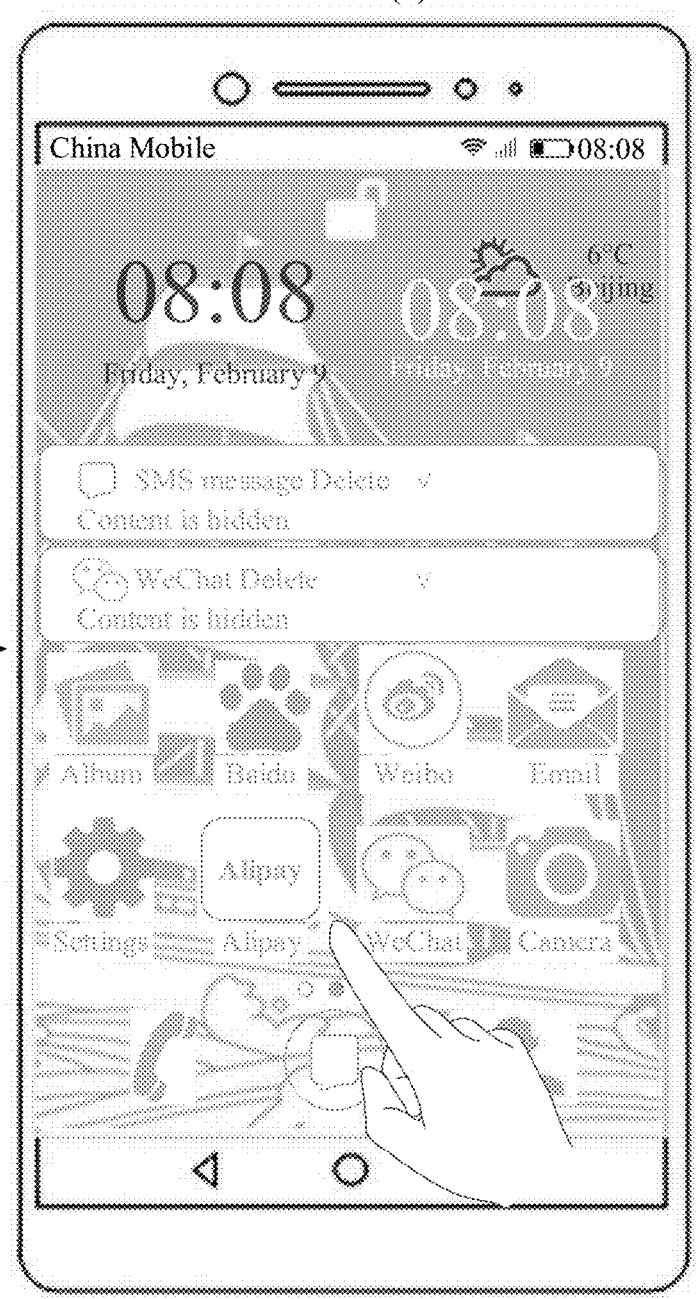
Figure 12F:
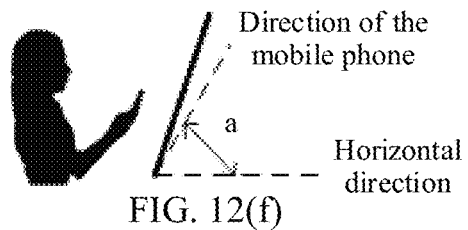
Figure 12C:
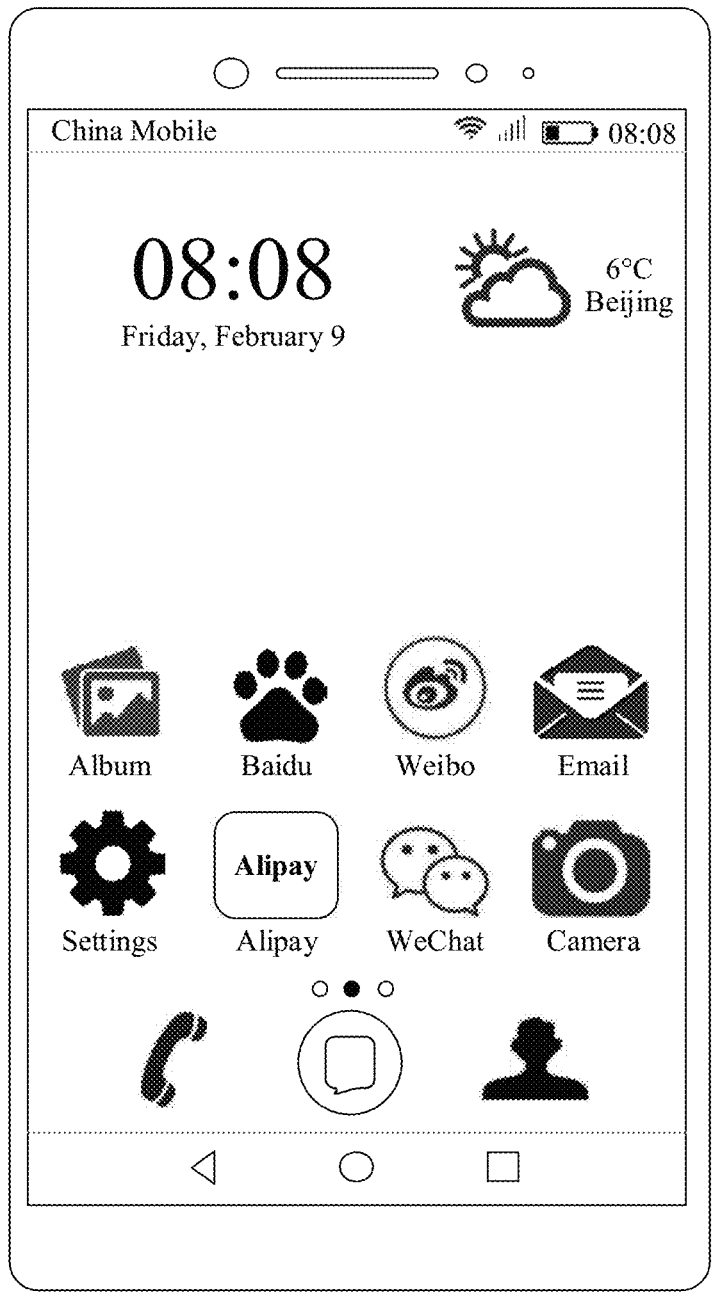
Figure 13D:
FIG. 13(a) to FIG. 13(f) are a schematic diagram of another group of screens according to an embodiment of this application.
Figure 13A:
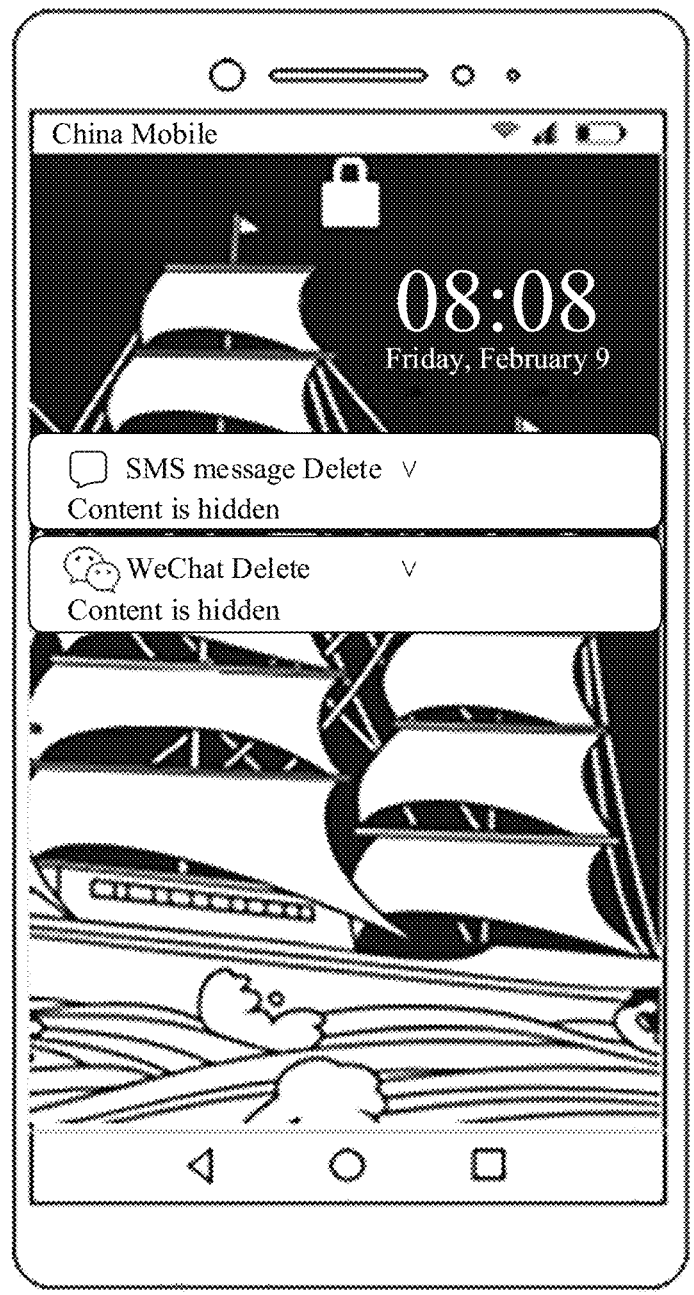
Figure 13E:
Figure 13B:
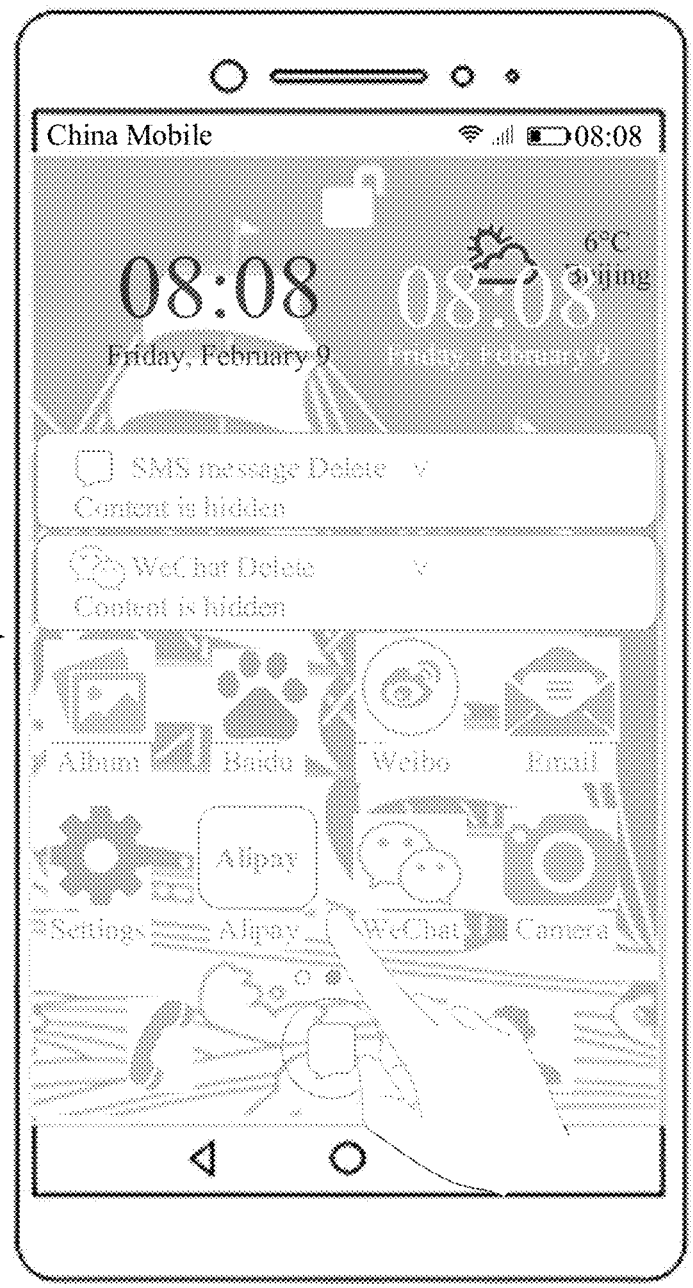
Figure 13F:
Figure 13C:
Figure 13C:
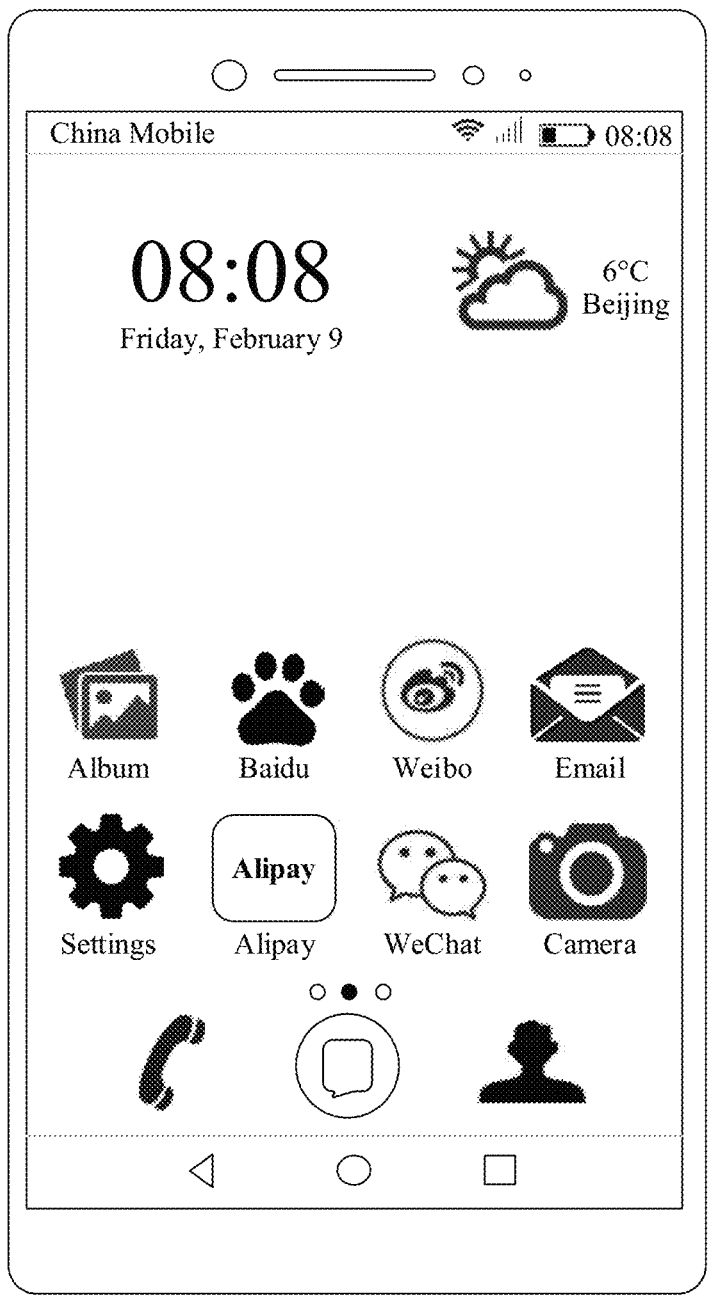
Figure 14D:
FIG. 14(a) to FIG. 14(f) are a schematic diagram of another group of screens according to an embodiment of this application.
Figure 14A:
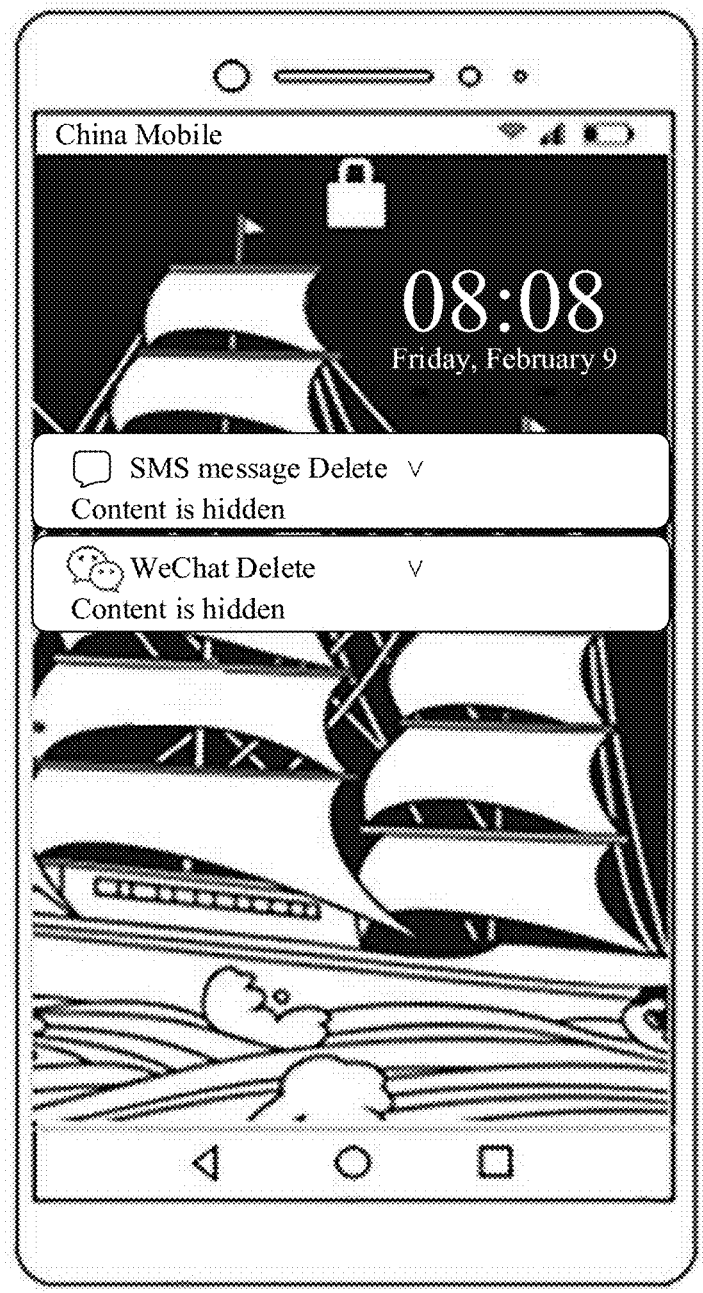
Figure 14E:
Figure 14B:
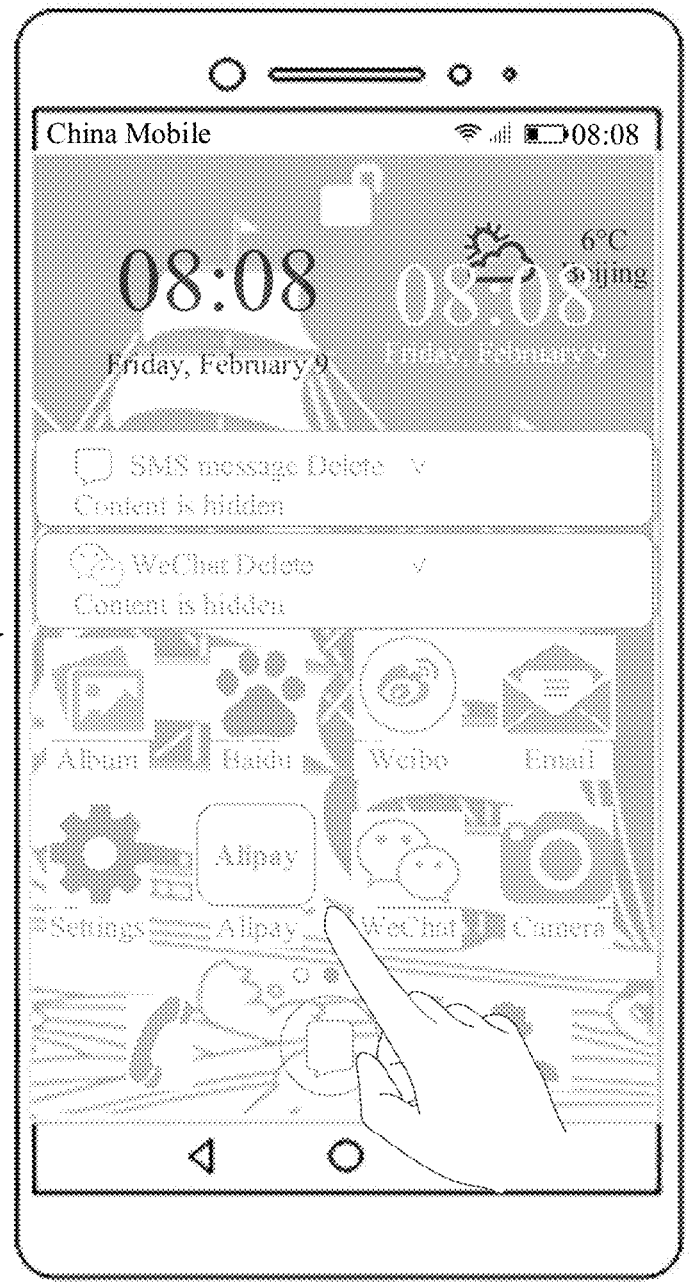
Figure 14F:
Figure 14C:
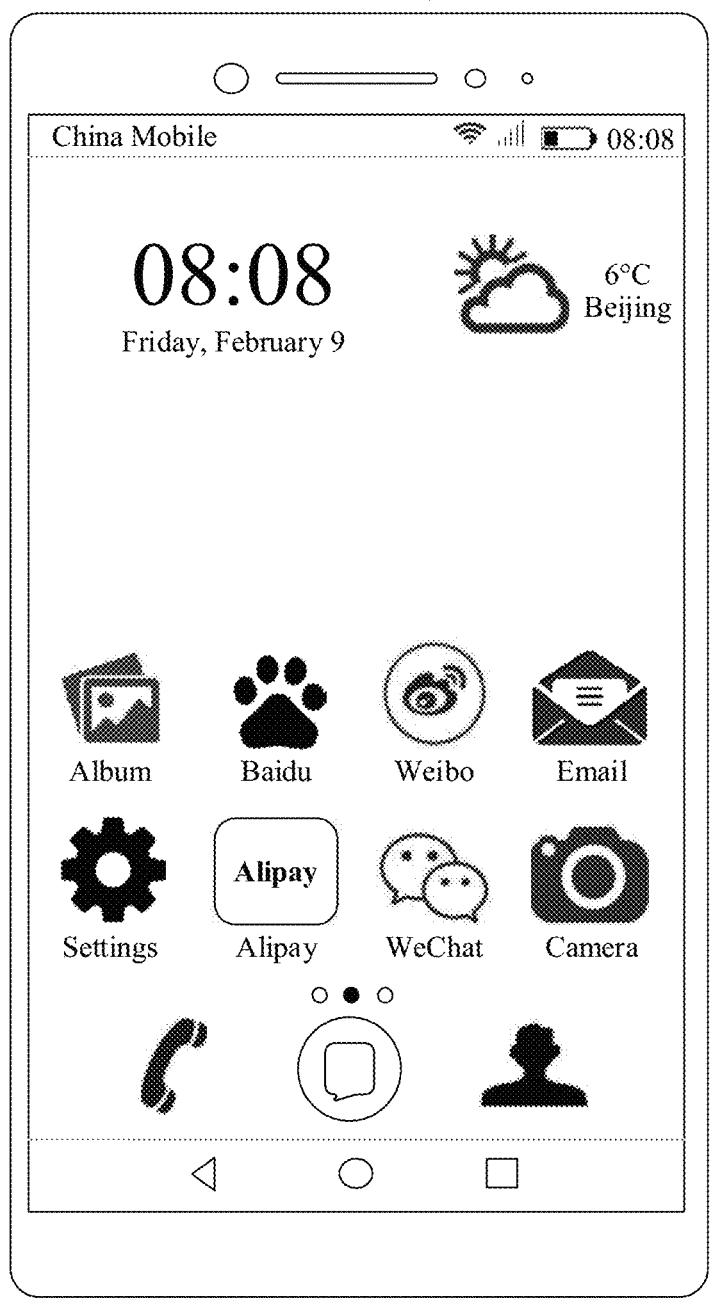

In another possible implementation, referring to FIG. 11(a), FIG. 11(b), and FIG. 11(c), in step 404, when a time difference between a current moment and a moment at which the head information is successfully recognized is greater than or equal to preset duration T (for example, 3 s), or when the head information is continuously detected within the preset duration T after the head information is successfully recognized, and no other input operation of the user is received, the electronic device exits the second screen and independently displays the third screen.

In this implementation, the user may have sufficient time to view information such as a time and a step count on the second screen within the preset duration. After a time period corresponding to the preset duration, the user may have a stronger desire to operate the third screen. Therefore, the electronic device may automatically exit the second screen and display the third screen, to help the user view and operate the third screen. In this case, the electronic device can exit the second screen and independently display the third screen without an operation such as sliding performed by the user on the surface of the screen. Therefore, a quantity of manual operations of the user may be reduced or the user does not need to perform a manual operation, to free both hands of the user, improve interaction efficiency, and improve user experience.

In another possible implementation, referring to FIG. 12(a) to FIG. 12(f), when an included angle between the electronic device and a horizontal plane is greater than or equal to a preset angle value (for example, an angle value a), the electronic device may exit the second screen and display the third screen. Alternatively, when the electronic device detects that an included angle between the electronic device and a horizontal plane increases, the electronic device may exit the second screen, to independently display the third screen.

A head information recognition process usually occurs in a process in which the user holds the electronic device and lifts the electronic device, and the included angle between the electronic device and the horizontal plane increases in the process in which the user lifts the electronic device. For example, in a process in which the user lifts a mobile phone when standing, sitting, or lying down, the mobile phone rotates around the bottom of a screen, and an included angle between the mobile phone and a horizontal plane increases. For another example, in a process in which the user lifts a mobile phone when lying down, the mobile phone rotates around a side of a screen, and an included angle between the mobile phone and a horizontal plane increases.

To be specific, in the process of lifting the electronic device such as the mobile phone, head information recognition may be completed to display the unlock screen. In the lifting process, the electronic device may automatically exit the second screen and independently display the third screen, to help the user view and operate the third screen. In this case, the electronic device can exit the second screen and independently display the third screen without an operation such as sliding performed by the user on the surface of the screen. Therefore, a quantity of manual operations of the user may be reduced or the user does not need to perform a manual operation, to free both hands of the user, improve interaction efficiency, and improve user experience.

Specifically, the electronic device may detect, by using a gyro sensor, an acceleration sensor, or the like, whether the included angle between the electronic device and the horizontal plane changes, or detect whether the included angle between the electronic device and the horizontal plane is greater than the preset angle value.

In another possible implementation, the electronic device displays the third screen when detecting a preset expression (for example, a smile, a laugh, a pout, a raised eyebrow, a grin, or one eye closed). For example, referring to FIG. 13(a) to FIG. 13(f), when detecting the smile expression of the user, the electronic device displays the third screen and exits the second screen.

The user needs to lift the mobile phone near a head when head information recognition is performed. When the mobile phone is lifted near the head, the mobile phone may conveniently and quickly exit the second screen and display the third screen for the user based on a relatively natural action such as a facial expression of the user, to help the user view and operate the third screen. In this case, the mobile phone can exit the second screen and independently display the third screen without a dedicated operation such as sliding performed by the user on the surface of the screen. Therefore, a quantity of manual operations of the user may be reduced or the user does not need to perform a manual operation, so that both hands of the user can be freed, interaction difficulty can be reduced, and the terminal can also be operated when a hand operation is inconveniently performed, to improve interaction efficiency, and improve user experience.

Specifically, a facial expression recognition technology may include expression image obtaining, image preprocessing, feature extraction, and expression classification and recognition. The electronic device may first collect and obtain a static image sequence or a dynamic image sequence of a facial expression by using a camera module. Then, the electronic device may perform image size and gray scale normalization, head posture correction, image segmentation, and the like to improve image quality, deaden noise, unify an image gray scale value and an image size, and prepare for subsequent feature extraction and classification and recognition. Next, the electronic device may convert a dot matrix into a higher-level image representation, such as a shape, a motion, a color, a texture, and a spatial structure, perform dimension reduction processing on image data while ensuring stability and a recognition rate as high as possible, extract an expression feature, and perform classification and recognition based on the extracted facial expression.

In another possible implementation, the electronic device displays the third screen when detecting a preset head action (for example, bowing, tilting, turning left, turning right, nodding, or shaking a head). For example, referring to FIG. 14(a) to FIG. 14(f), when detecting the user's head action of turning left, the electronic device displays the third screen and exits the second screen.

The user needs to lift the mobile phone near a head when head information recognition is performed. When the mobile phone is lifted near the head, the mobile phone may conveniently and quickly exit the second screen and display the third screen for the user based on a natural action such as a head action, to help the user view and operate the third screen. In this case, the mobile phone can exit the second screen and independently display the third screen without a dedicated operation such as sliding performed by the user on the surface of the screen. Therefore, a quantity of manual operations of the user may be reduced or the user does not need to perform a manual operation, to free both hands of the user, improve interaction efficiency, and improve user experience.

Specifically, the electronic device may collect a head image by using a camera module, and extract parameters such as a head feature point and a depth of field by analyzing the head image, to recognize a head action.

In another possible implementation, when detecting a voice indication used to instruct to independently display the third screen, the electronic device displays the third screen and exits the second screen. For example, when the third screen is a desktop, the voice indication may be "entering the desktop", "opening the desktop", "displaying only the desktop", or the like.

In another possible implementation, when detecting a combination of the foregoing plurality of preset conditions, the electronic device displays the third screen and exits the second screen. For example, when the time difference between the current moment and the moment at which the head information is successfully recognized is greater than or equal to the preset duration, and the included angle between the electronic device and the horizontal plane is greater than or equal to the preset angle value, the electronic device exits the second screen and displays only the third screen. For example, when the included angle between the electronic device and the horizontal plane is greater than or equal to the preset angle value, and the preset smile expression of the user is detected, the electronic device may exit the second screen and display only the third screen.

It should be noted that the foregoing description is merely an example to describe a specific implementation in which the preset condition is met in step 404, and is not intended to limit all the implementations.

When the unlock screen includes the second screen and the third screen, in step 404, the first screen may be a screen corresponding to the first control or the second control. To be specific, in this solution, the electronic device displays the lock screen before being unlocked, and displays, after being unlocked, superimposition of a "lock screen obtained after unlocking" (the second screen) and a desktop, an application screen opened before screen locking, a shortcut screen, or HiBoard (the third screen). Then, when the preset condition is met, the electronic device may display a screen corresponding to a control (for example, a notification display control) on the "lock screen obtained after unlocking", or display a screen corresponding to a control (for example, an application icon or a widget component) on a screen such as the desktop, the application screen opened before screen locking, the shortcut screen, or HiBoard. For example, the screen corresponding to the notification display control may be a detailed information display screen of notification information (for example, an SMS message or a WeChat message). The screen corresponding to the application icon is a screen corresponding to an application program corresponding to the application icon (for example, a WeChat icon or a Taobao icon).

The screen corresponding to the first control may be a first screen displayed when the electronic device detects an operation performed by the user on the second screen. The screen corresponding to the second control may be a first screen displayed when the electronic device detects an operation performed by the user on the third screen. To be specific, after the unlock screen is displayed, the user may directly operate the unlock screen obtained after unlocking, namely, the second screen, or may directly operate the third screen such as the desktop, the application screen opened before screen locking, the shortcut screen, or HiBoard, so that the user can operate both the second screen and the third screen. This directly achieves an objective of the user, and improves interaction efficiency and use experience.

After successfully recognizing the head information and being unlocked, the electronic device first displays the "lock screen obtained after unlocking" and then displays the desktop. In this case, when expecting to operate the desktop, the user needs to first slide on the screen to enter the desktop and then operate the desktop, but cannot directly "operate the desktop". After successfully recognizing the head information and being unlocked, the electronic device directly displays the desktop. In this case, the user cannot operate the "lock screen obtained after unlocking". Therefore, an objective of the user cannot be directly achieved, and the user cannot operate both the "lock screen obtained after unlocking" and the desktop.

The following specifically provides a description that the first screen is the screen corresponding to the first control or the screen corresponding to the second control.

When the unlock screen includes the second screen and the third screen, in a second solution in step 404, if the electronic device detects a preset operation on the first control, the electronic device displays the screen corresponding to the first control. If the electronic device detects a preset operation on the second control, the electronic device displays the screen corresponding to the second control. The preset operation on the first control or the second control is an operation preset for and supported by an application program corresponding to the control. In this solution, the screen corresponding to the first control is an application screen corresponding to the first control, and the screen corresponding to the second control is an application screen corresponding to the second control. For example, when the first control is an SMS message notification display control on the second screen, the preset operation on the first control may be a first preset operation used to open SMS message notification details, for example, a tap operation, a press operation, a touch and hold operation, or a voice operation, and the screen corresponding to the first control is an SMS message details display screen. When the second control is a WeChat icon on the third screen, the preset operation on the second control may be a second preset operation used to open a WeChat application screen, for example, a tap operation, a press operation, a touch and hold operation, or a voice operation, and the screen corresponding to the second control is a WeChat application screen.

When an area in which the first control is located overlaps an area in which the second control is located in a plane in which the screen is located, the first preset operation on the first control may be different from the second preset operation on the second control. For example, when the preset operation on the first control is a tap operation, the preset operation on the second control may be an operation that is different from the tap operation, such as a press operation or a touch and hold operation.

Figures 1A, 15:
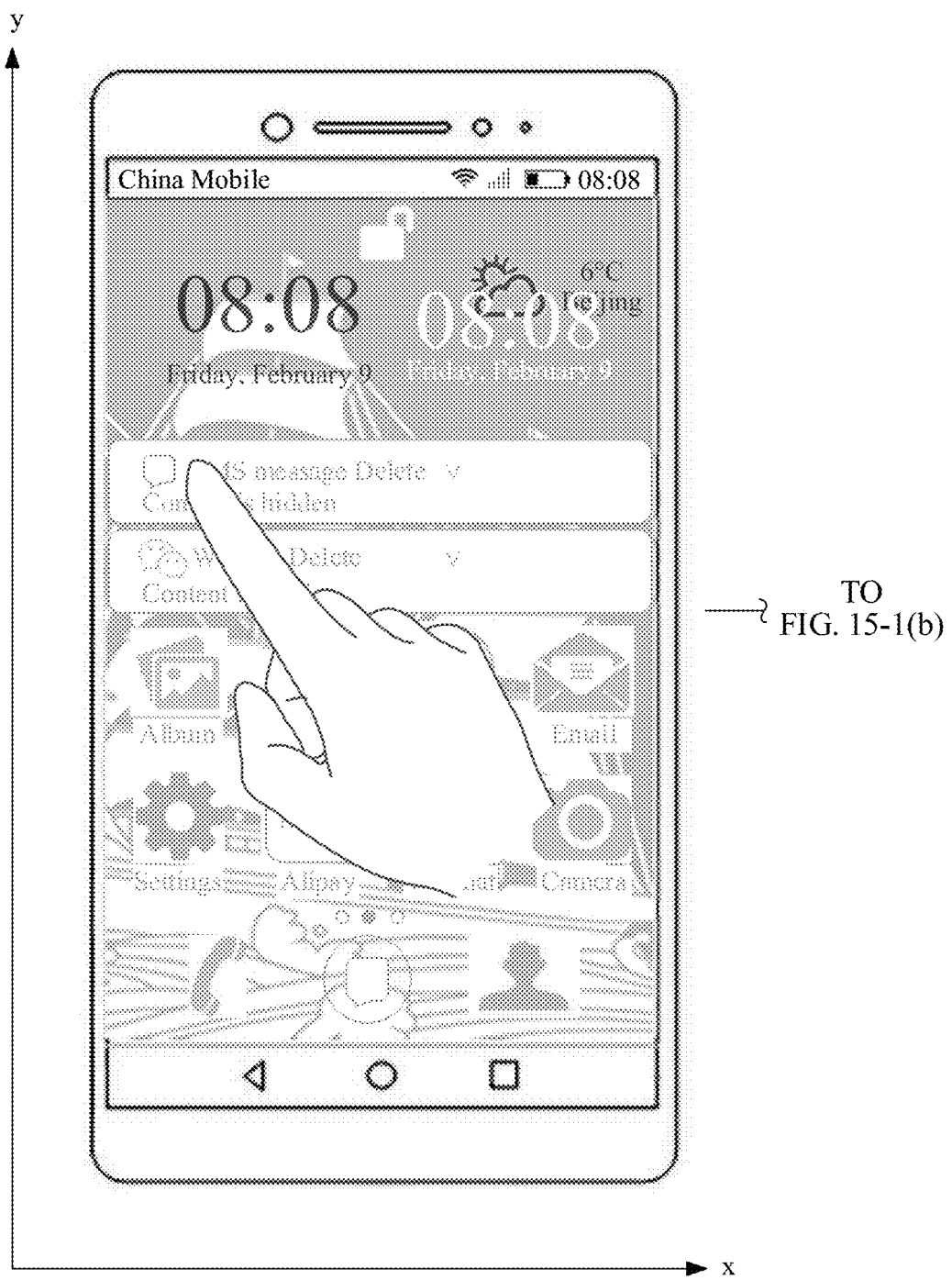
Figures 1B, 15:
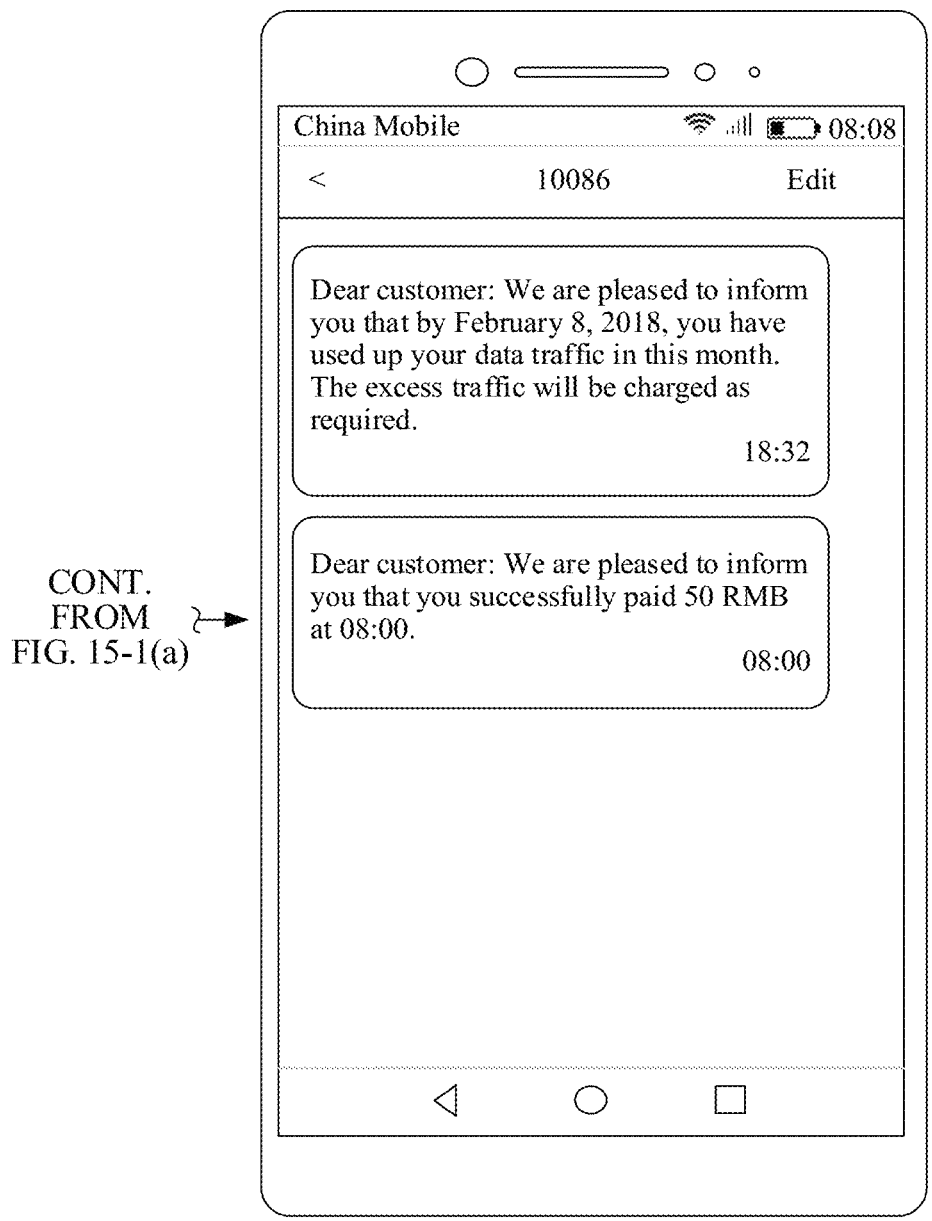
Figures 2A, 15:
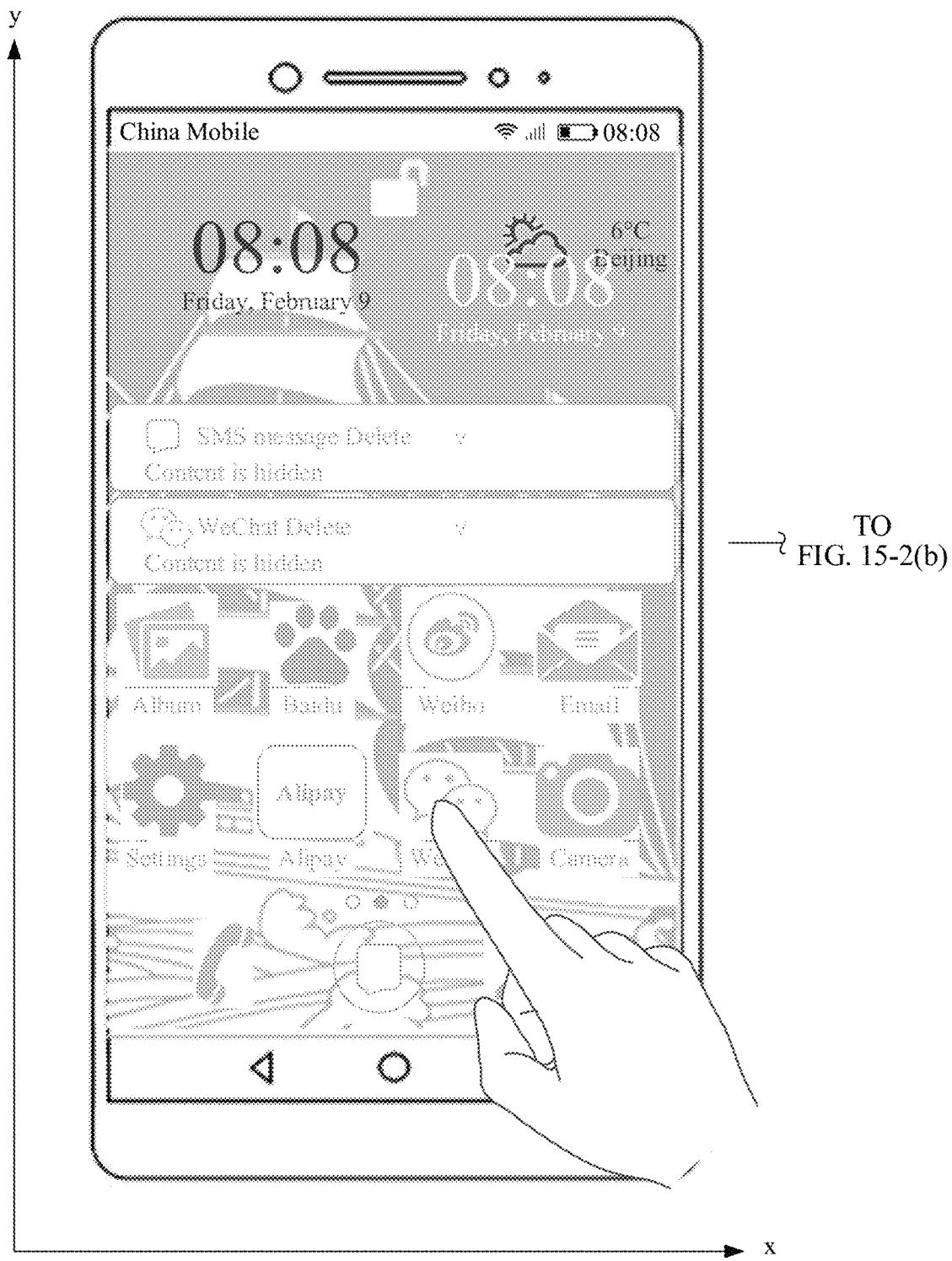
Figures 2B, 15:
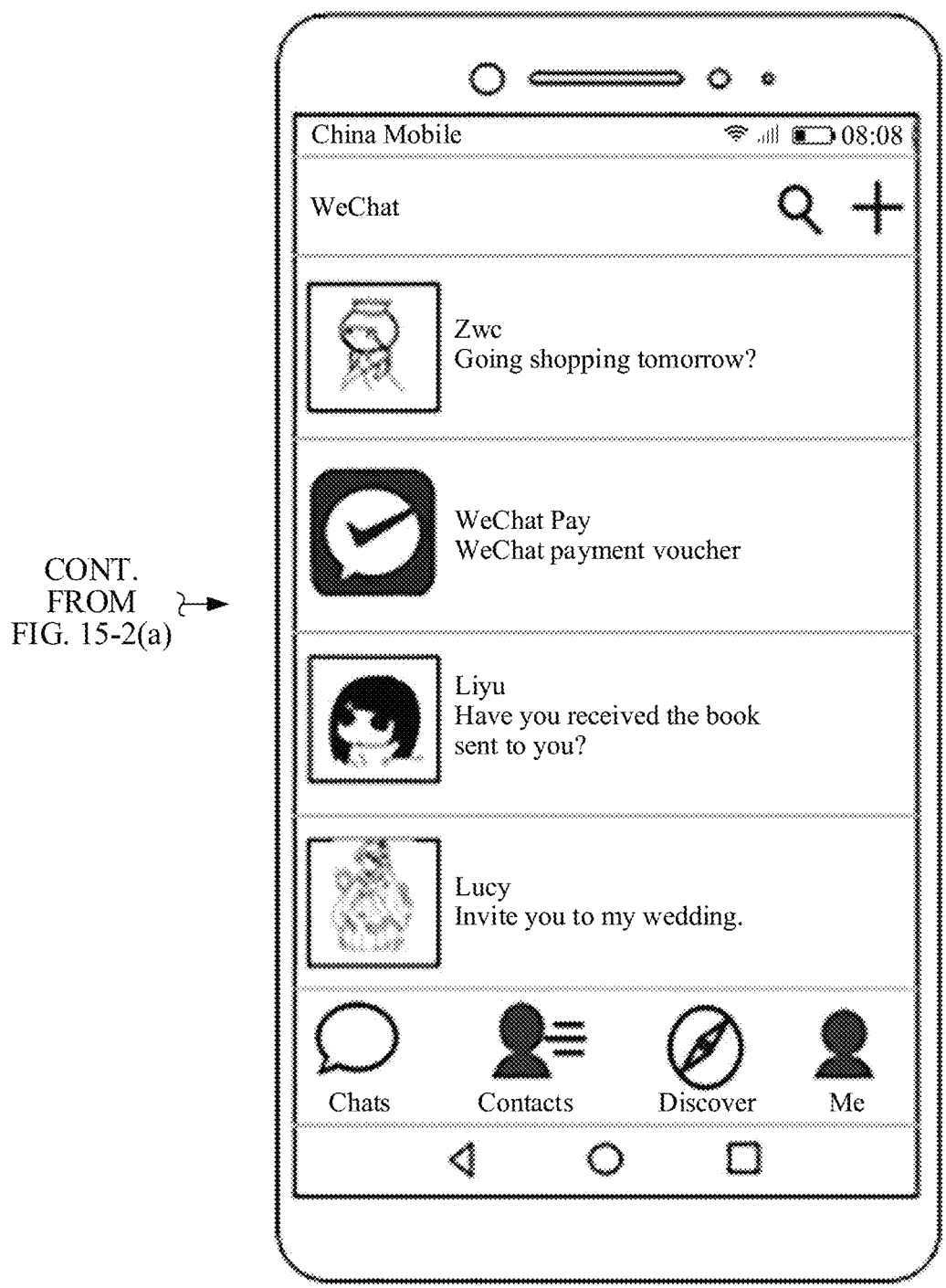
Figures 3A, 15:
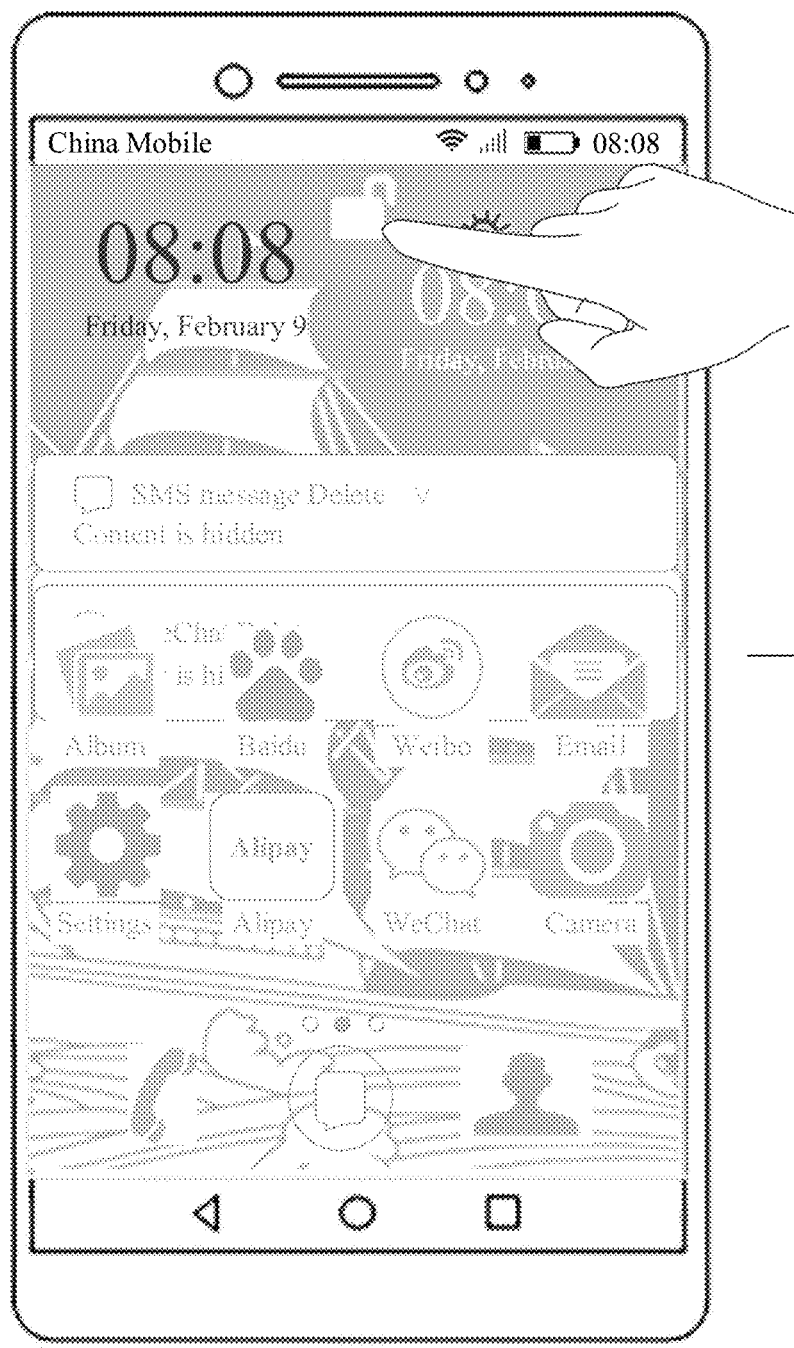
Figures 3B, 15:
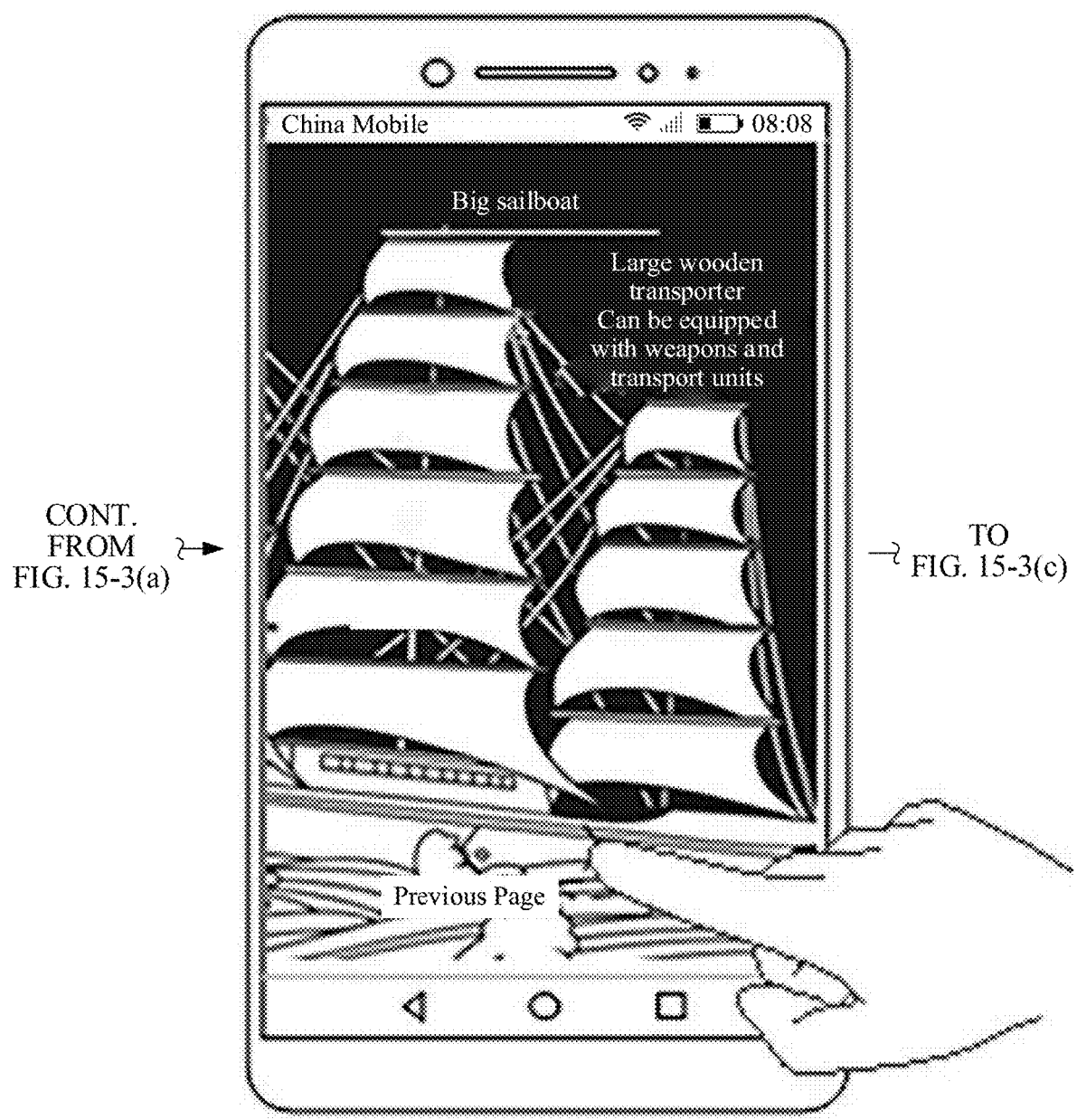
Figures 3C, 15:
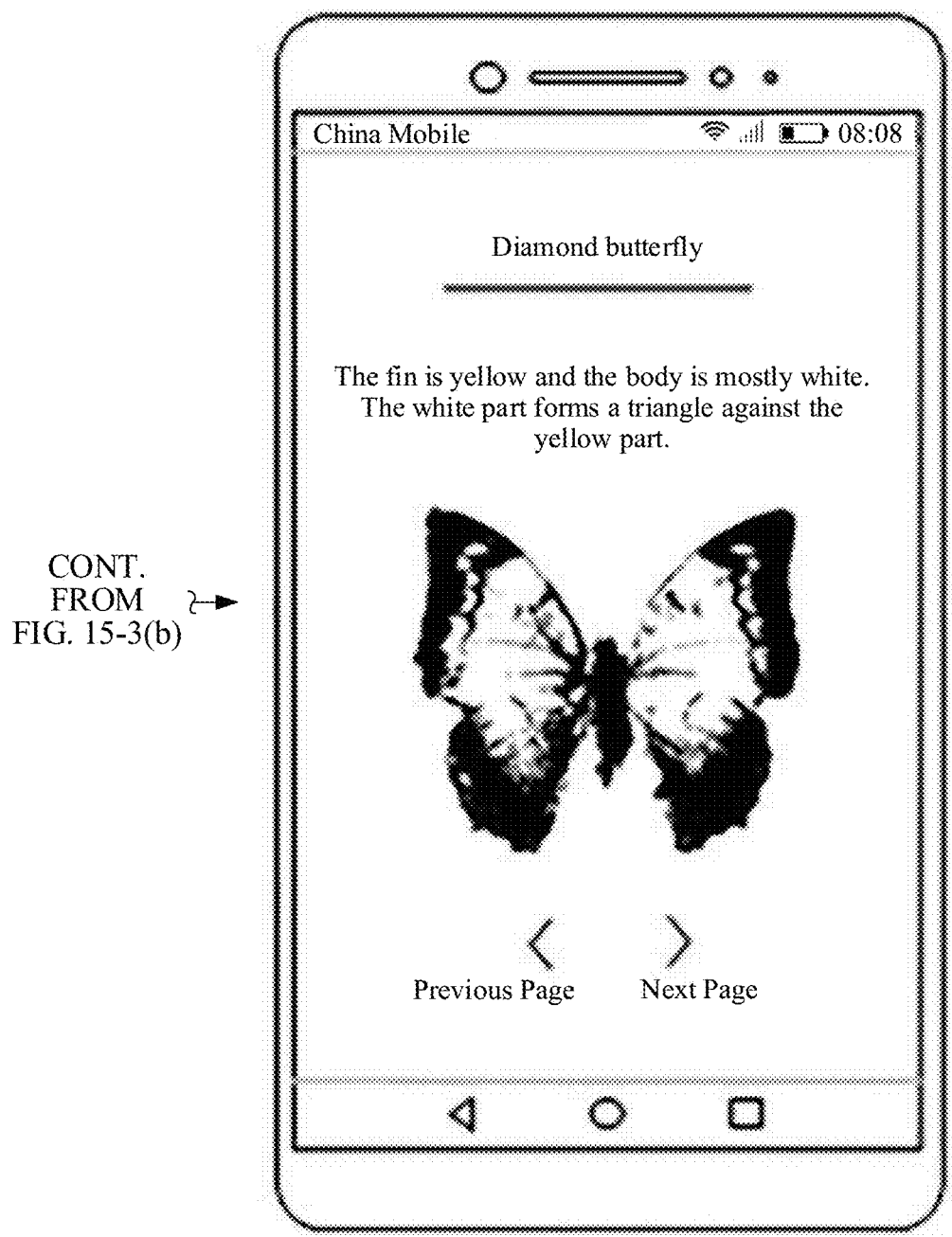

For example, referring to FIG. 15-1(*a*) and FIG. 15-1(*b*), there is no intersection between an SMS message notification control, namely, the first control, and a WeChat icon, namely, the second control, in an x-y plane. When the electronic device detects a preset operation of tapping the SMS message notification control by the user, the electronic device displays an SMS message details screen. Referring to FIG. 15-2(*a*) and FIG. 15-2(*b*), when the electronic device detects a preset operation of tapping the WeChat icon by the user, the electronic device displays a WeChat application screen. The first preset operation is the same as the second preset operation, and both are tap operations.

Figure 3:
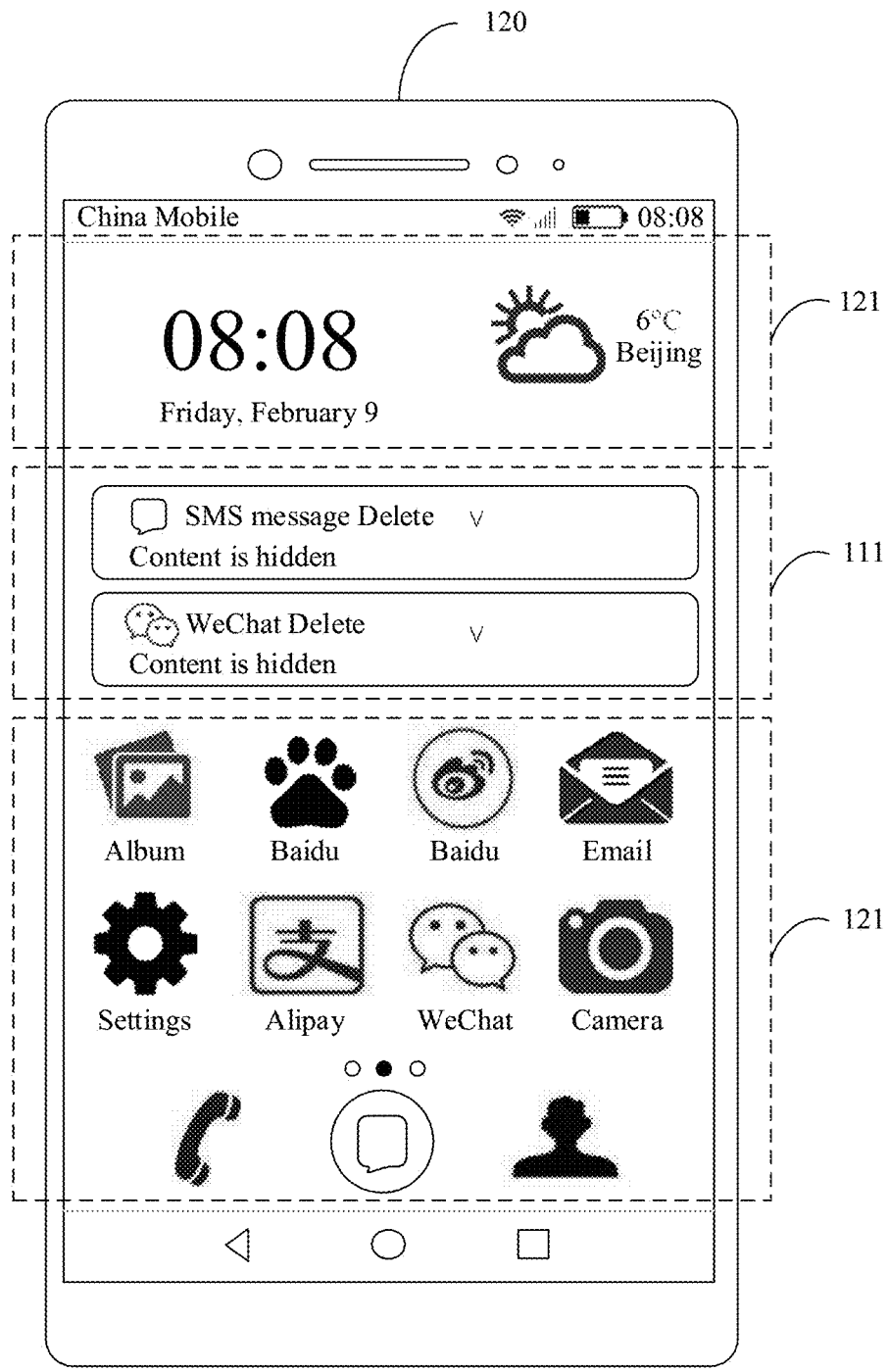
FIG. 3 is a schematic diagram of an unlock screen according to an embodiment of this application.

In addition, referring to FIG. 15-3(*a*), FIG. 15-3(*b*), and FIG. 15-3(*c*), when the first control is a pattern of an unlocked lock on the second screen, the preset operation on the first control may be a first preset operation used to open a lock screen magazine. The electronic device may display a lock screen magazine screen when detecting the first preset operation. The pattern of the lock may be replaced with a floating ball or another pattern. This is not specifically limited in this embodiment of this application.

Figures 2A, 5:
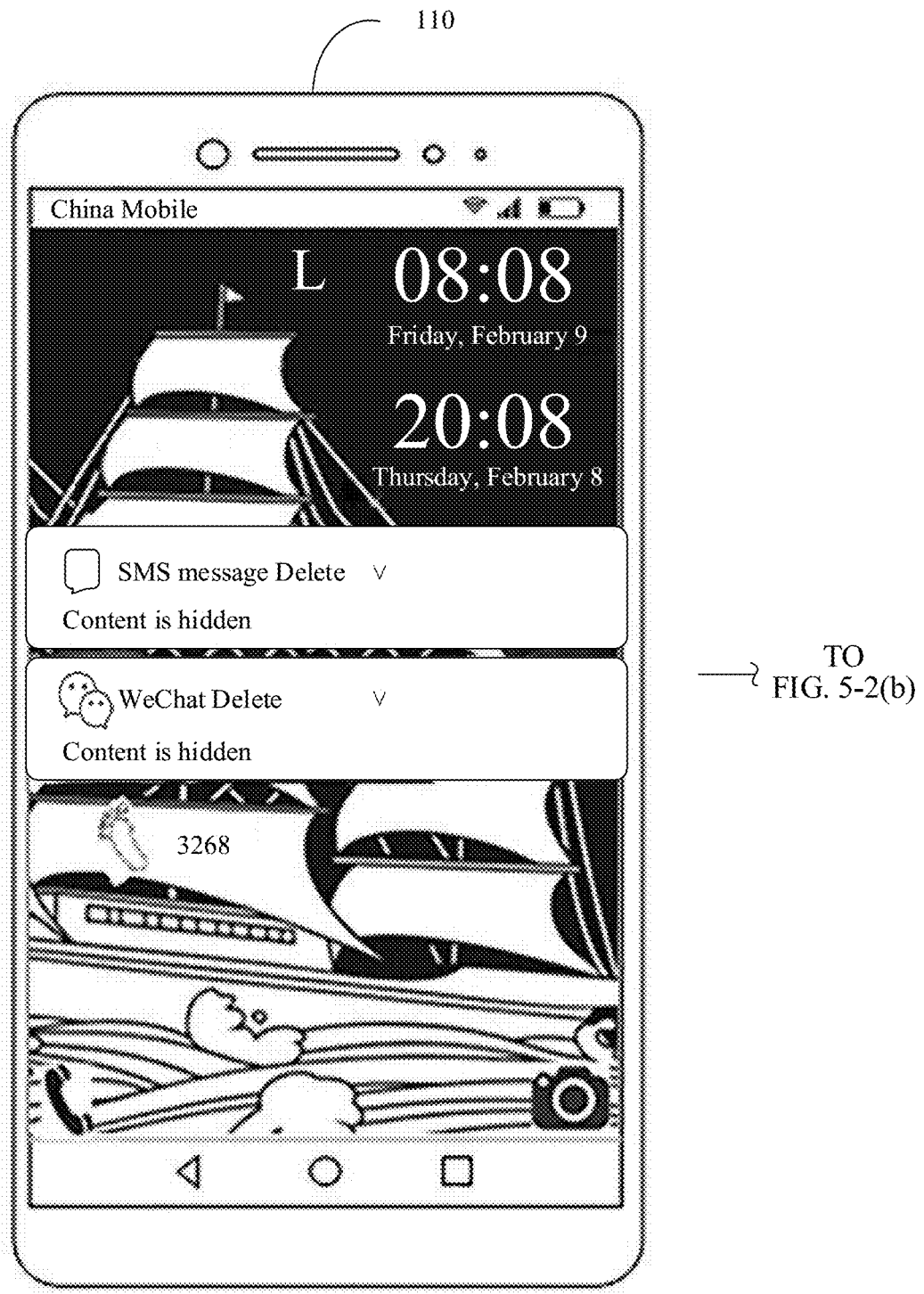
Figures 2B, 5:
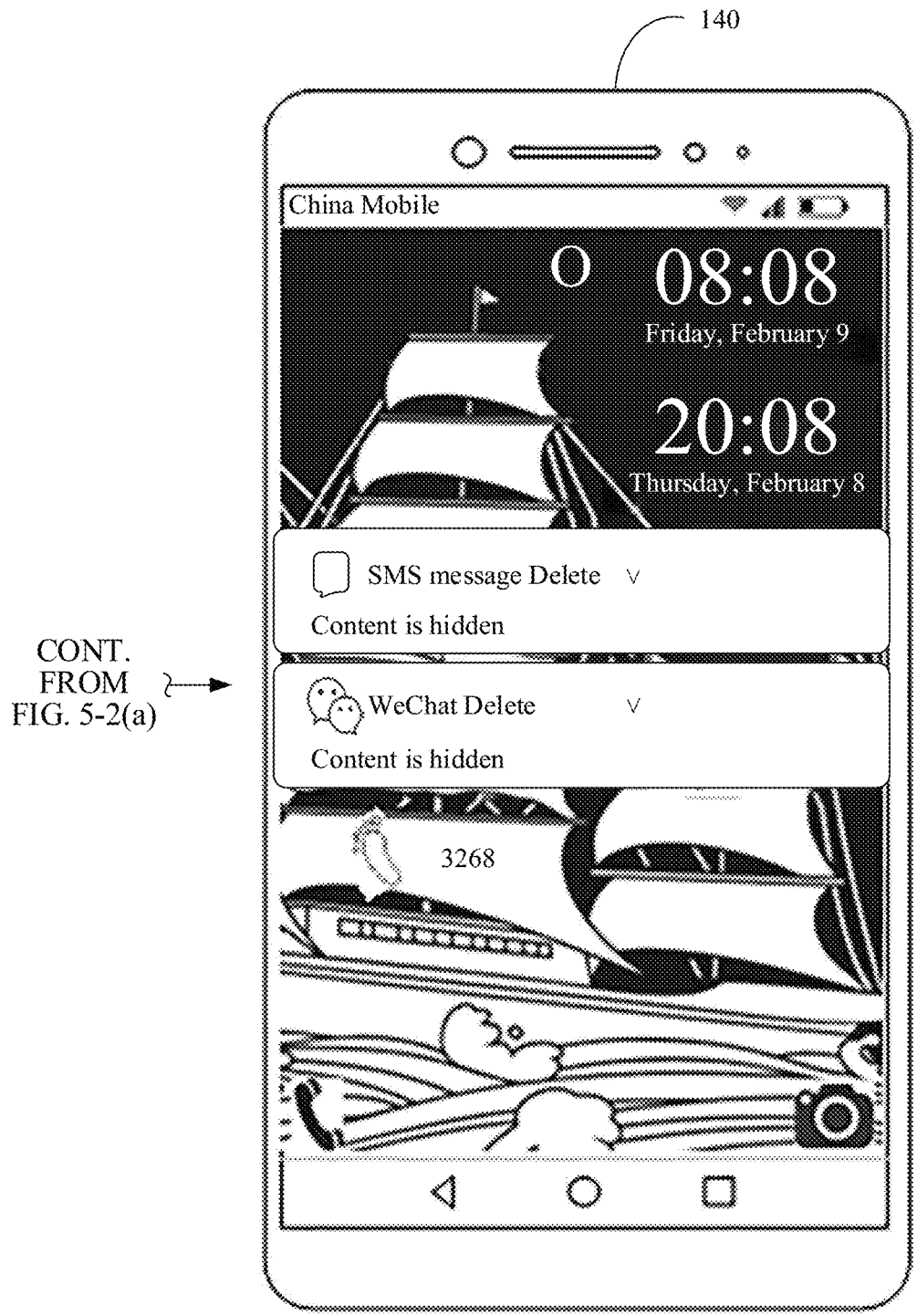
Figures 1A, 16:
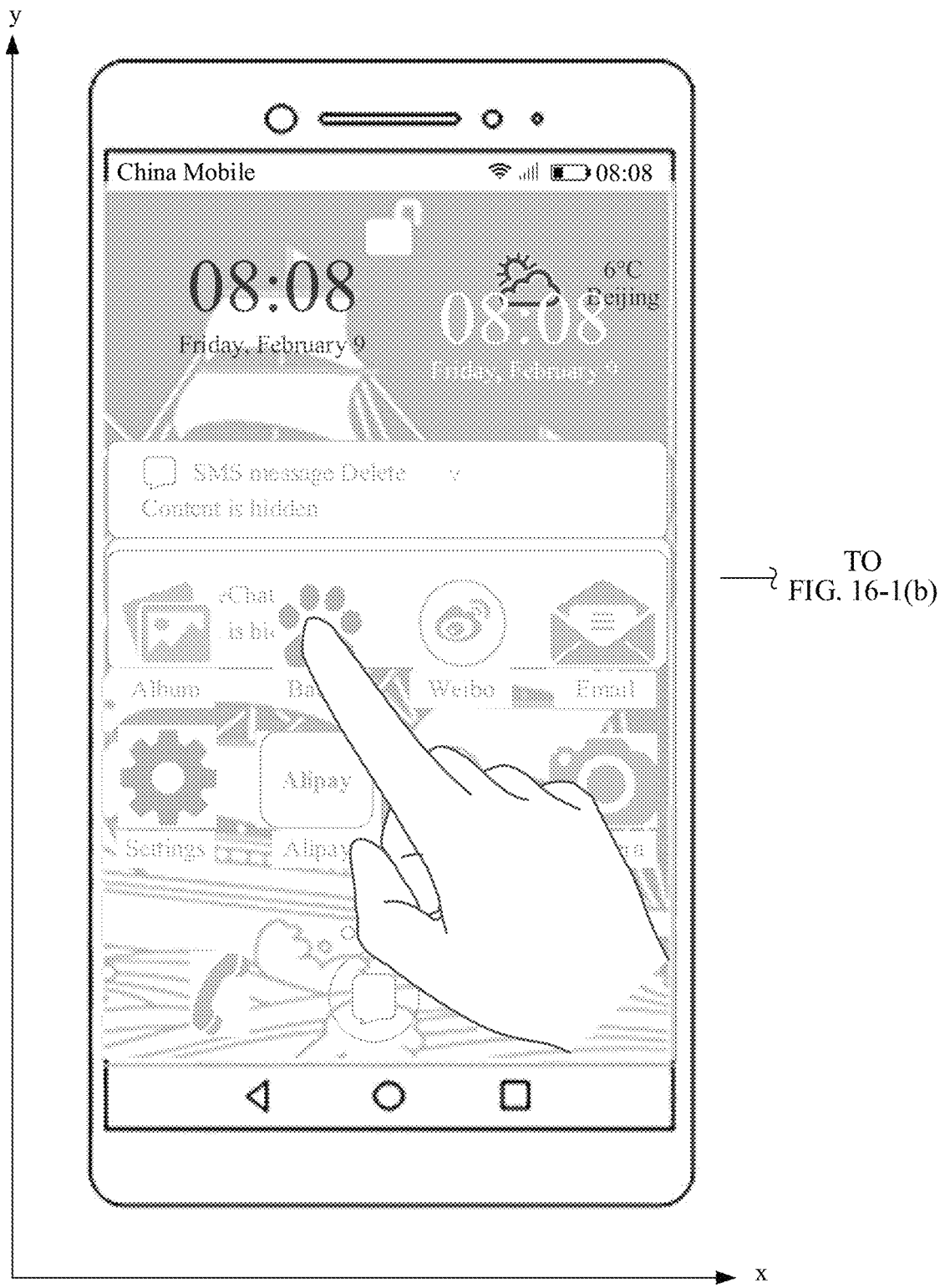
Figures 1B, 16:
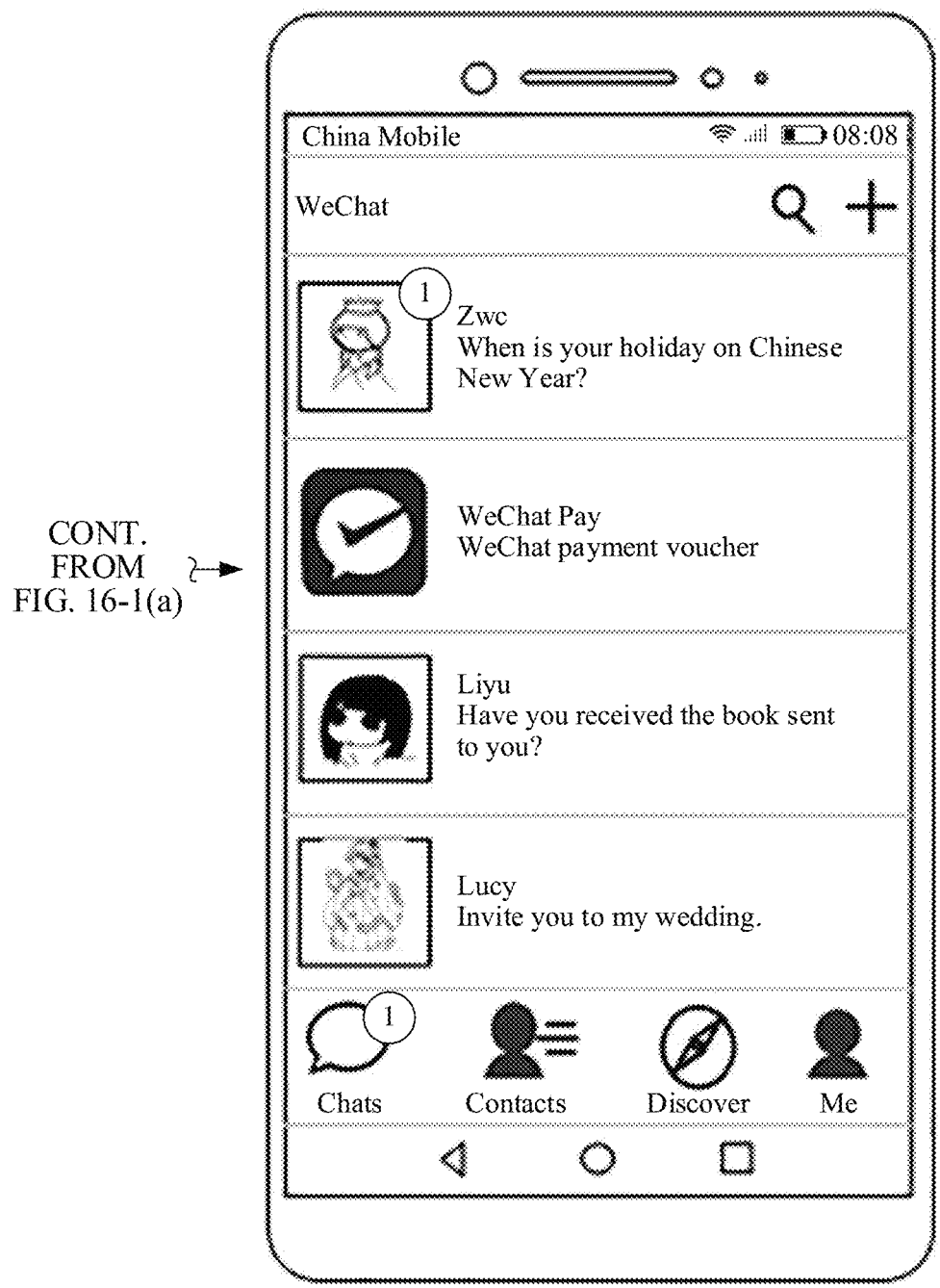
Figures 2A, 16:
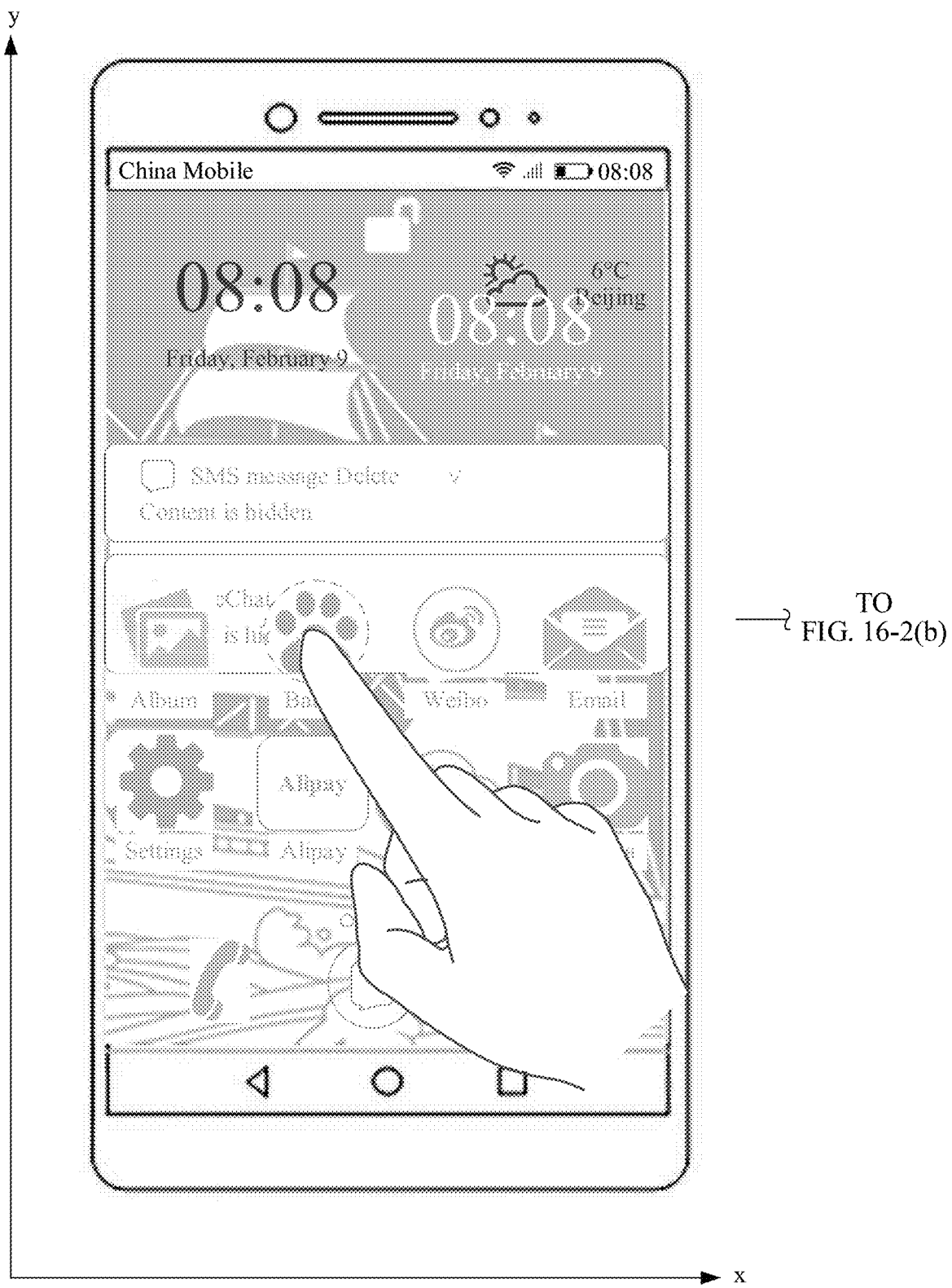
Figures 2B, 16:
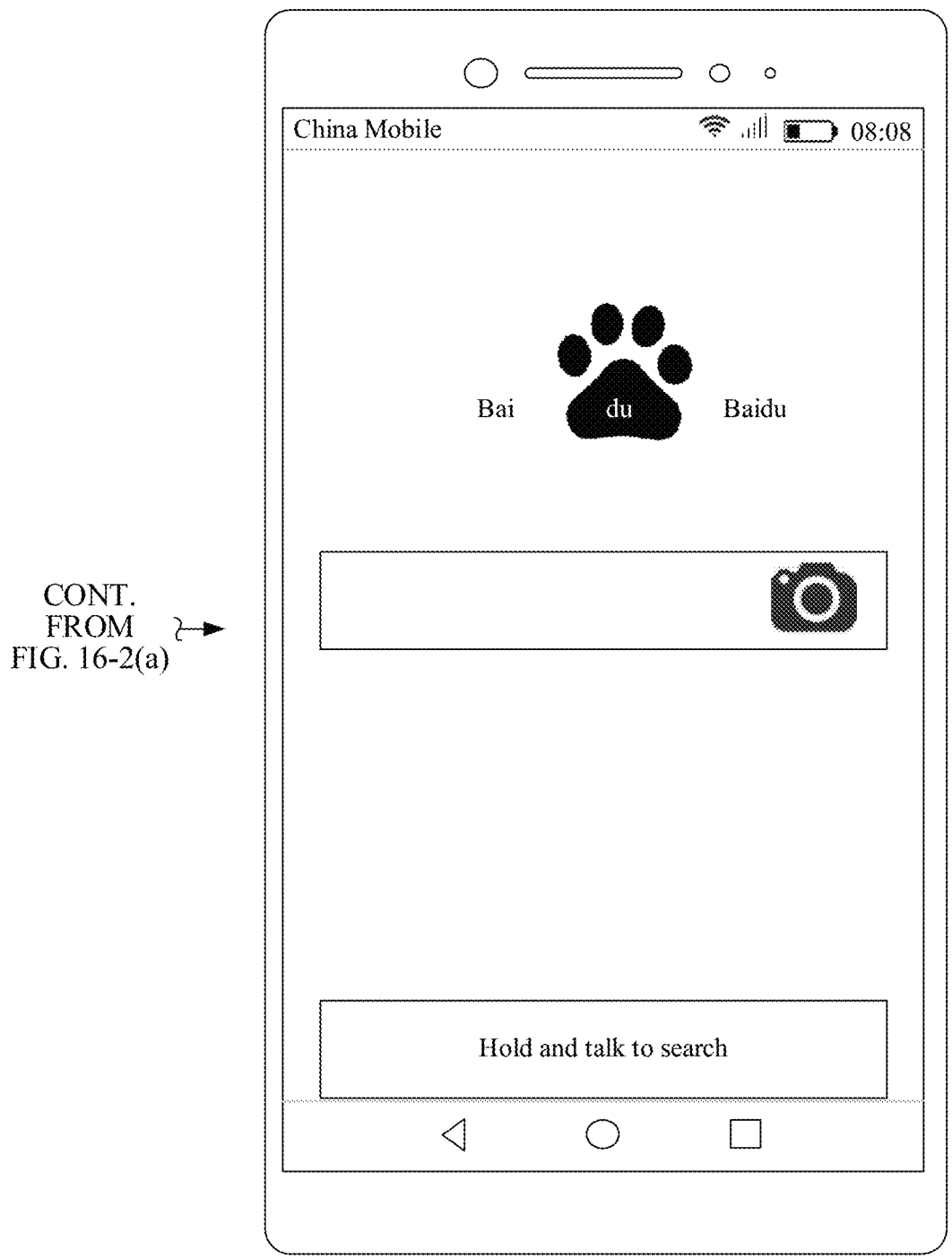

For example, referring to FIG. 16-1(a) and FIG. 16-1(b), there is an intersection between a WeChat notification control, namely, the first control, and a Baidu icon, namely, the second control, in an x-y plane. When the electronic device detects a preset operation of tapping the WeChat notification control by the user, the electronic device displays a WeChat notification screen. Referring to FIG. 16-2(a) and FIG. 16-2(b), when the electronic device detects a preset operation of pressing or touching and holding the Baidu icon by the user, the electronic device displays a Baidu application screen. The first preset operation is different from the second preset operation.

When the unlock screen includes the second screen and the third screen, the screen corresponding to the first control may be further a screen corresponding to the second screen on which the first control is located, and the screen corresponding to the second control may be further a screen corresponding to the third screen on which the second control is located. In a third solution in step 404, if the electronic device detects a preset operation on the second screen on which the first control is located, the electronic device displays the screen corresponding to the second screen. If the electronic device detects a preset operation corresponding to the third screen on which the second control is located, the electronic device displays the screen corresponding to the third screen.

Figures 1A, 17:
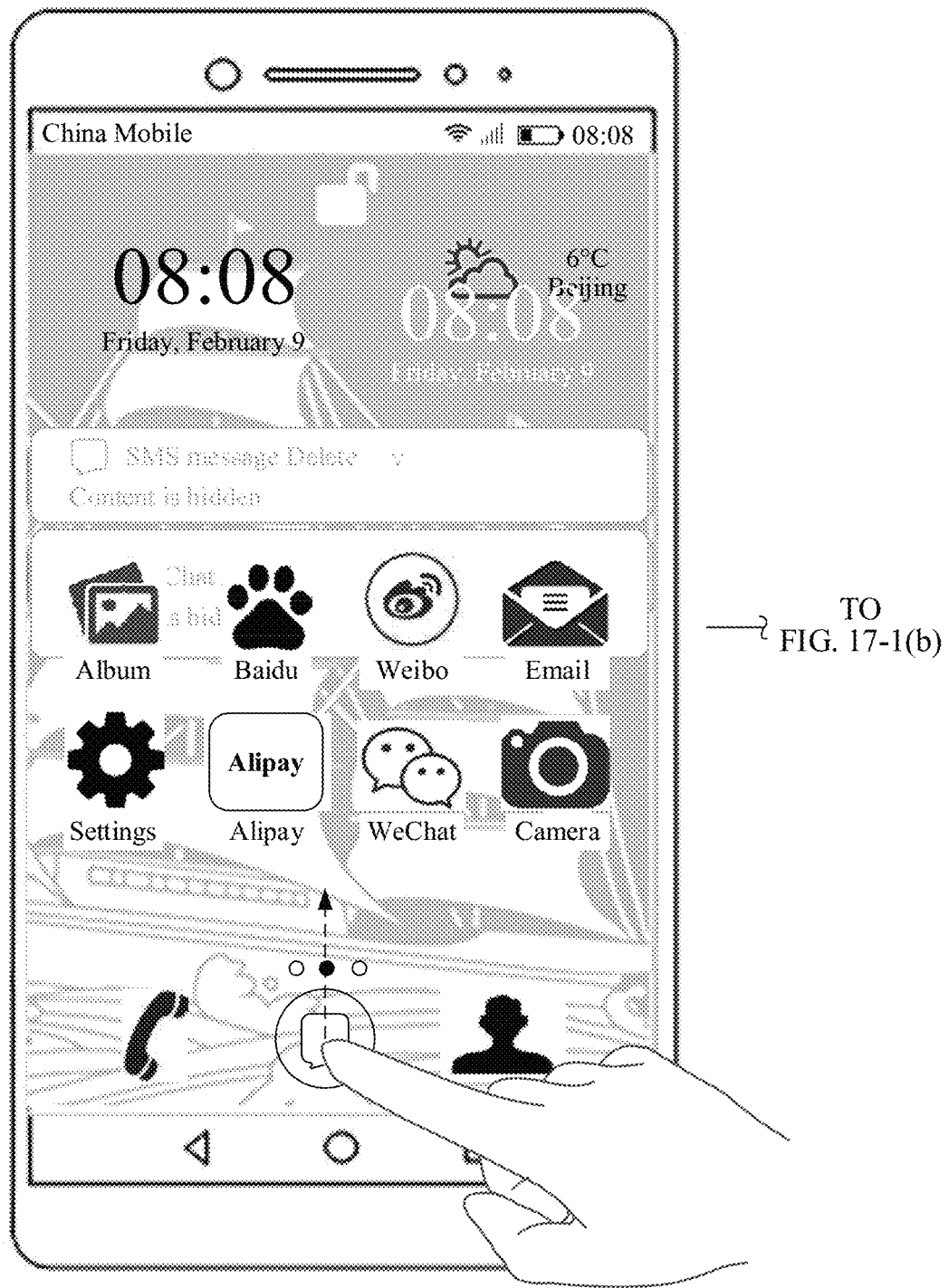
Figures 1B, 17:
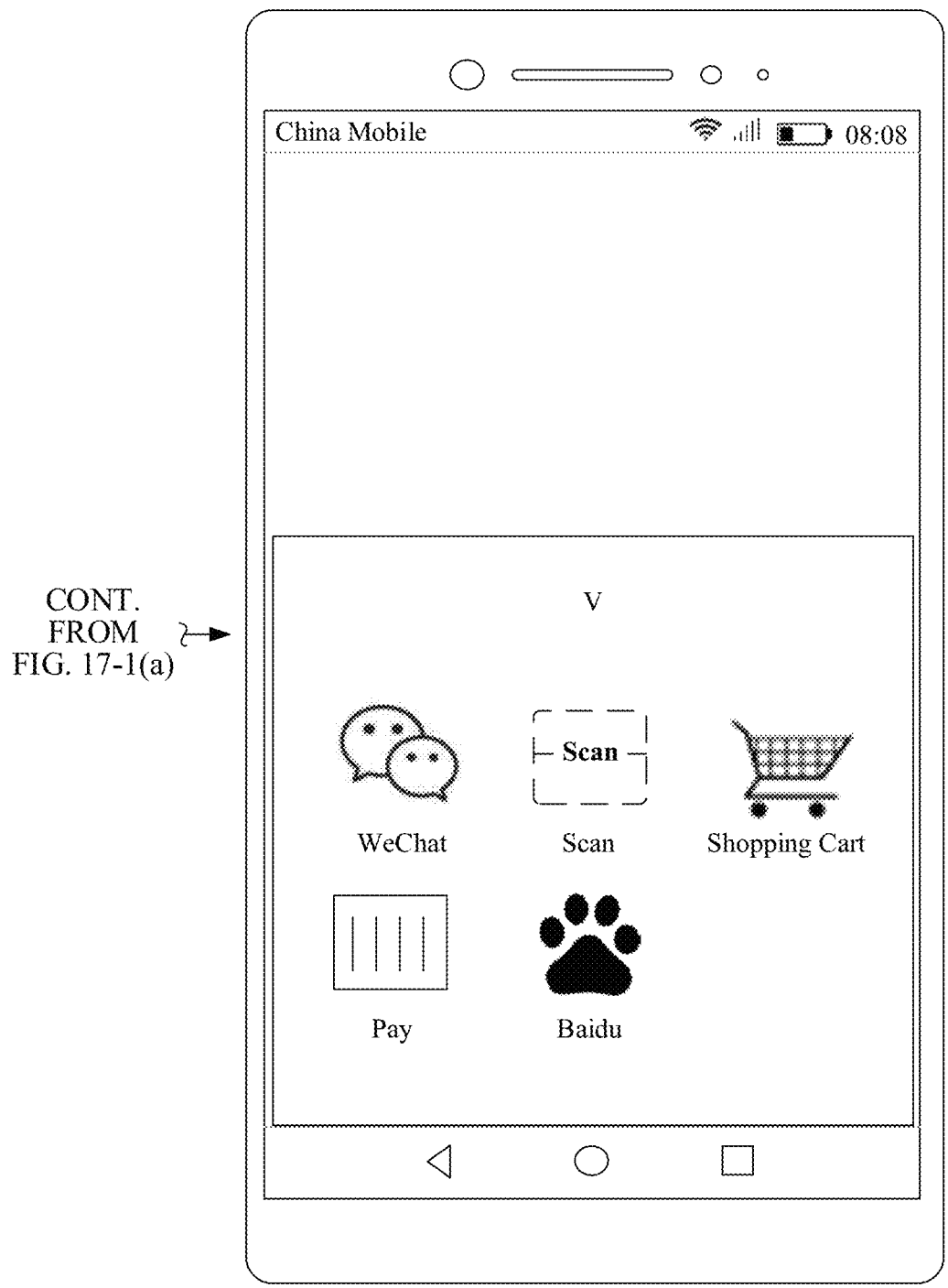
Figures 2A, 17:
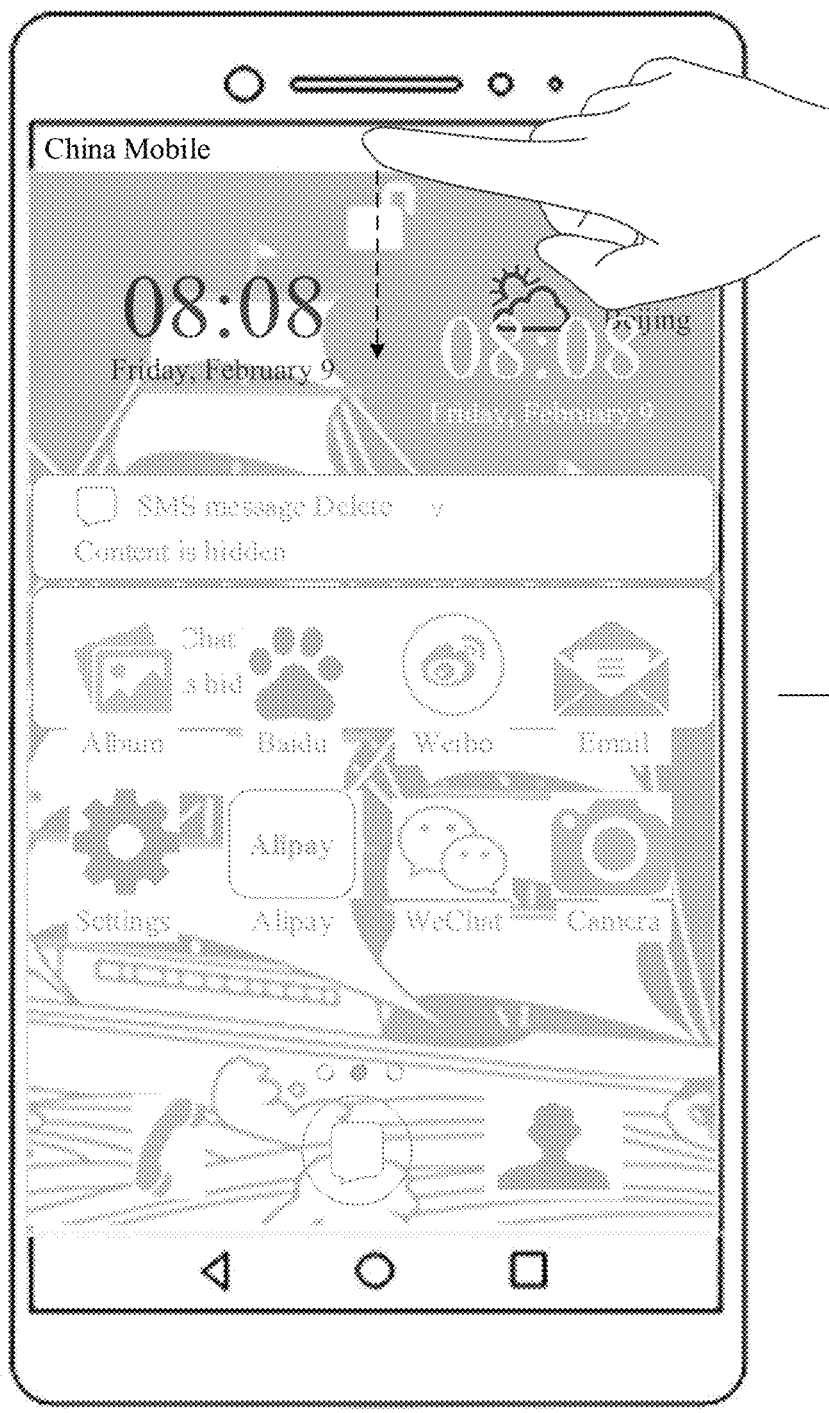
Figures 2B, 17:
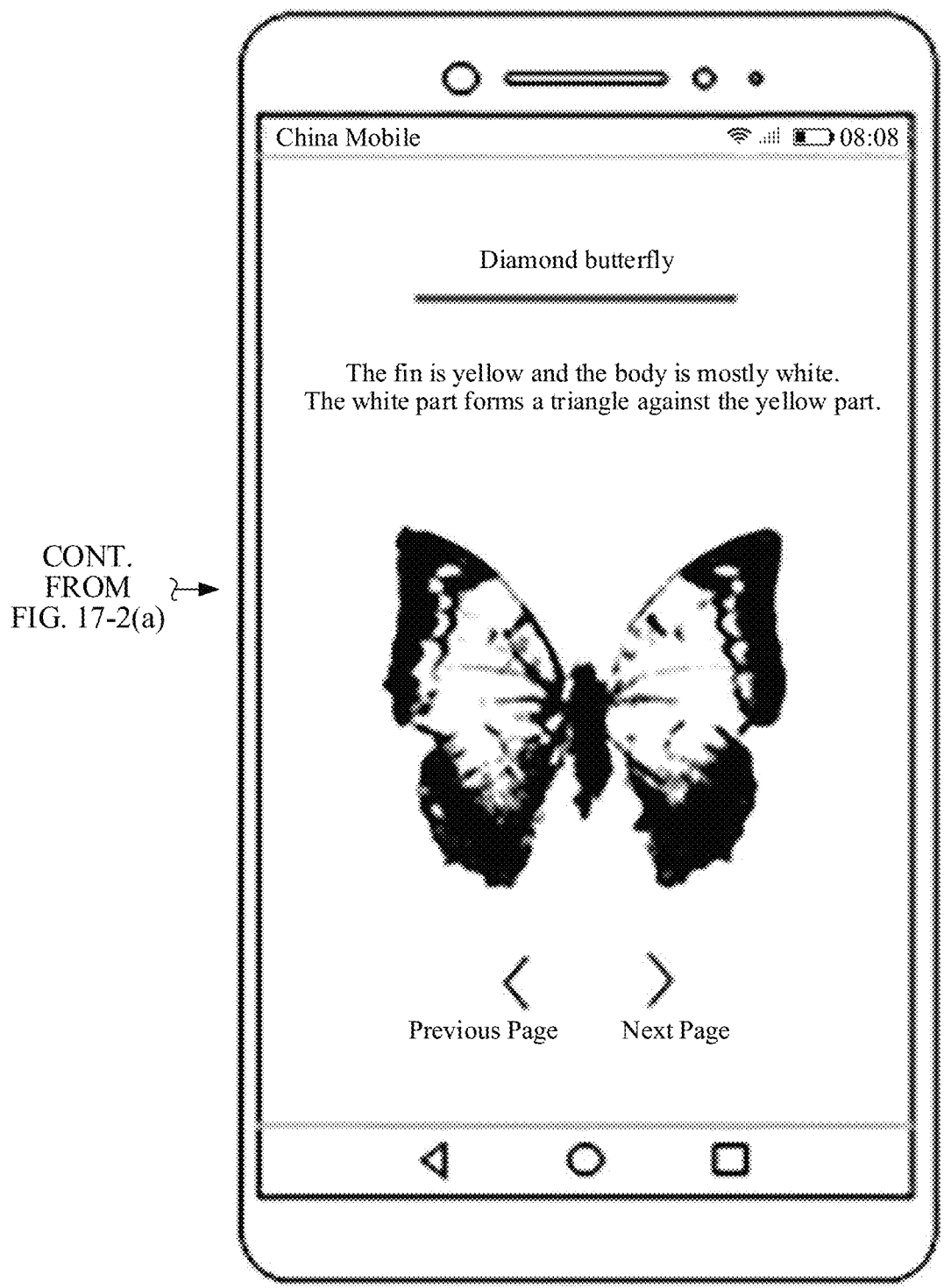
Figures 3A, 17:
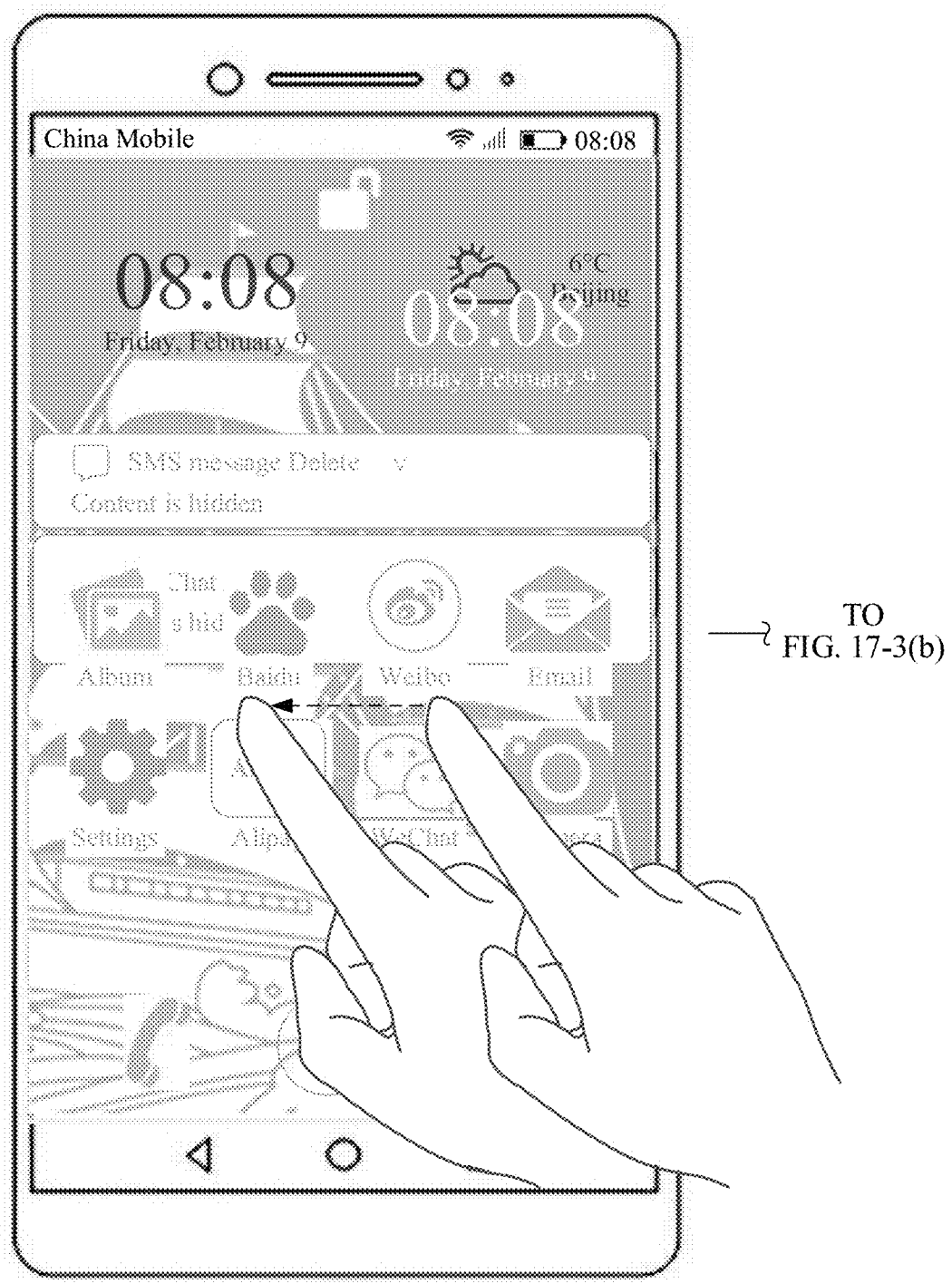
Figures 3B, 17:

The preset operation on the screen may include an operation supported on the second screen or the third screen, such as sliding, pull-down (single-finger pull-down, multi-finger pull-down), or pull-up. For example, a left swipe operation on the second screen may be used to exit the second screen, so as to display a desktop or an application screen opened before screen locking. For example, referring to FIG. 17-1(a) and FIG. 17-1(b), a pull-up operation on the second screen may be used to open a shortcut screen. Referring to FIG. 17-2(a) and FIG. 17-2(b), a pull-down operation on the second screen may be used to open a lock screen magazine screen or the like. For another example, when the third screen is a desktop, a left swipe operation on the third screen may be used to switch the desktop, and a right swipe operation on the third screen may be used to open HiBoard. The preset operation on the third screen may be different from the preset operation on the second screen.

Figures 1A, 9:
Figures 1B, 9:
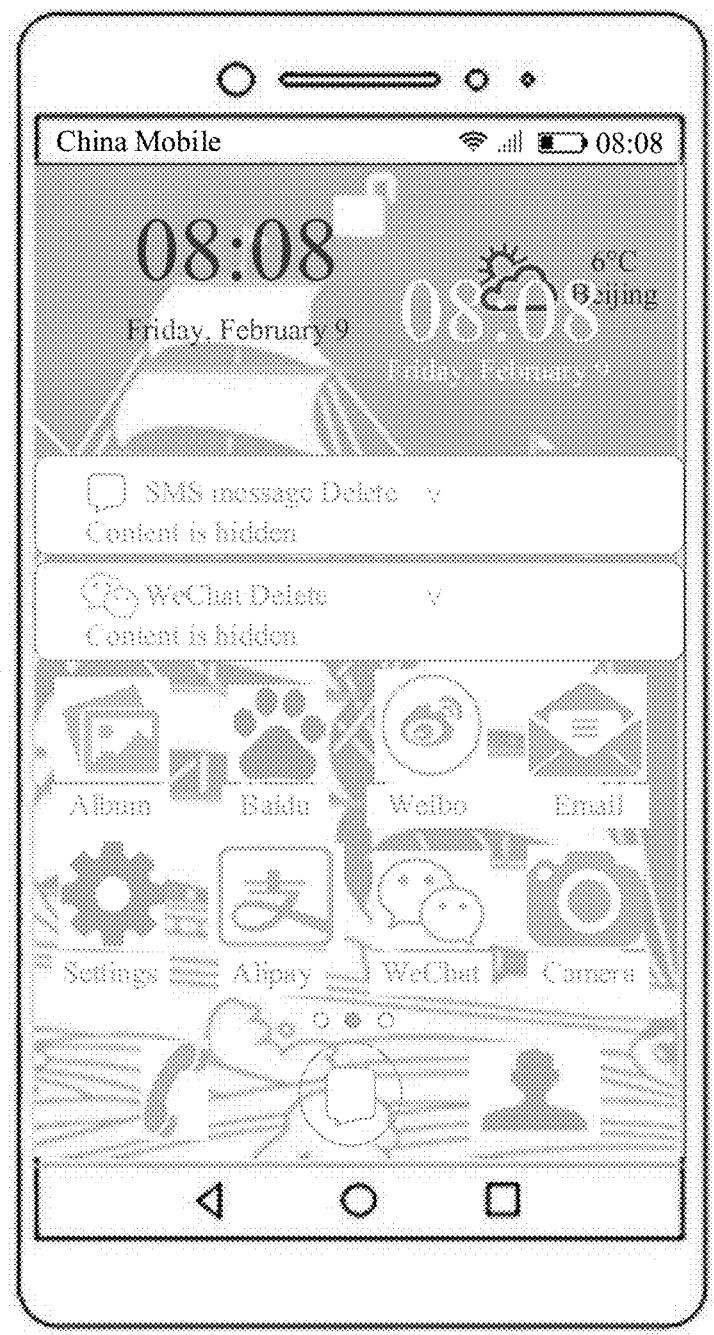
Figures 1C, 9:
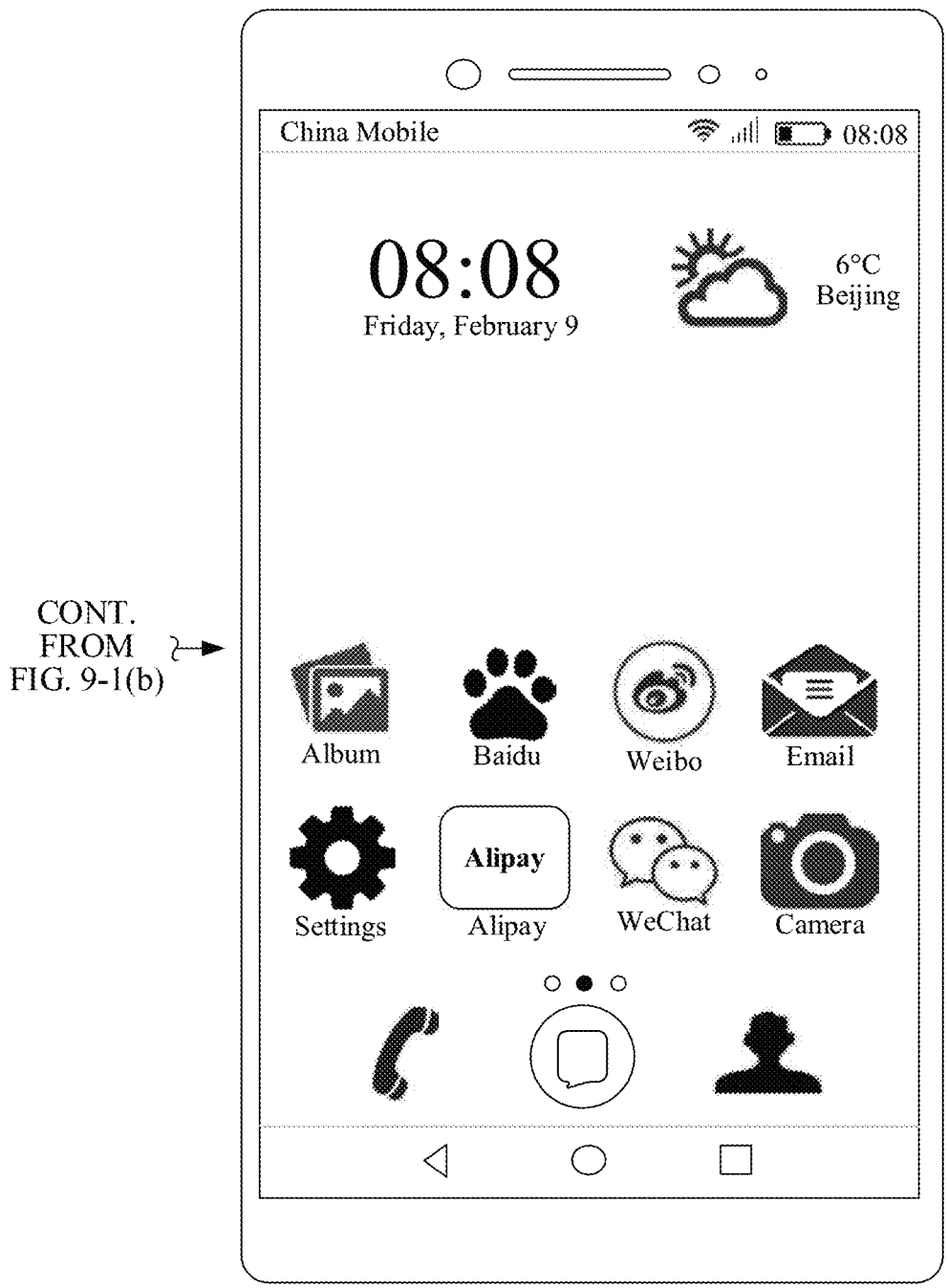
Figures 2A, 9:
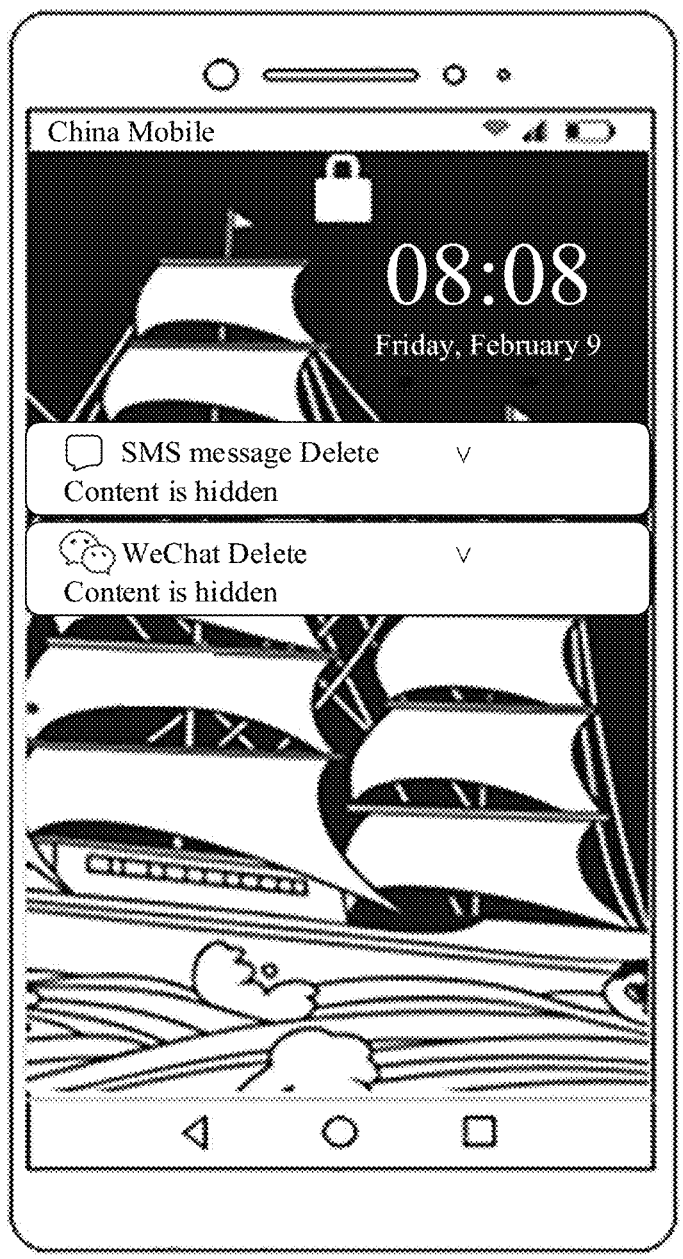
Figures 2B, 9:
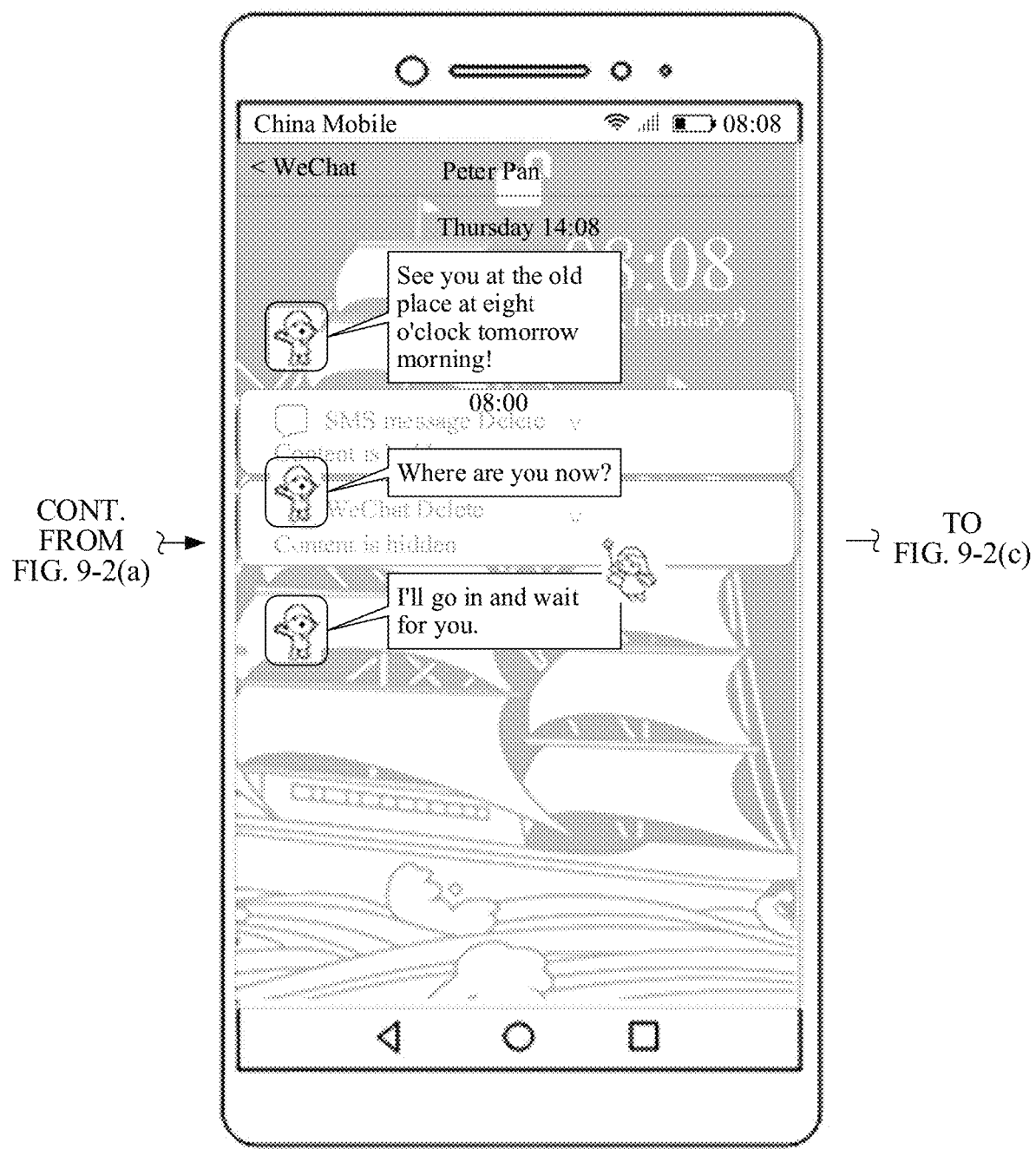
Figures 2C, 9:
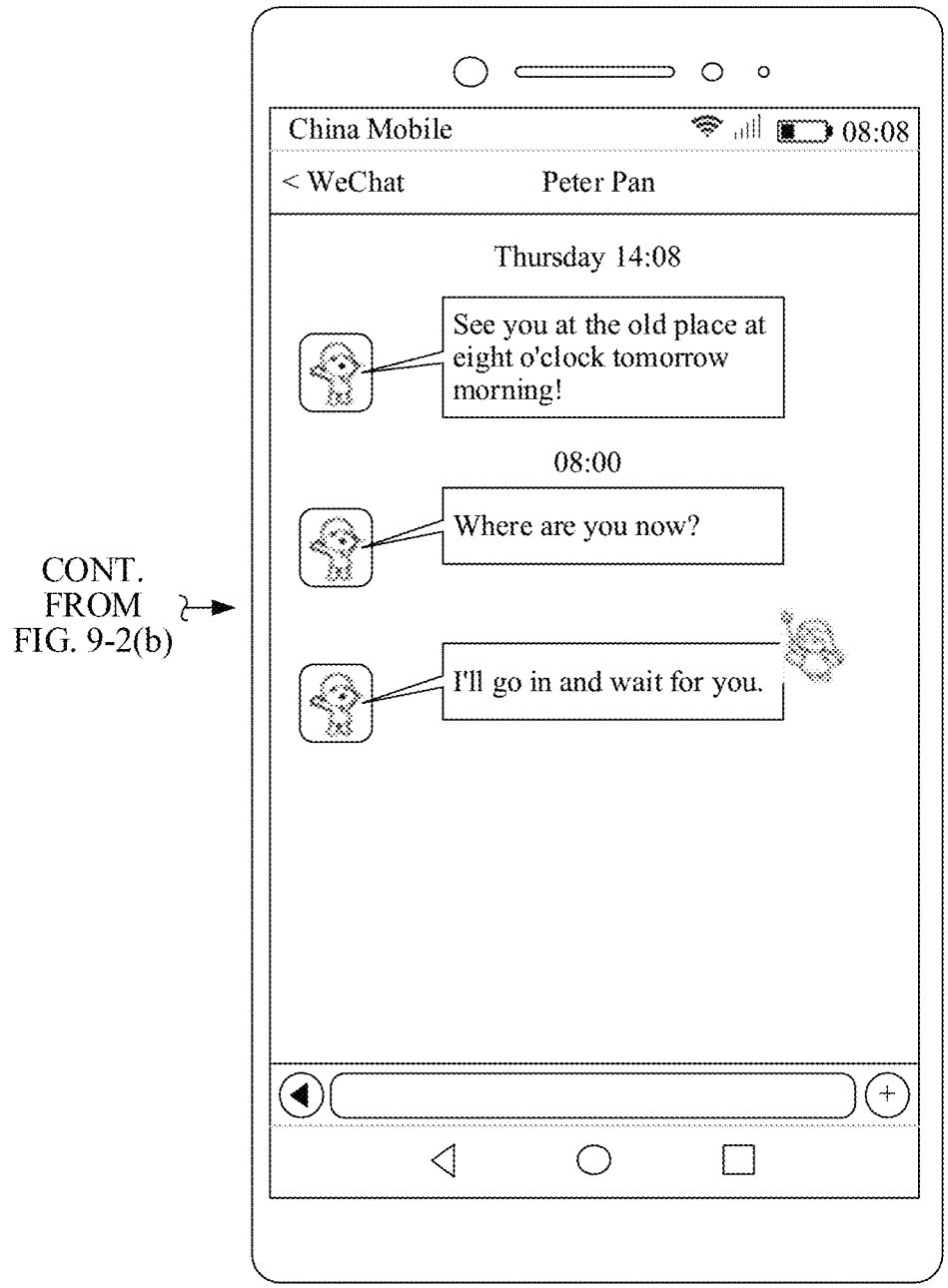
Figures 3A, 9:
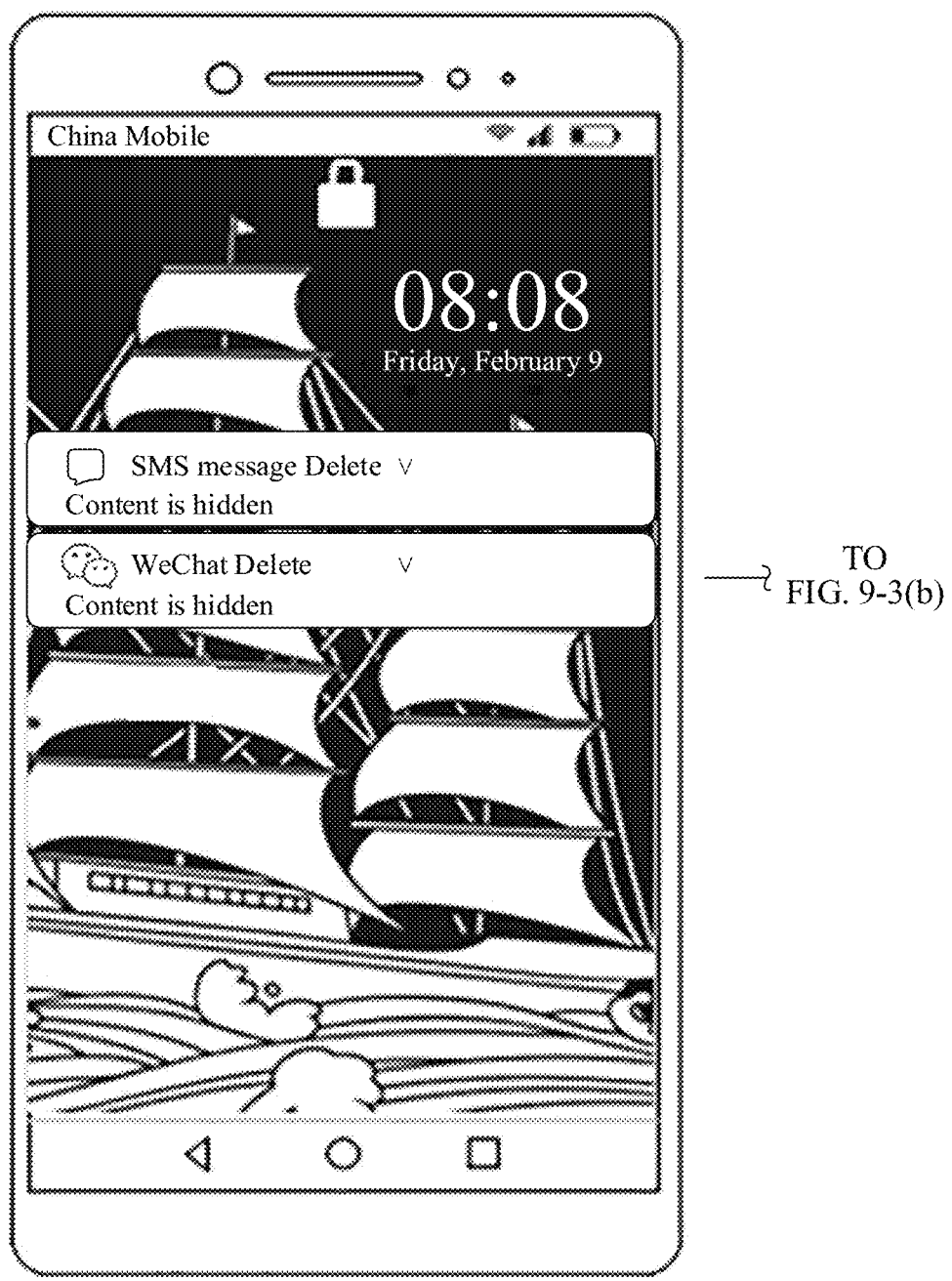
Figures 3B, 9:
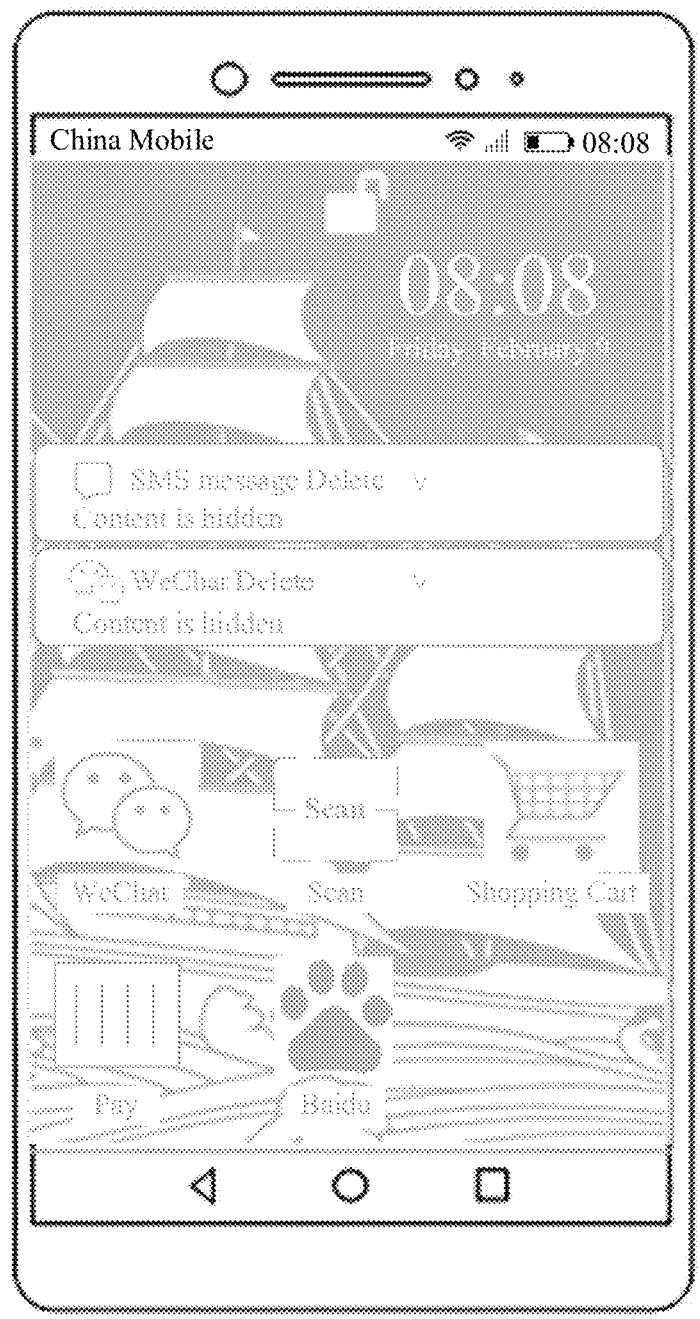
Figures 3C, 9:
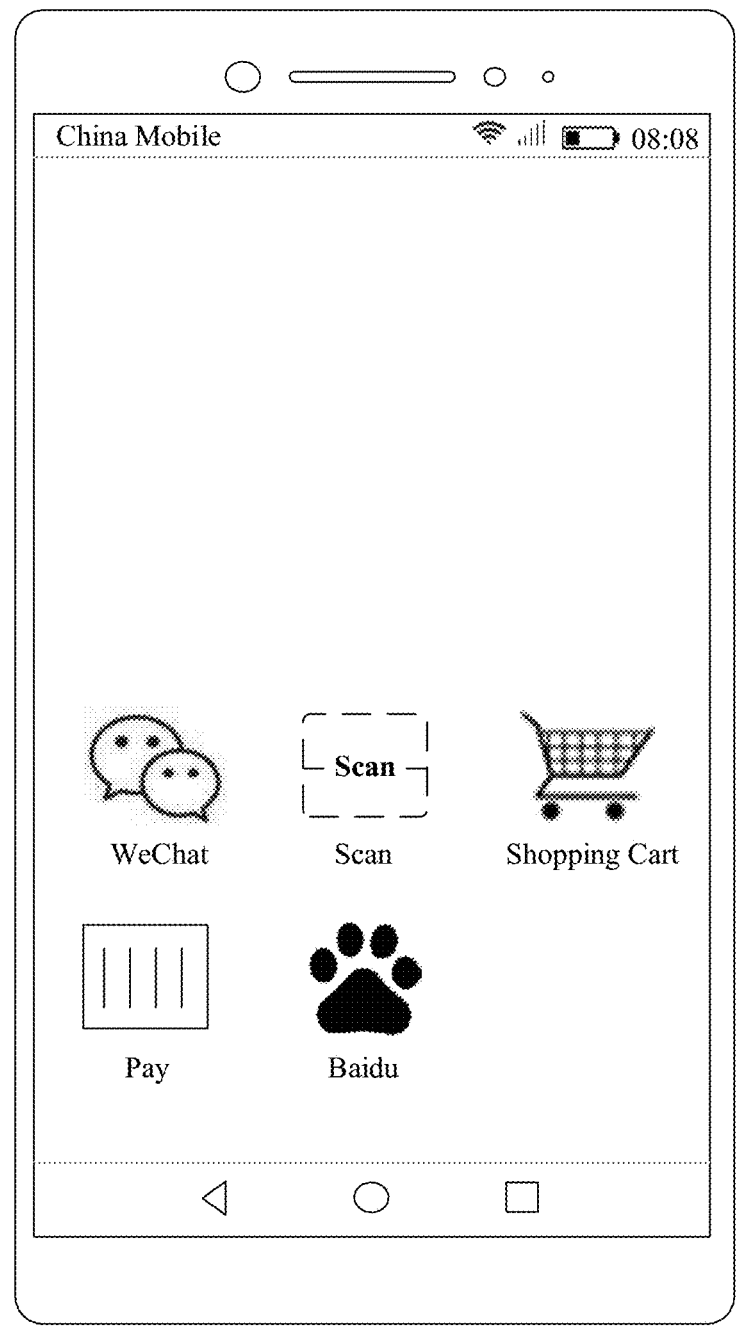
Figure 10A:
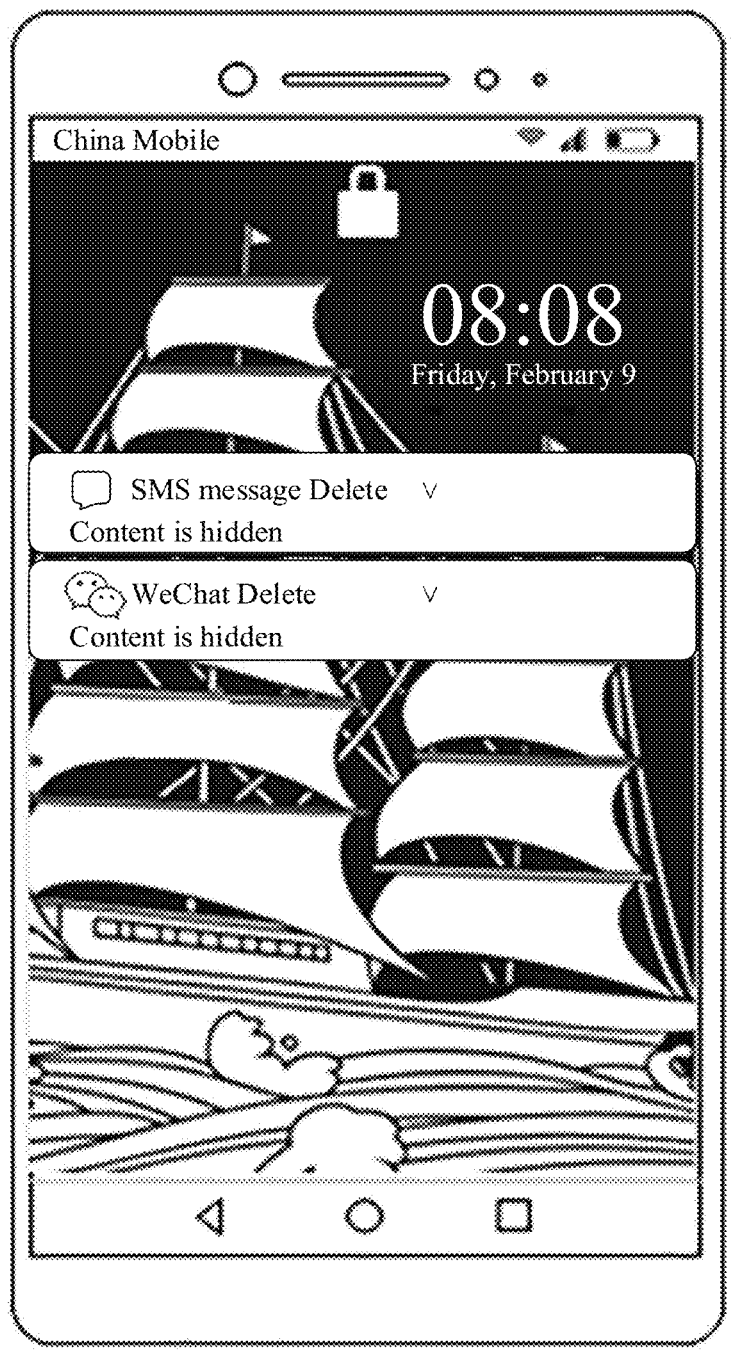
FIG. 10(a) to FIG. 10(d) are a schematic diagram of another group of screens according to an embodiment of this application.
Figure 10D:
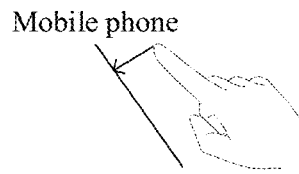
Figure 10B:
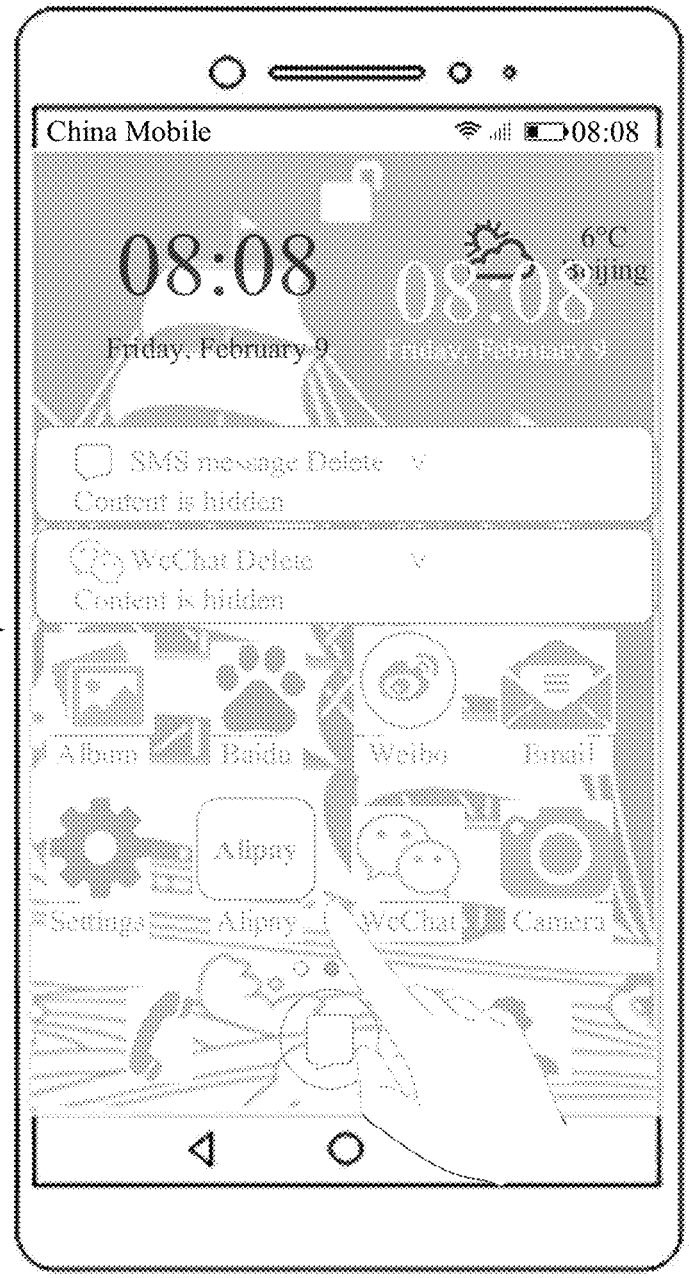
Figure 10C:
Figures 4A, 17:
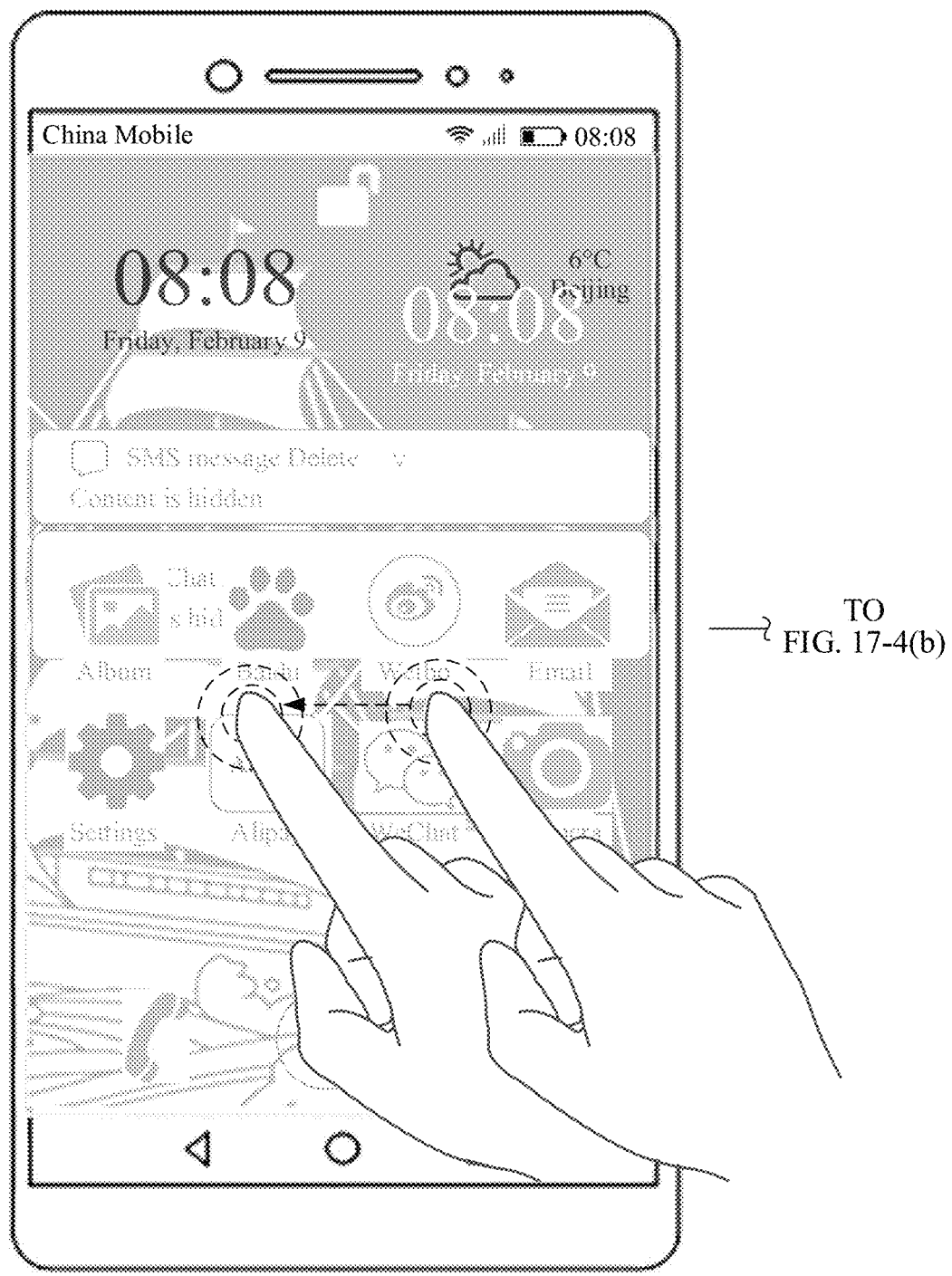
Figures 4B, 17:
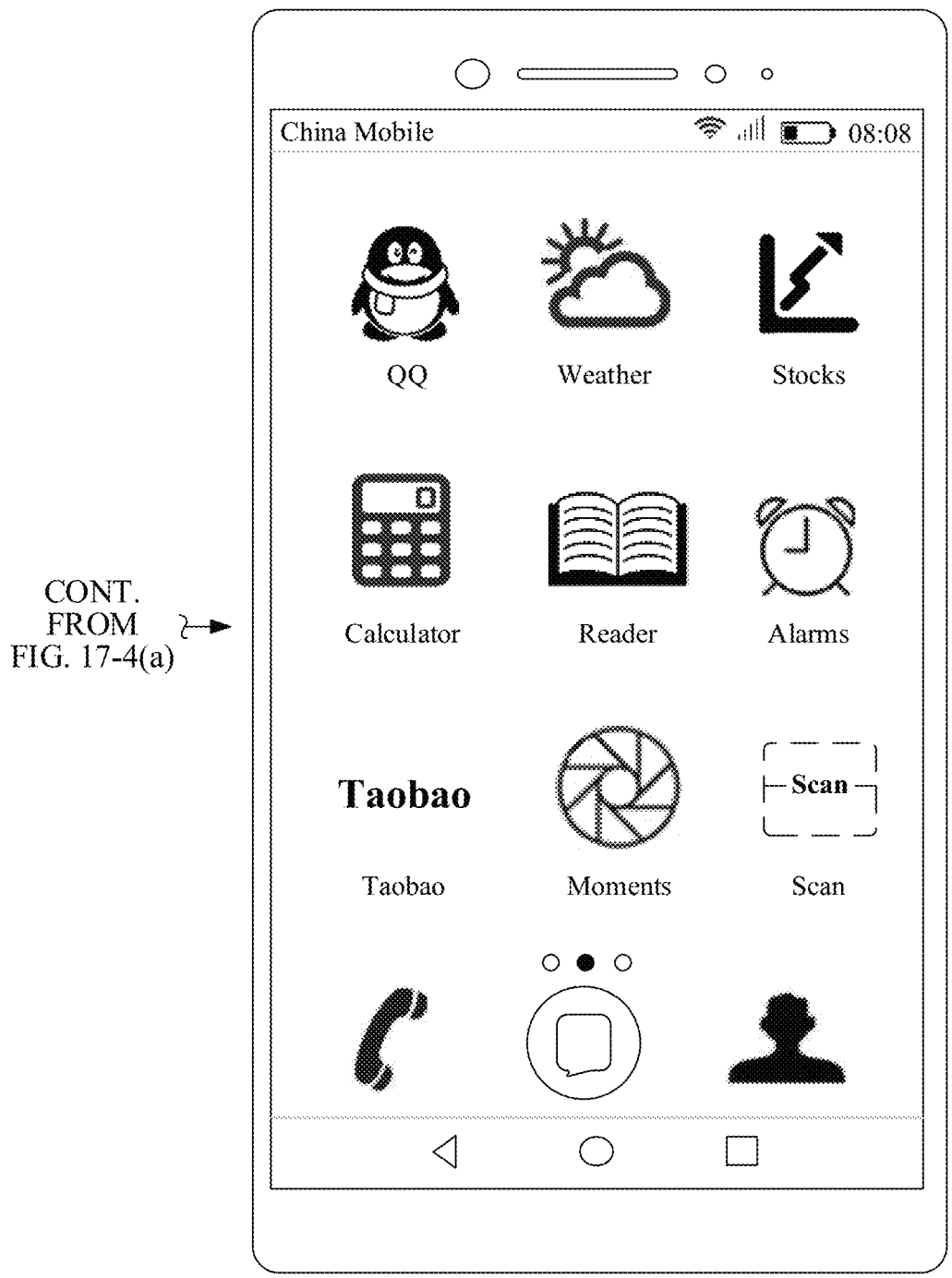

For example, referring to FIG. 17-3(a) and FIG. 17-3(b), when a left swipe operation is detected, if the left swipe operation is a preset operation on the second screen, the screen corresponding to the second screen is displayed. In other words, the second screen is exited and only a desktop is displayed. Referring to FIG. 17-4(a) and FIG. 17-4(b), when a press-based left swipe operation or a touch and hold-based left swipe operation is detected, if the press-based left swipe operation or the touch and hold-based left swipe operation is a preset operation on the third screen, the screen corresponding to the third screen is displayed. In other words, a desktop is switched.

When the unlock screen includes the second screen and the third screen, in a fourth solution in step 404, the unlock screen includes a second screen function area. If the electronic device detects a preset operation in the second screen function area, the electronic device displays the screen corresponding to the first control, where the screen corresponding to the first control may include an application screen corresponding to the first control and a screen corresponding to the second screen on which the first control is located. If the electronic device detects a preset operation in another area, the electronic device displays the screen corresponding to the second control, where the screen corresponding to the second control may include an application screen corresponding to the second control and a screen corresponding to the third screen on which the second control is located.

Figure 18A:
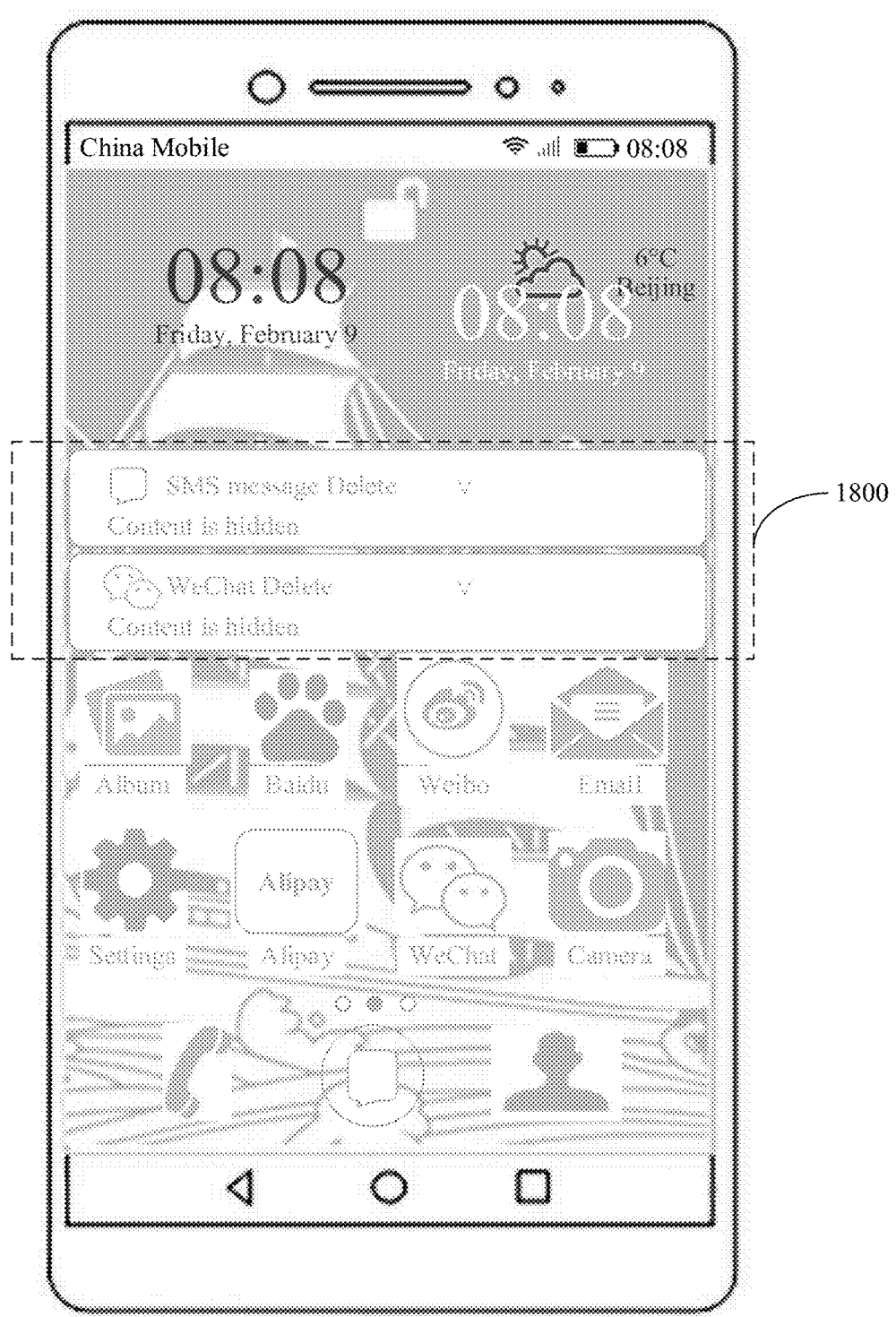
FIG. 18(a) and FIG. 18(b) are a schematic diagram of a second screen function area according to an embodiment of this application.
Figure 18B:
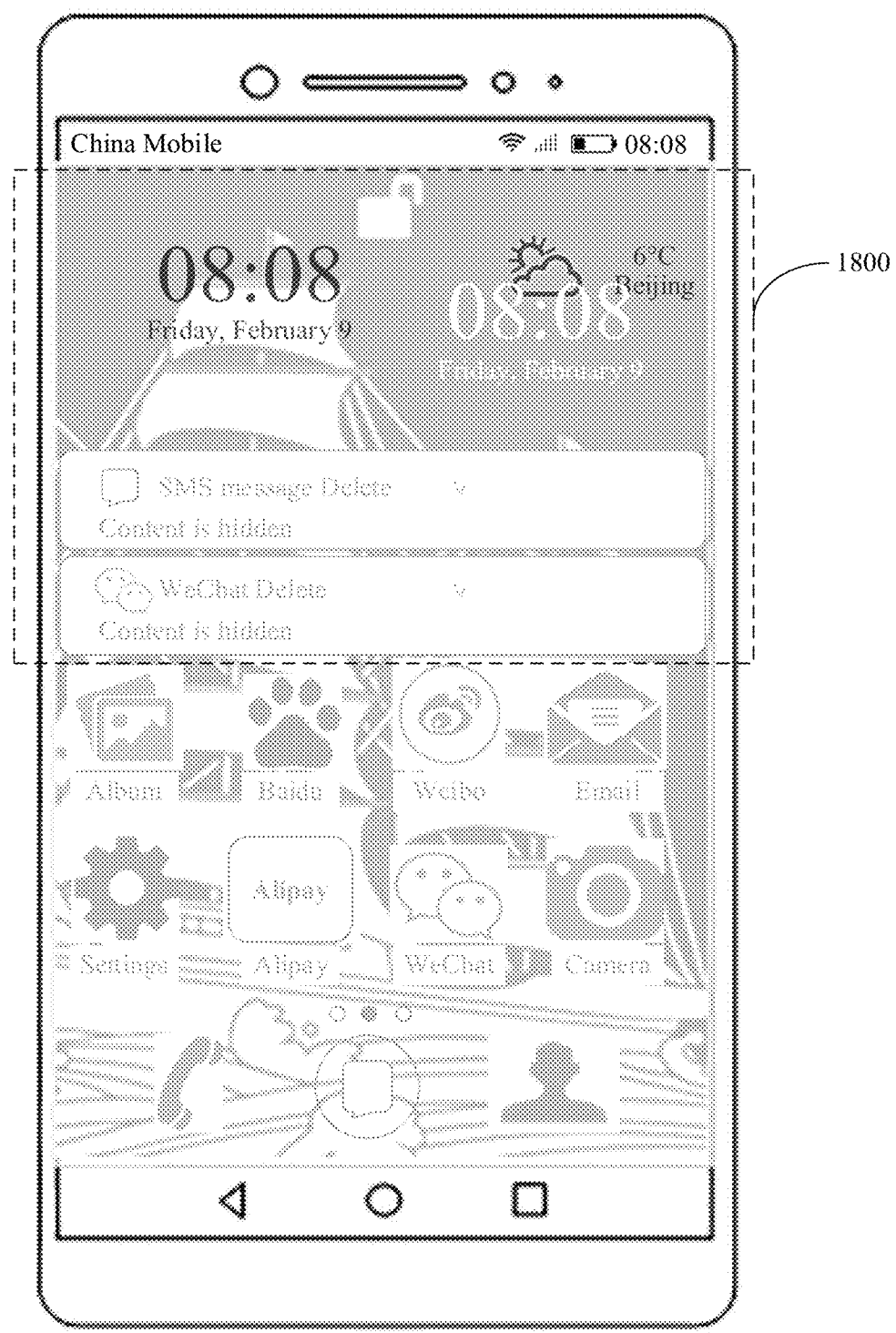

For example, in a possible implementation, referring to FIG. 18(a) and FIG. 18(b), a second screen function area 1800 includes an area occupied by a notification display control on the second screen. In another implementation, the second screen function area may further include an area occupied by a function key (for example, Pause/Play, Previous song, or Next song) of a music player component.

Specifically, the preset operation detected in the second screen function area may include a preset operation on the first control and a preset operation on the second screen. If the electronic device detects the preset operation on the first control in the second screen function area, the electronic device displays an application screen corresponding to the first control. If the electronic device detects the preset operation on the second screen in the second screen function area, the electronic device displays a screen corresponding to the second screen. If the electronic device detects a preset operation in an area other than the second screen function area, the electronic device displays an application screen corresponding to the second control or a screen corresponding to the third screen.

Figures 1A, 19:
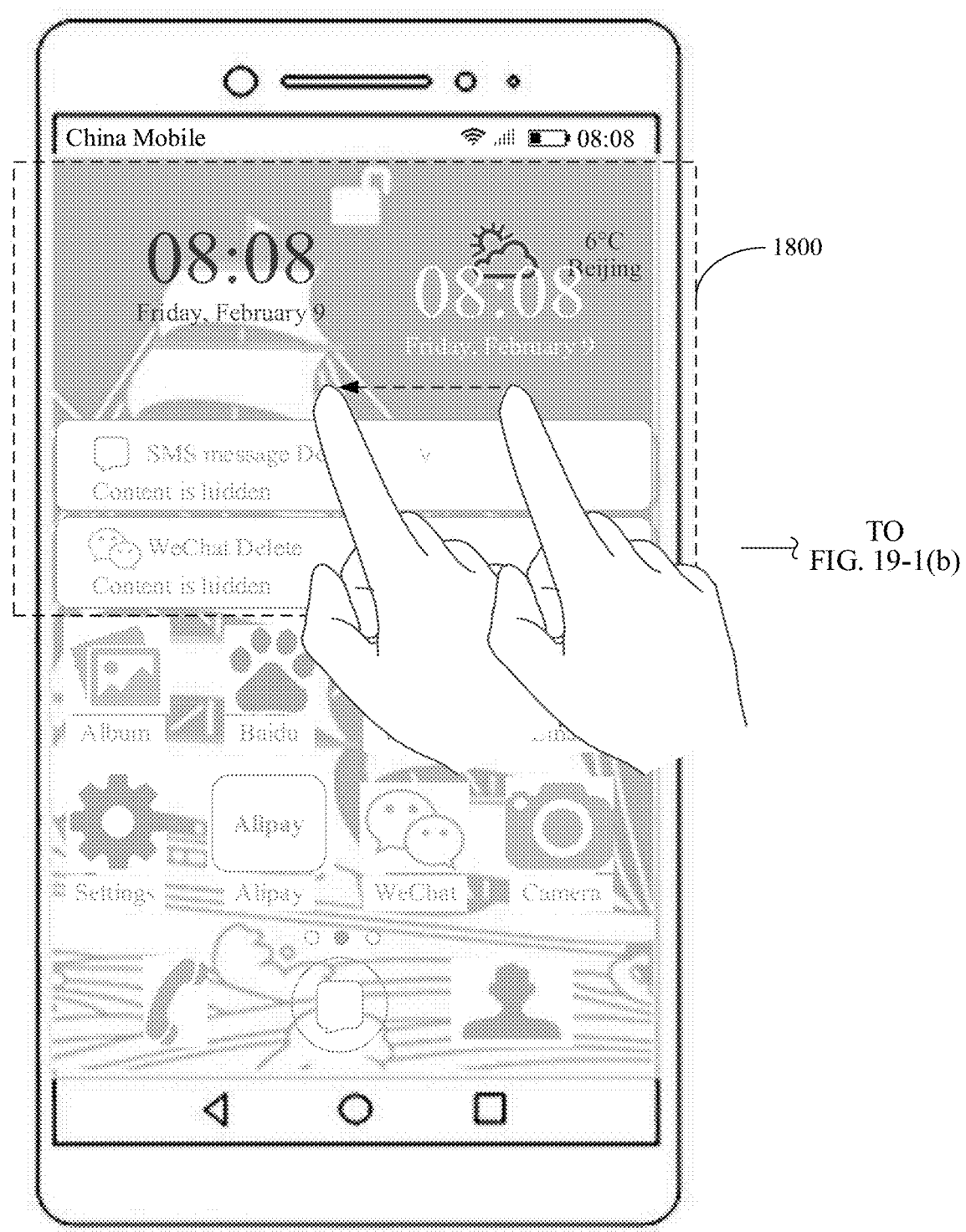
Figures 1A, 1B, 19:
Figures 2A, 19:
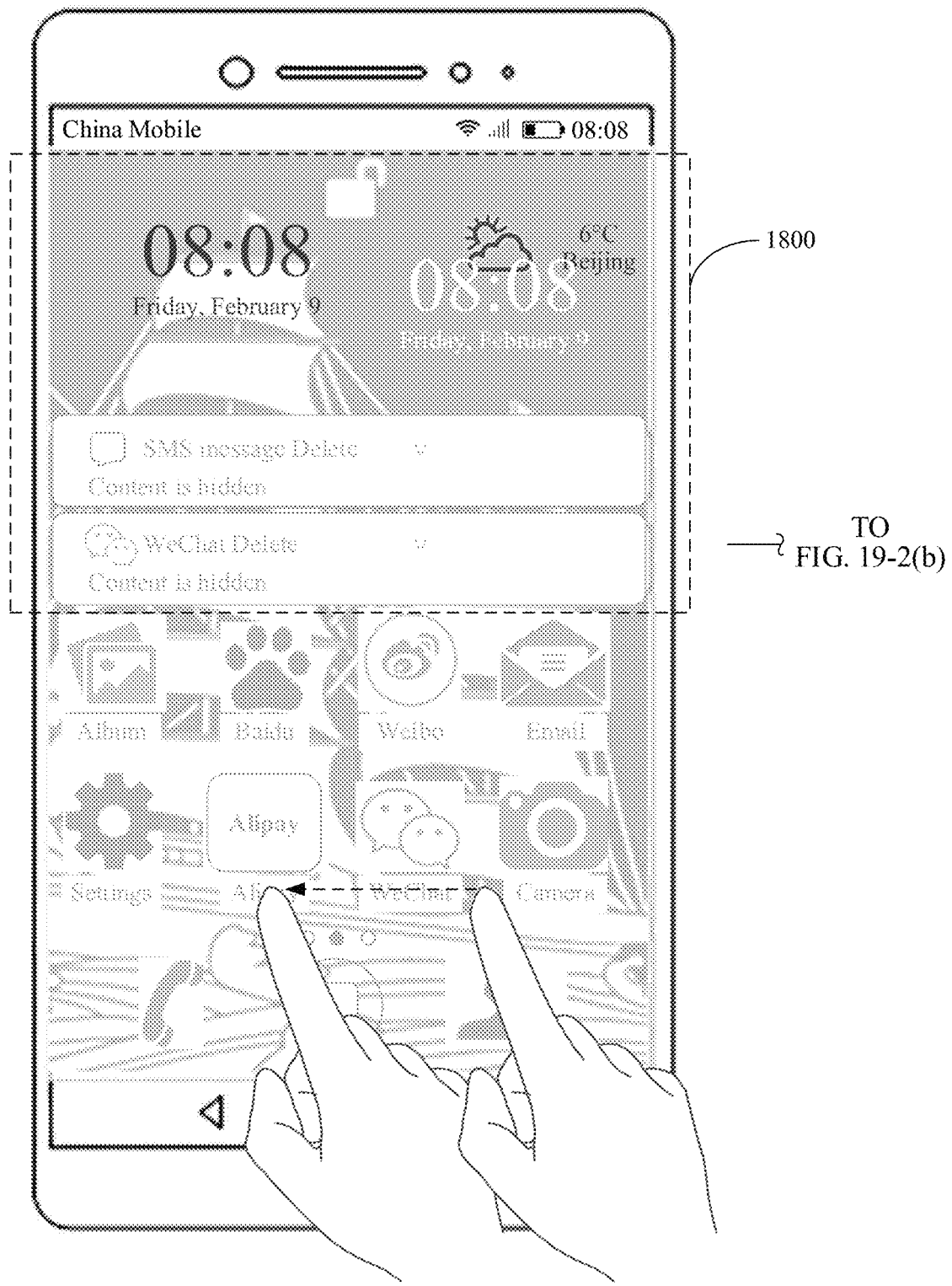
Figures 2B, 19:
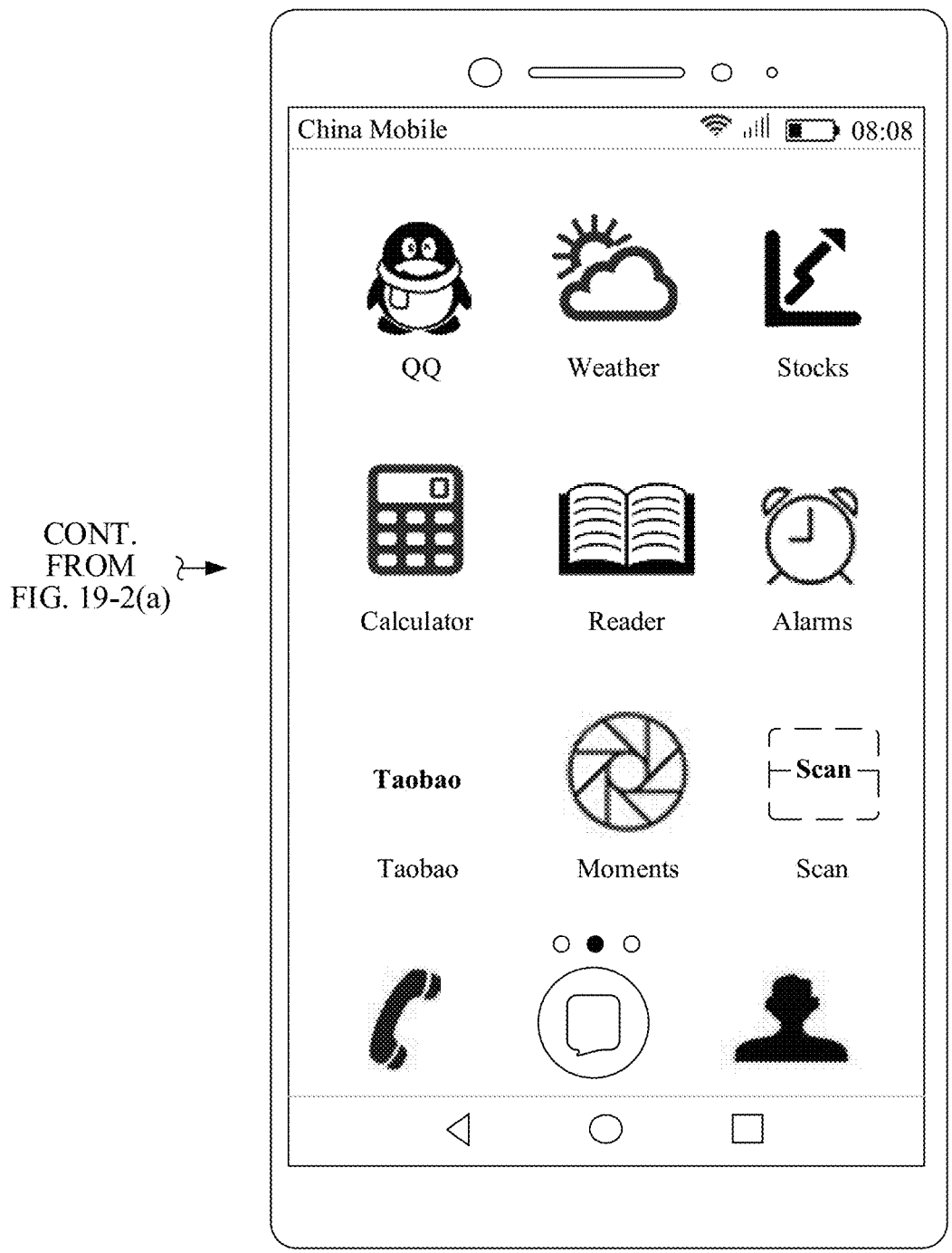

For example, referring to FIG. 19-1(a) and FIG. 19-1(b), if the electronic device detects a left swipe operation in the second screen function area, the electronic device displays a screen corresponding to the second screen, in other words, displays a desktop. Referring to FIG. 19-2(a) and FIG. 19-2(b), if the electronic device detects a left swipe operation in an area other than the second screen function area, the electronic device displays a screen corresponding to the third screen, in other words, switches and displays a desktop.

When the unlock screen includes the second screen and the third screen, in a fifth solution in step 404, the unlock screen may include a third screen function area in addition to the second screen function area 1800. If the electronic device detects a preset operation in the second screen function area, the electronic device displays the screen corresponding to the first control, where the screen corresponding to the first control includes an application screen corresponding to the first control and a screen corresponding to the second screen on which the first control is located. If the electronic device detects a preset operation in the third screen function area, the electronic device displays the screen corresponding to the second control, where the screen corresponding to the second control includes an application screen corresponding to the second control and a screen corresponding to the third screen on which the second control is located.

Figure 20A:
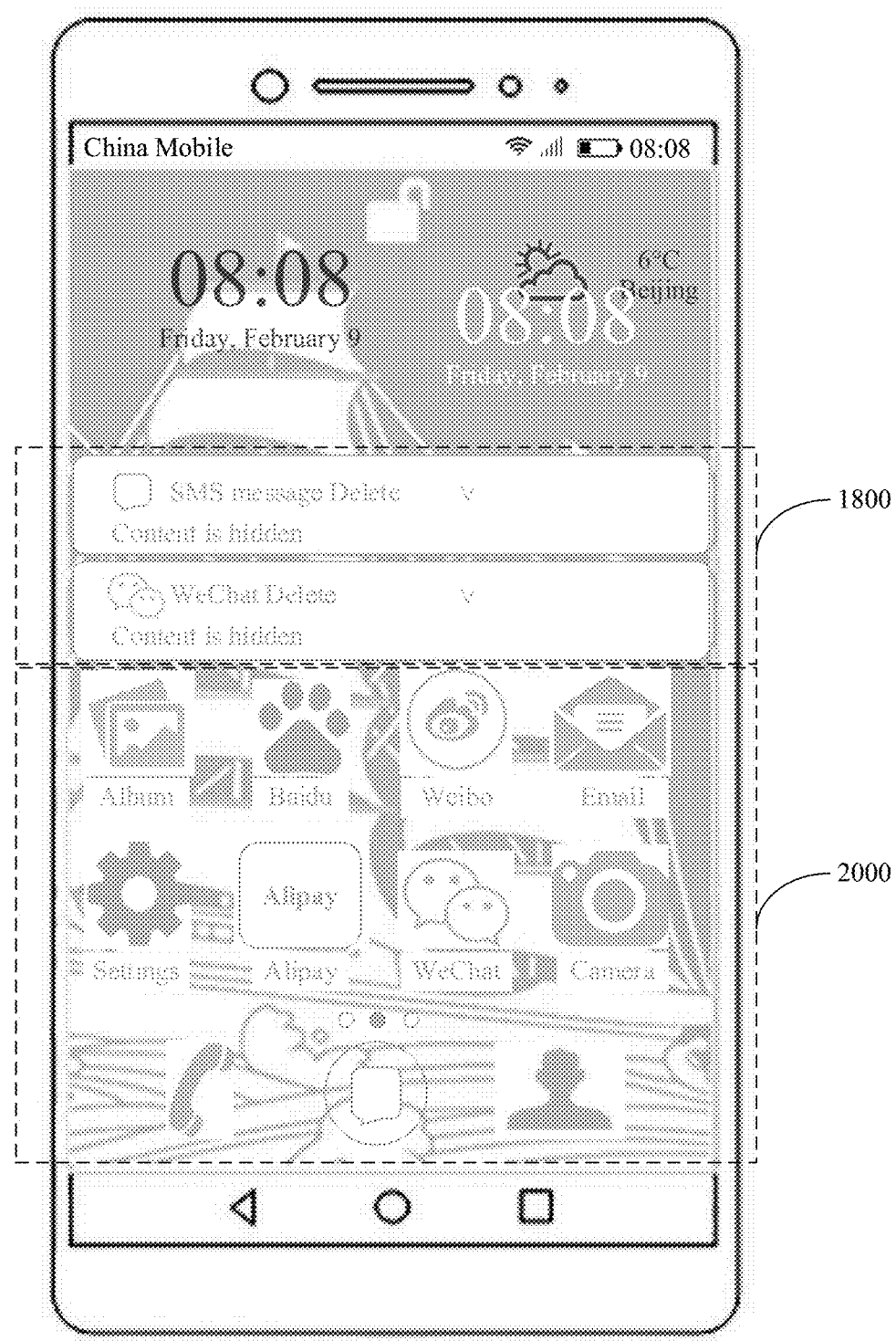
FIG. 20(a) and FIG. 20(b) are a schematic diagram of a third screen function area according to an embodiment of this application.
Figure 20B:
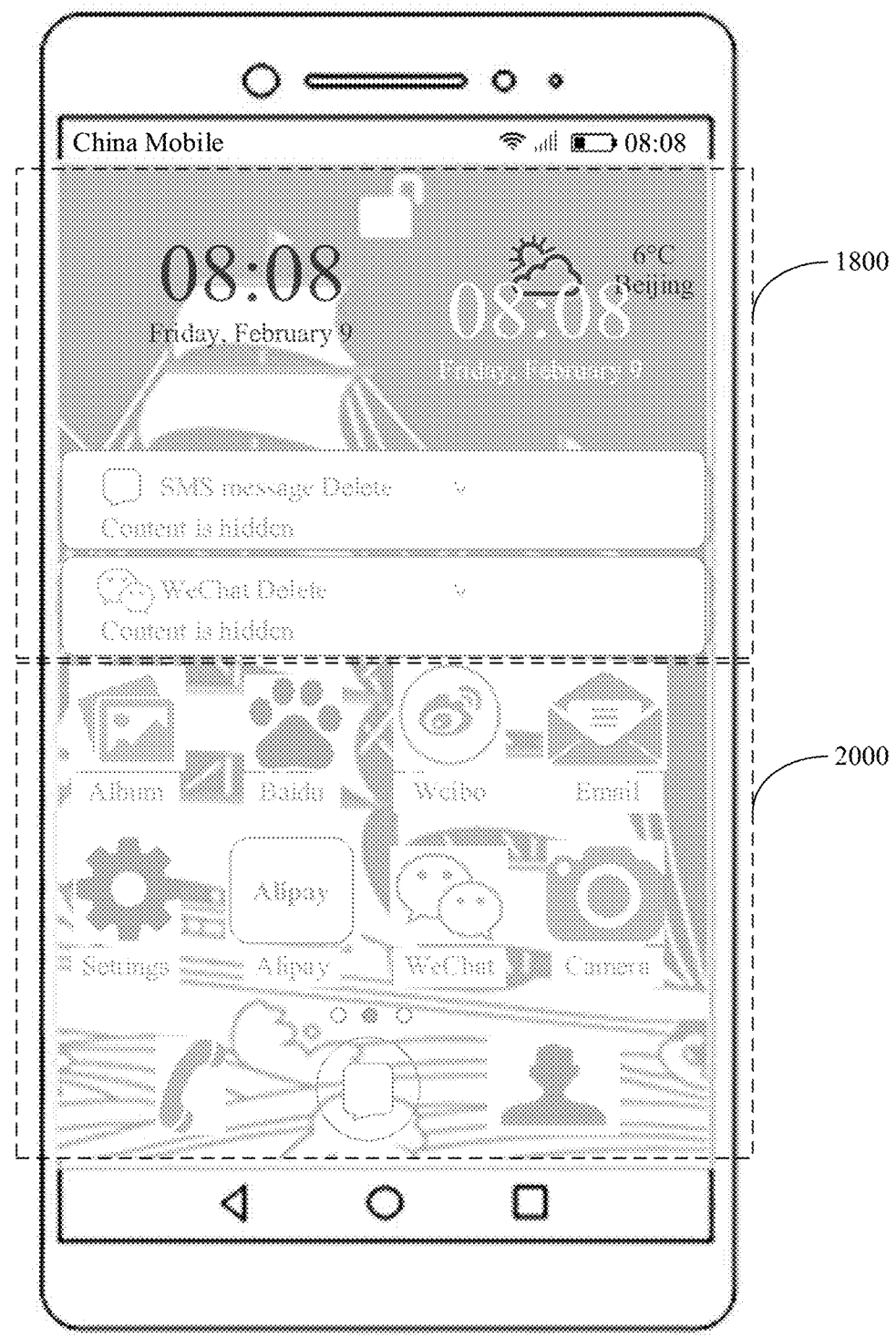
Figure 21A:
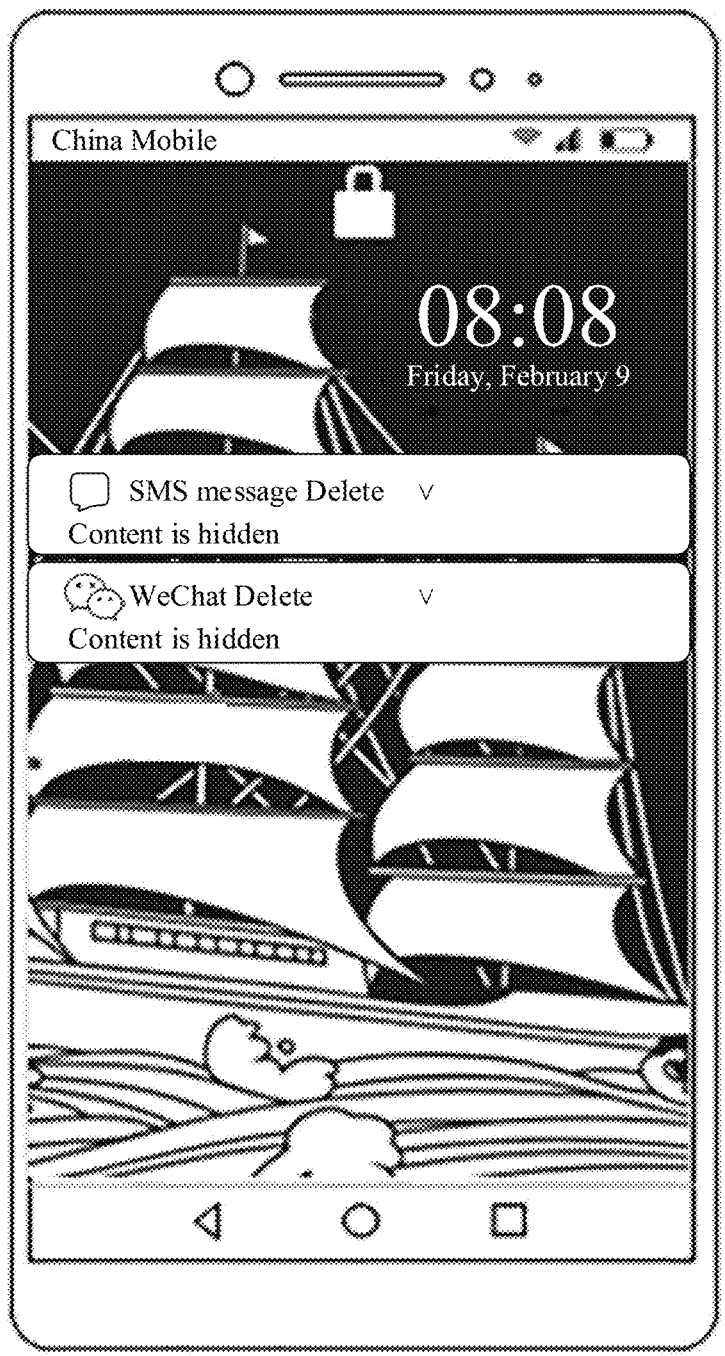
FIG. 21(a) to FIG. 21(d) are a schematic diagram of another group of screens according to an embodiment of this application.
Figure 21B:
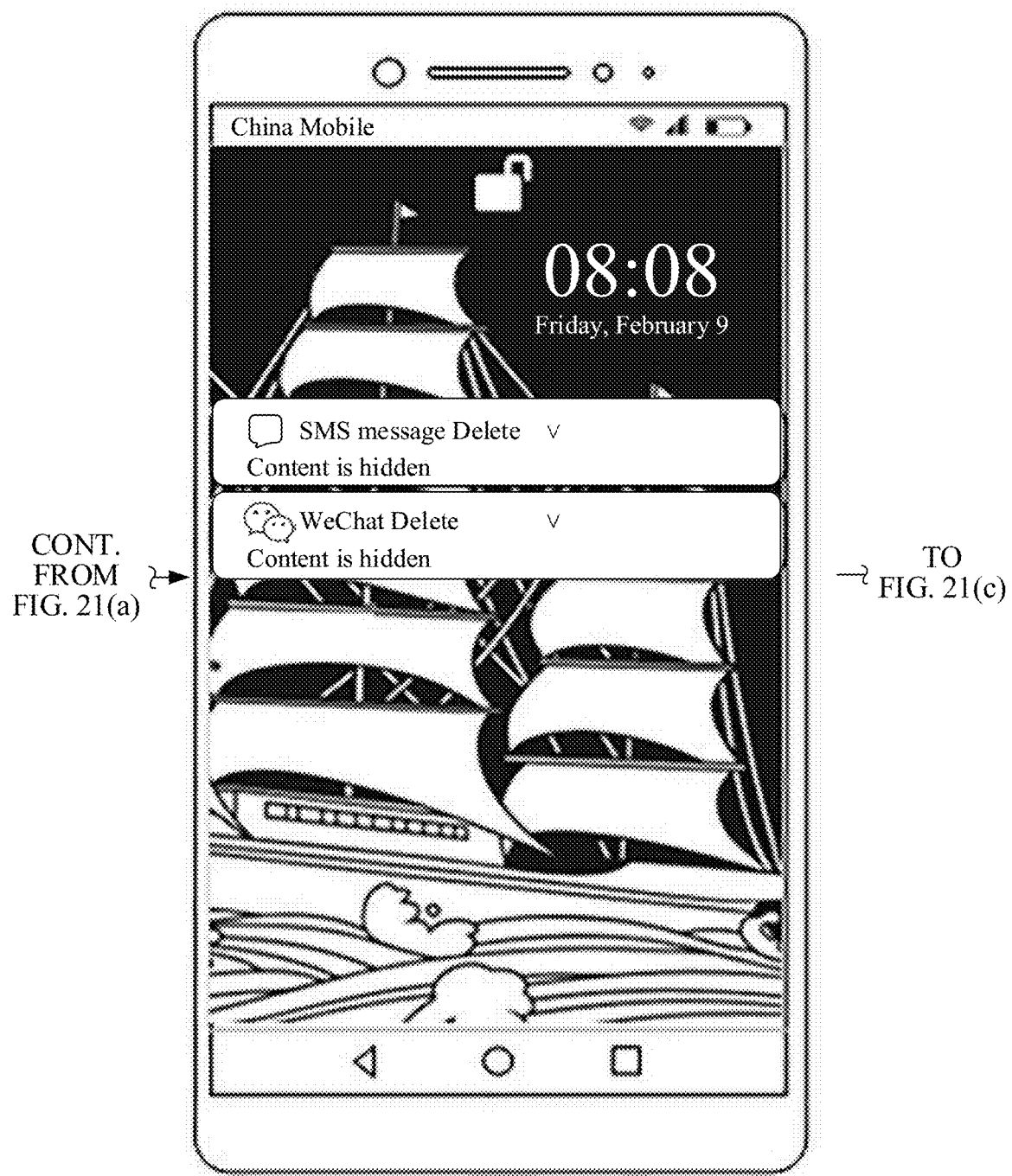
Figure 21C:
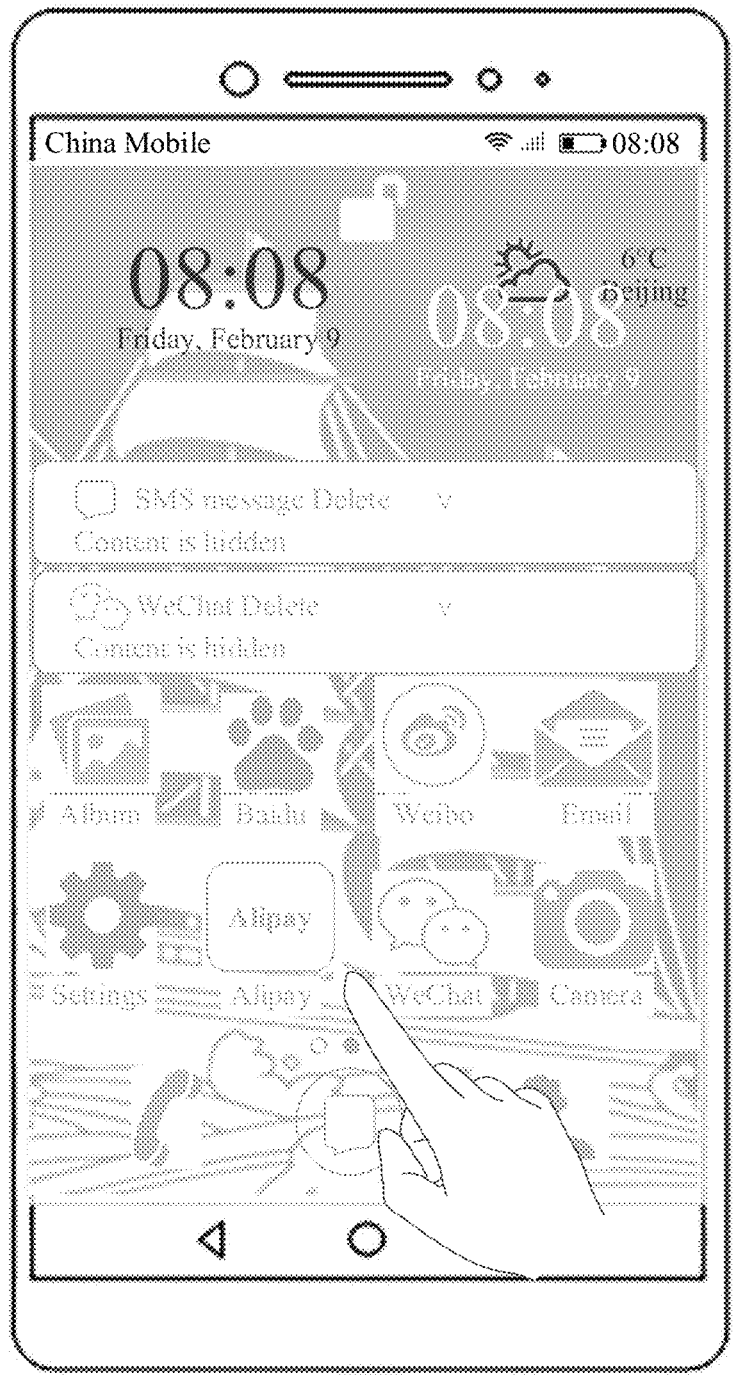
Figure 21D:
Figure 22A:
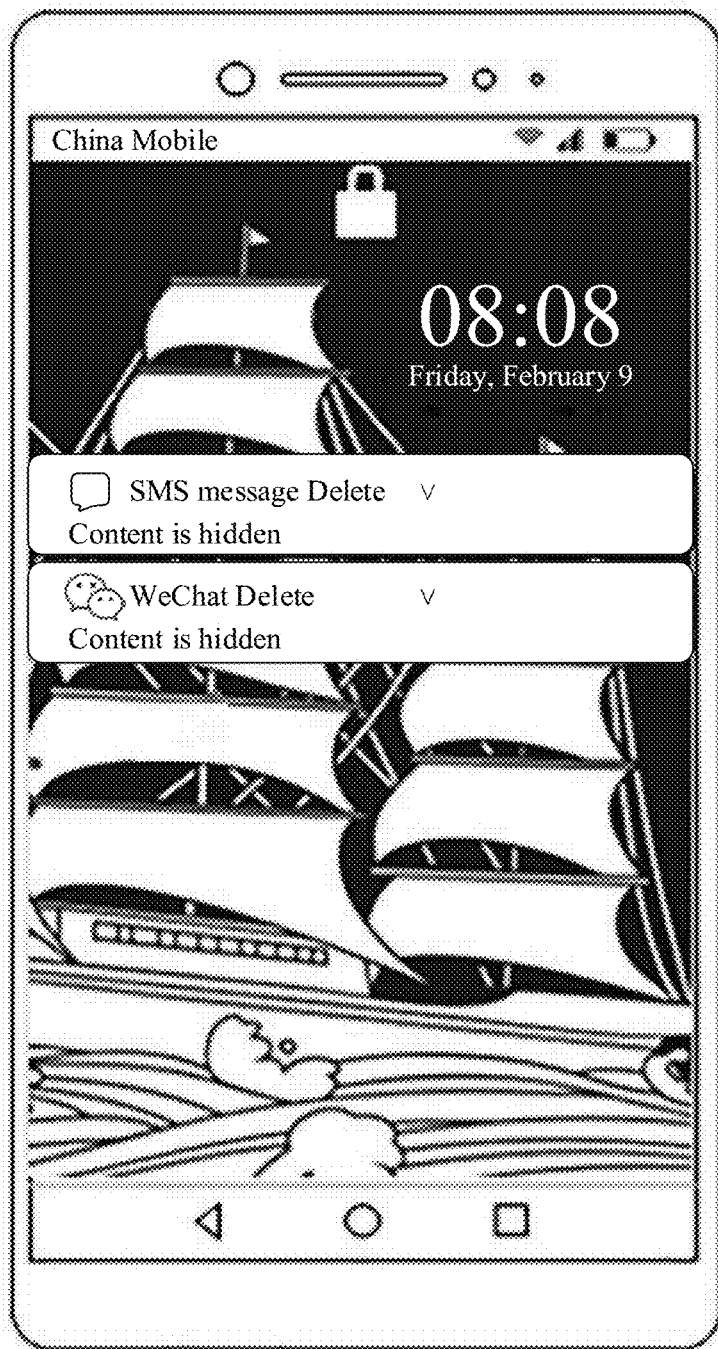
FIG. 22(a) to FIG. 22(d) are a schematic diagram of another group of screens according to an embodiment of this application.
Figure 22B:
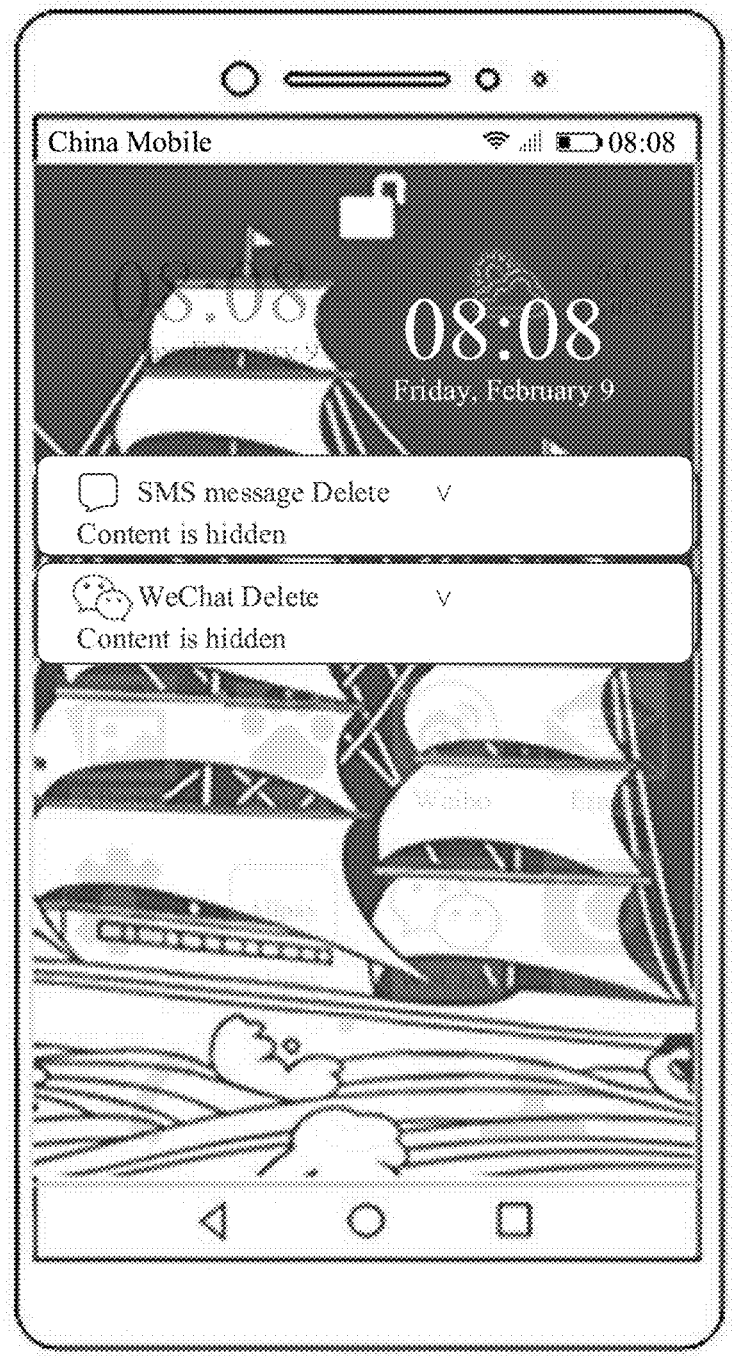
Figure 22C:
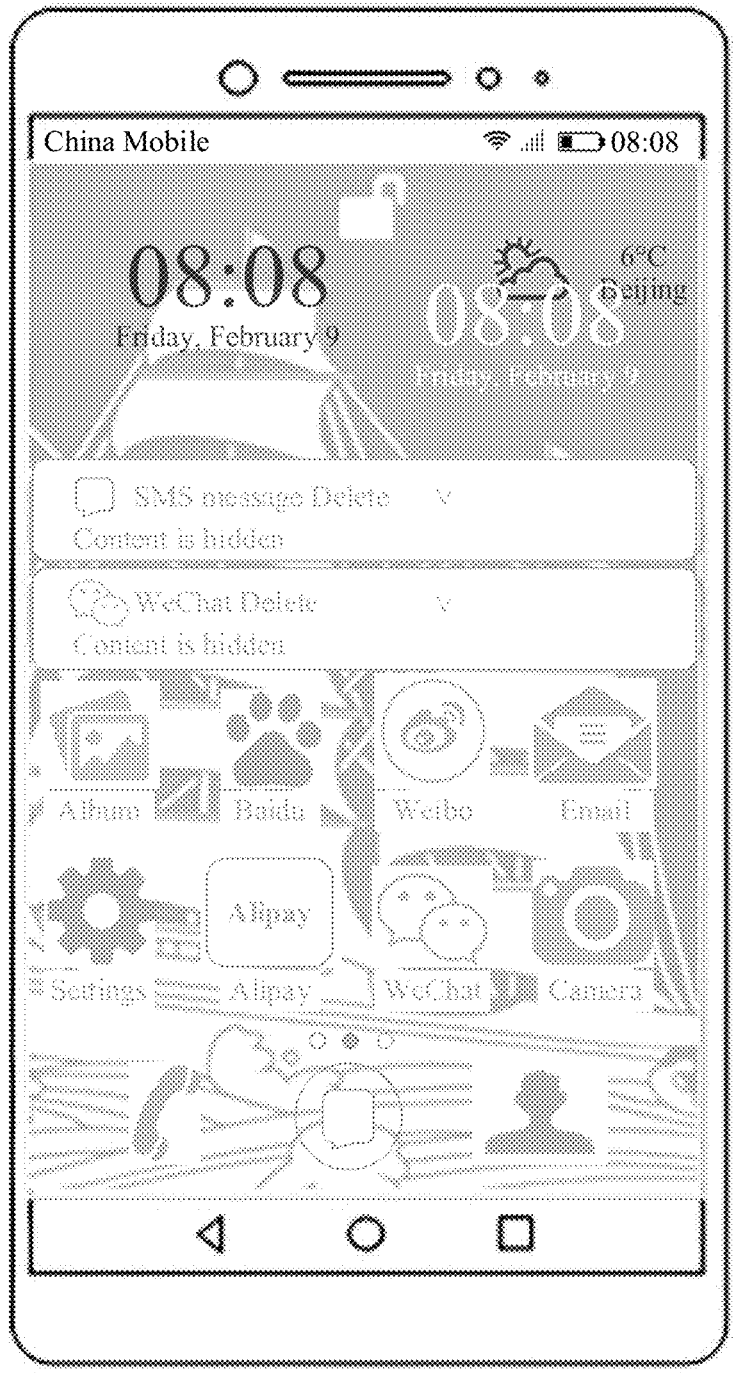
Figure 22D:
Figure 23A:
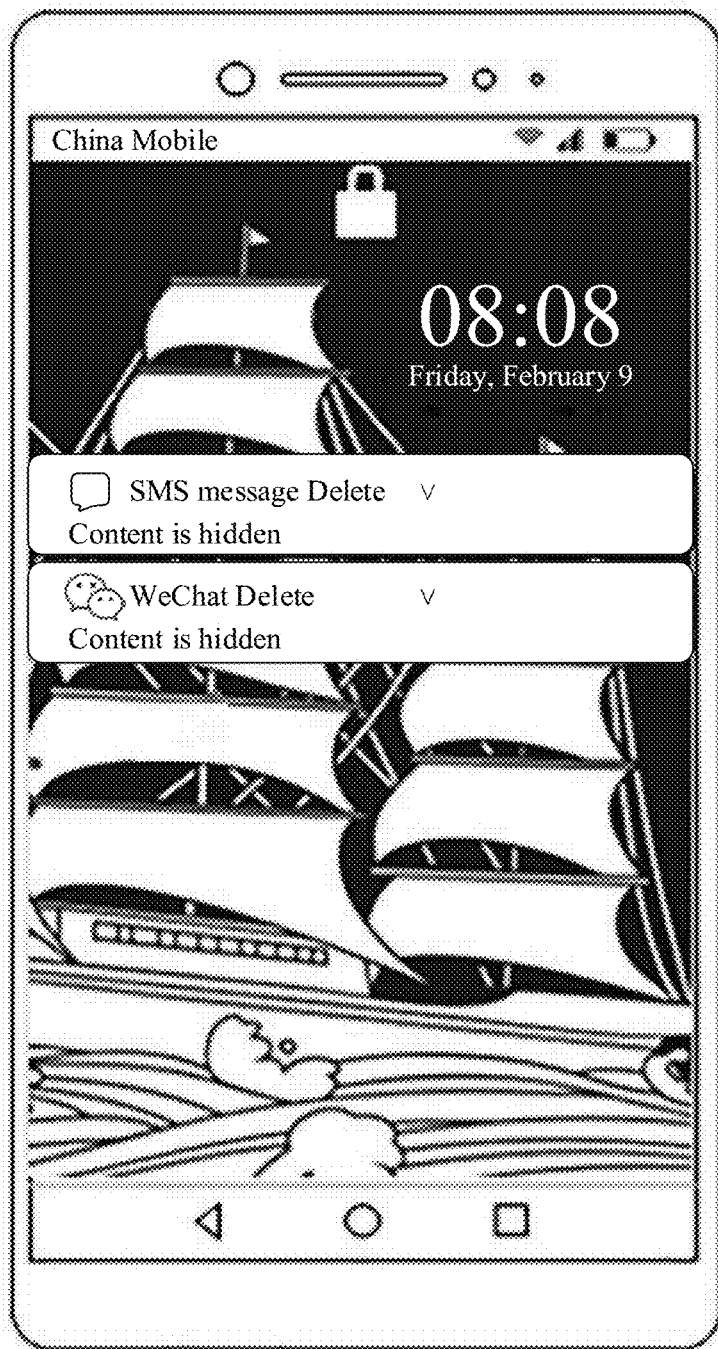
FIG. 23(a) to FIG. 23(e) are a schematic diagram of another group of screens according to an embodiment of this application.
Figure 23B:
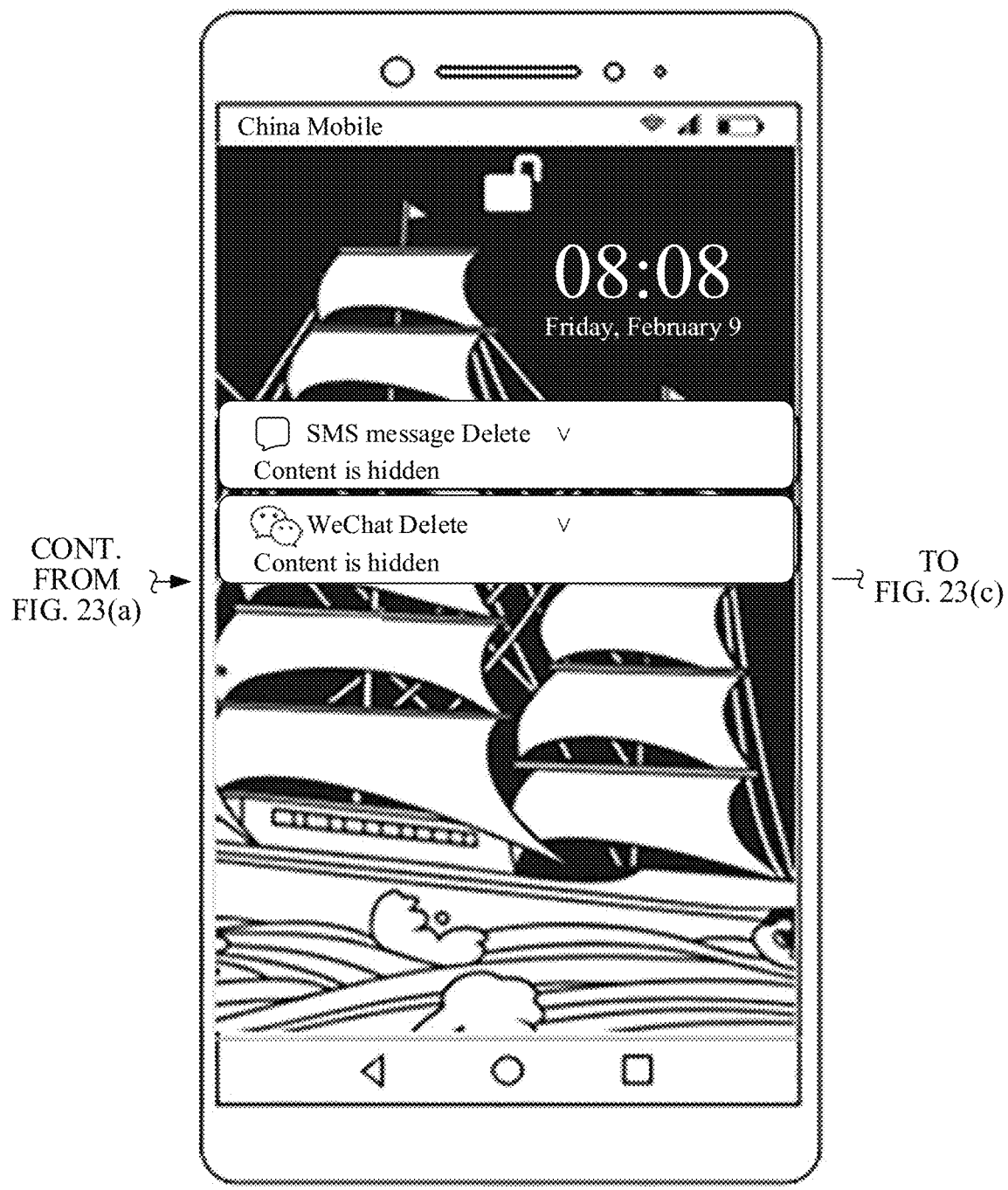
Figure 23C:
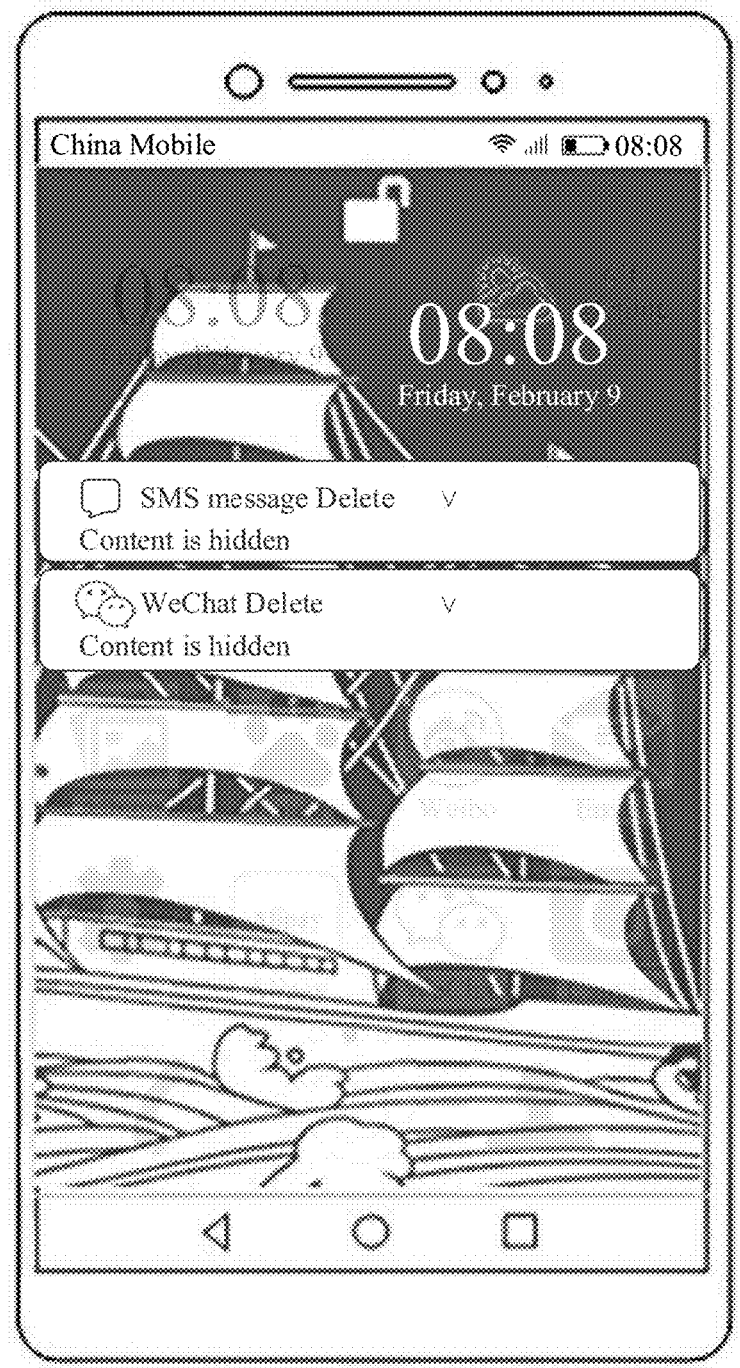
Figure 23D:
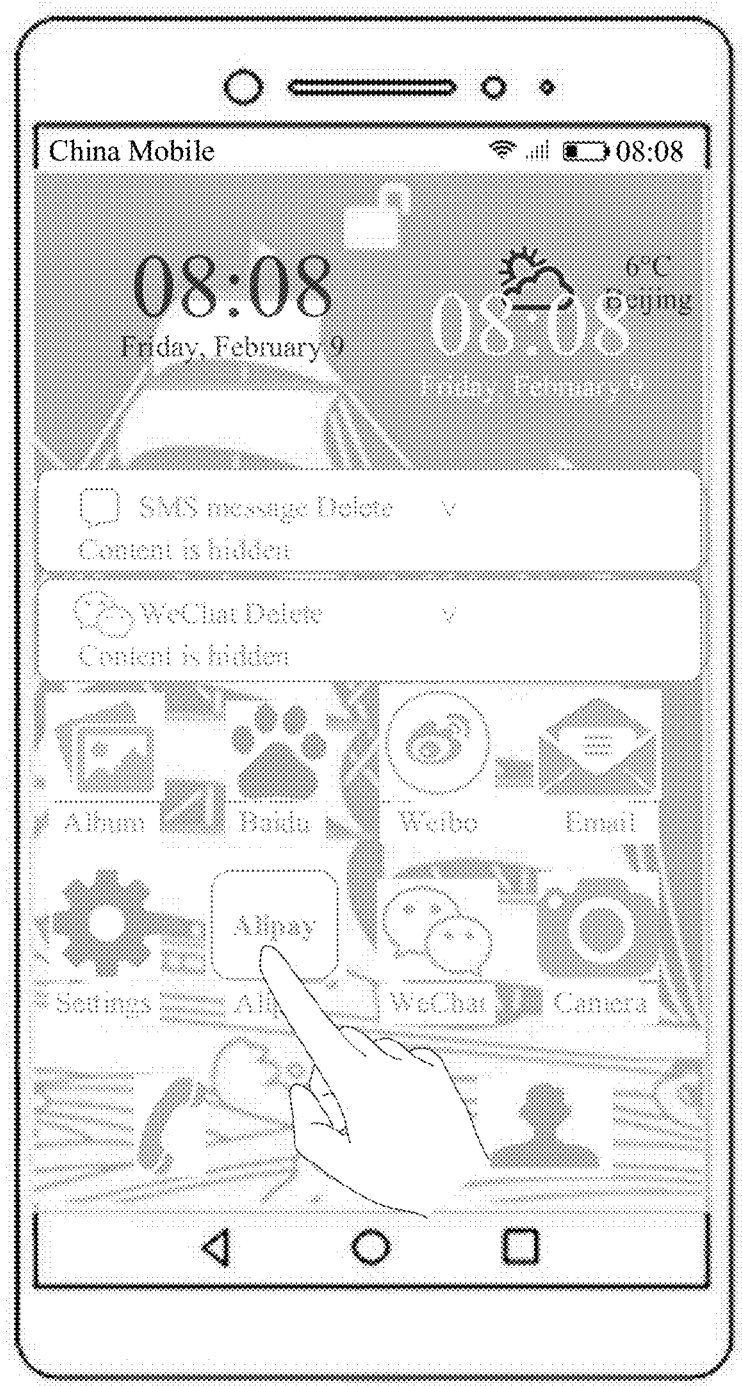
Figure 23E:
Figure 24A:
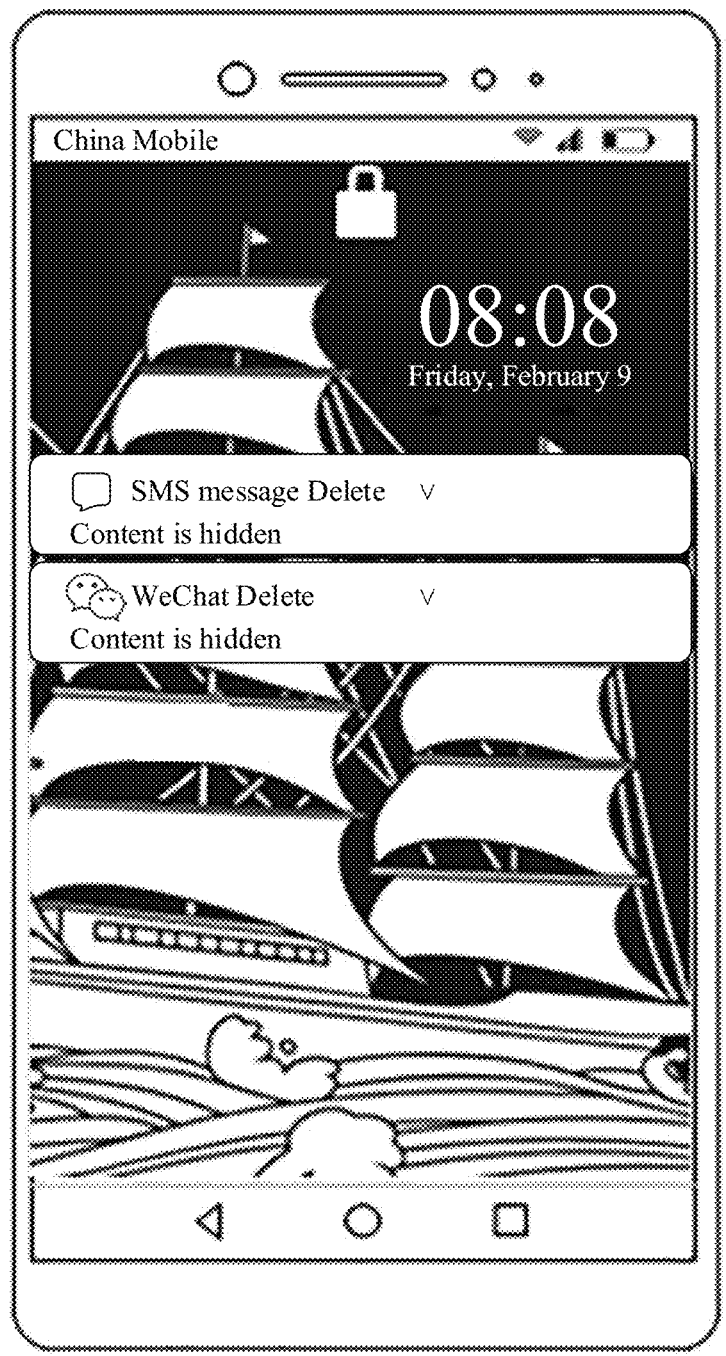
FIG. 24(a) to FIG. 24(j) are a schematic diagram of another group of screens according to an embodiment of this application.
Figure 24B:
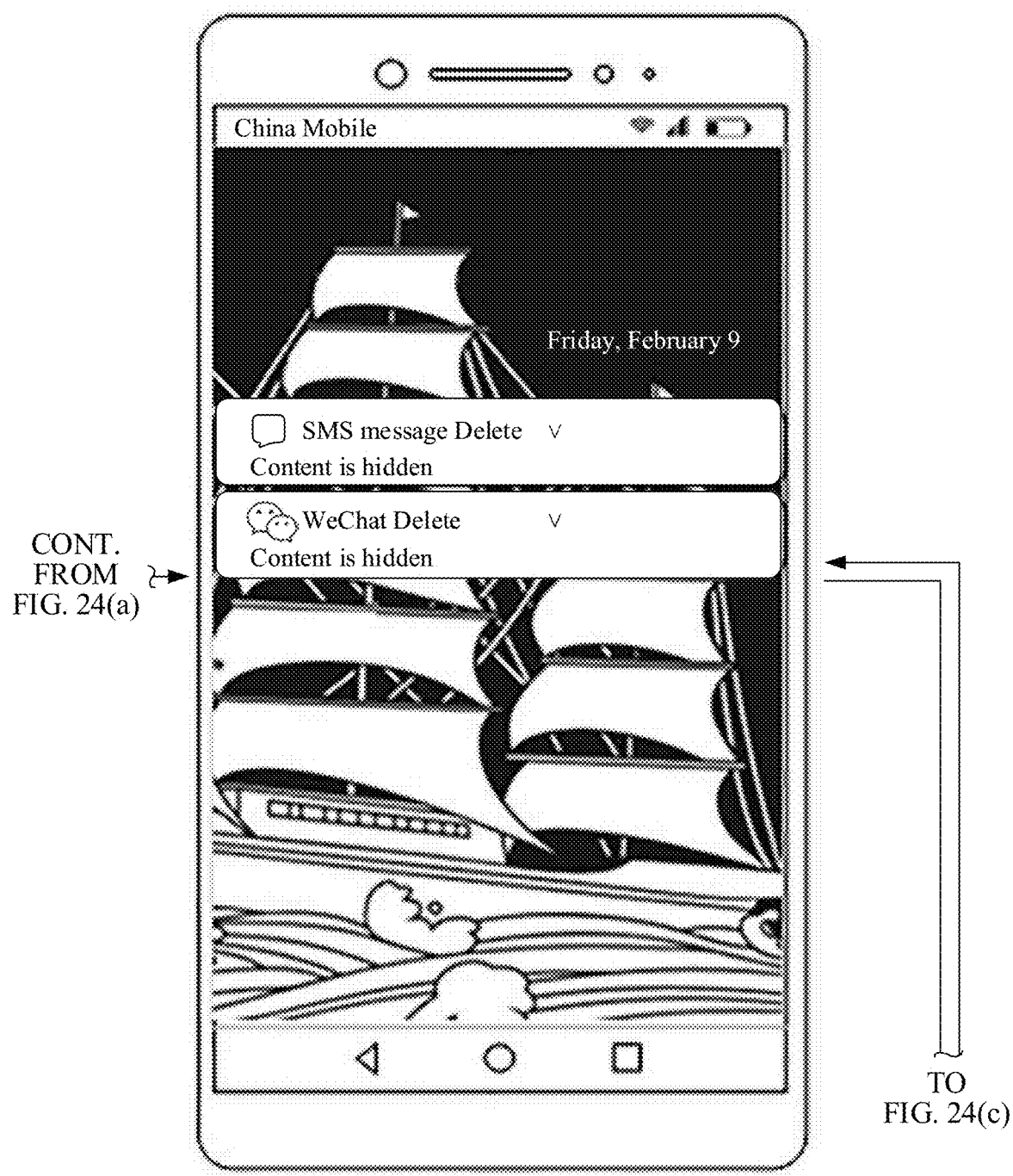
Figure 24J:
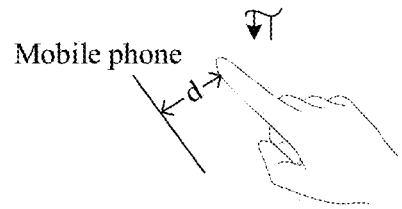
Figure 24C:
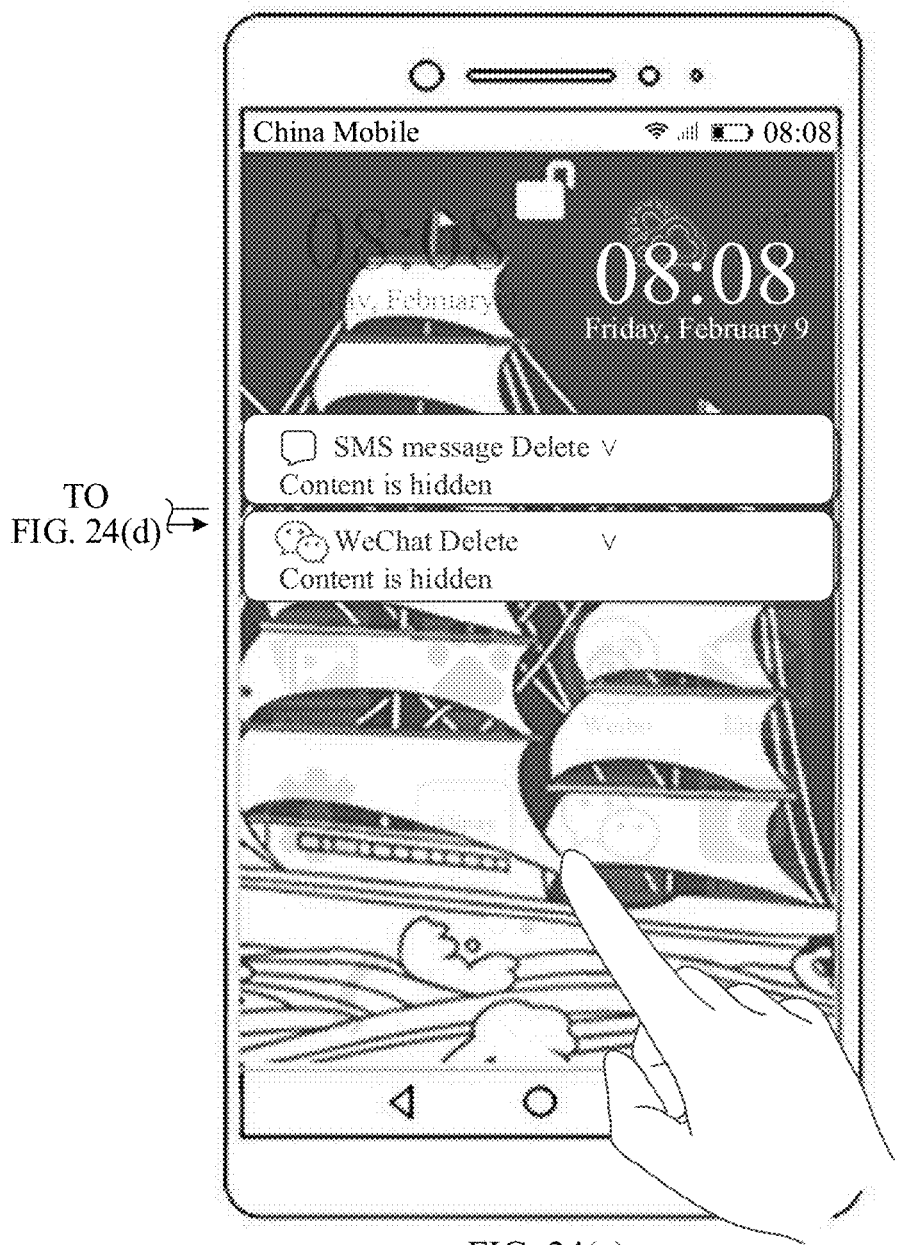
Figure 24I:
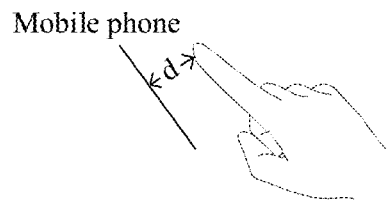
Figure 24D:
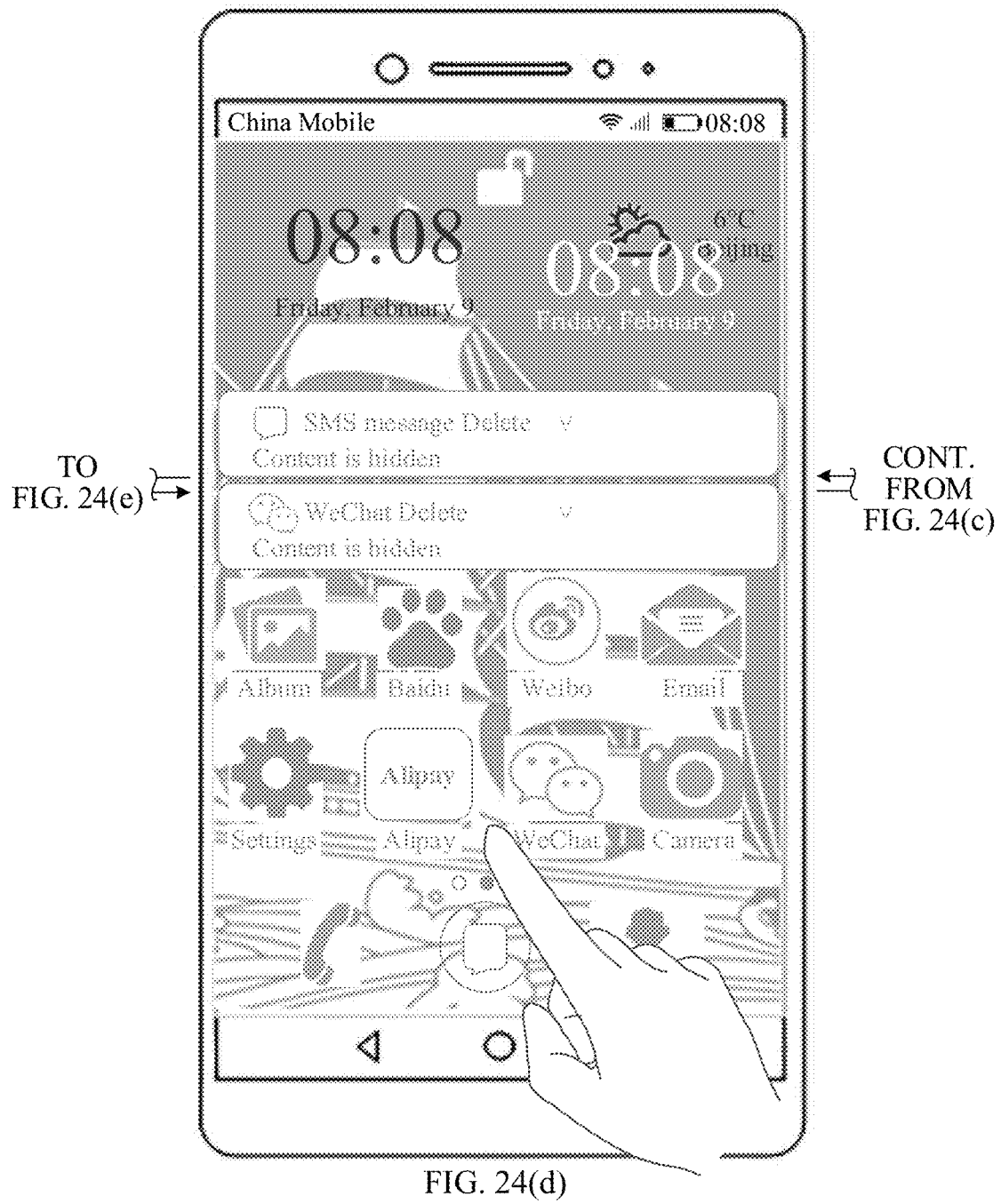
Figure 24H:
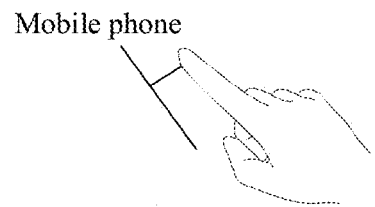
Figure 24E:
Figures 24F, 24G:
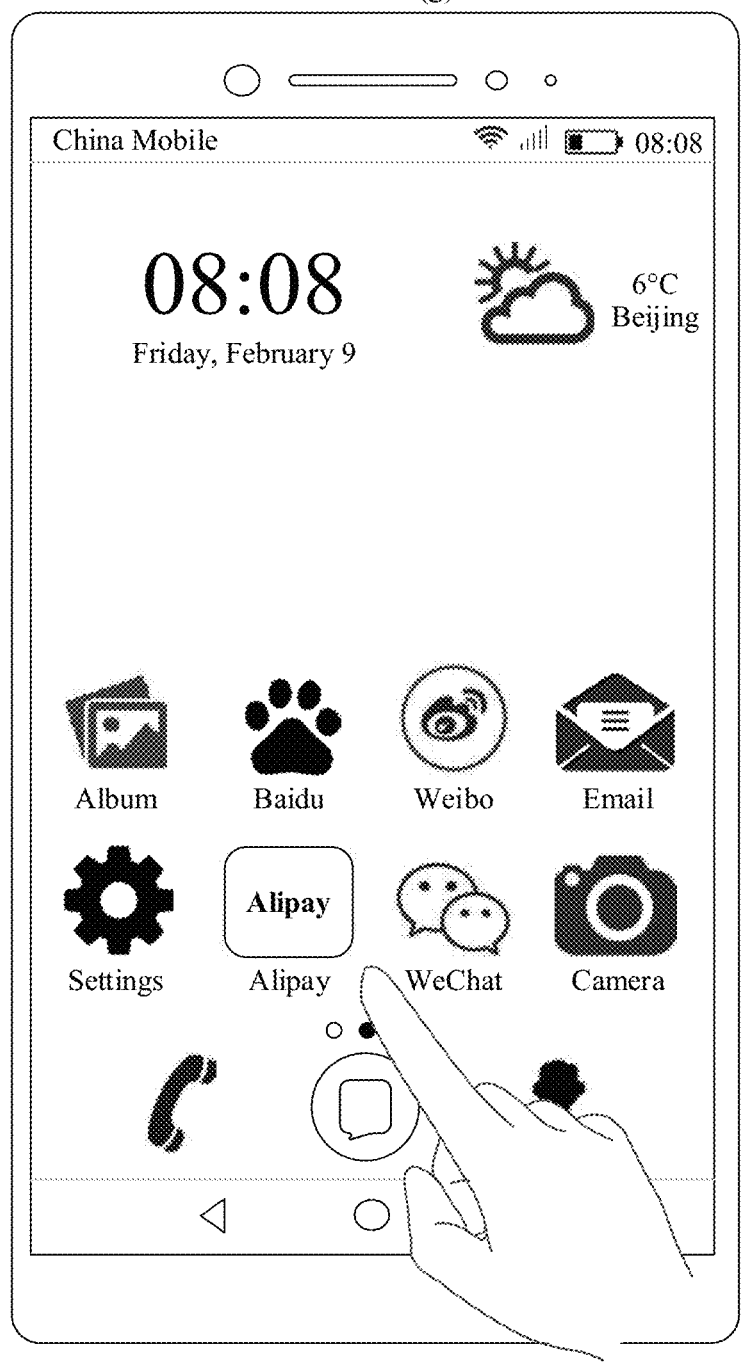
Figure 25A:
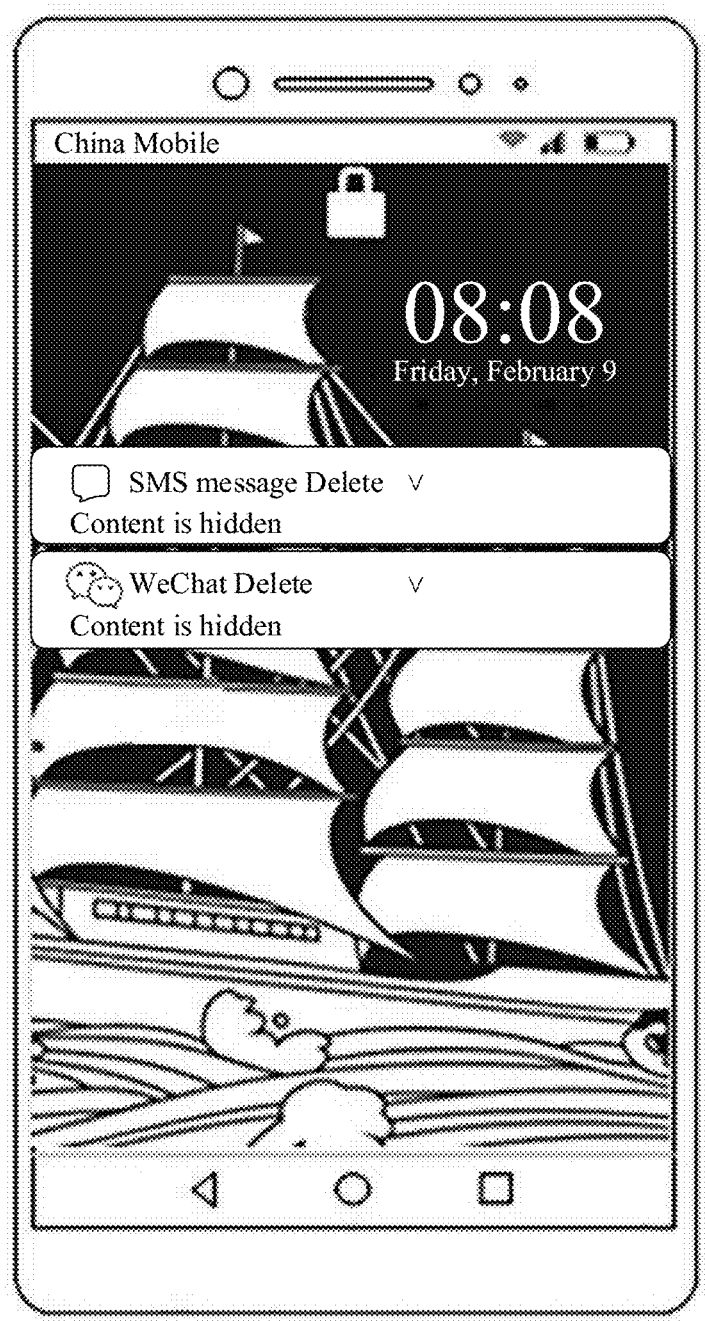
Figure 25M:
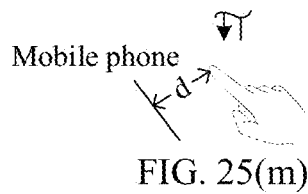
Figure 25C:
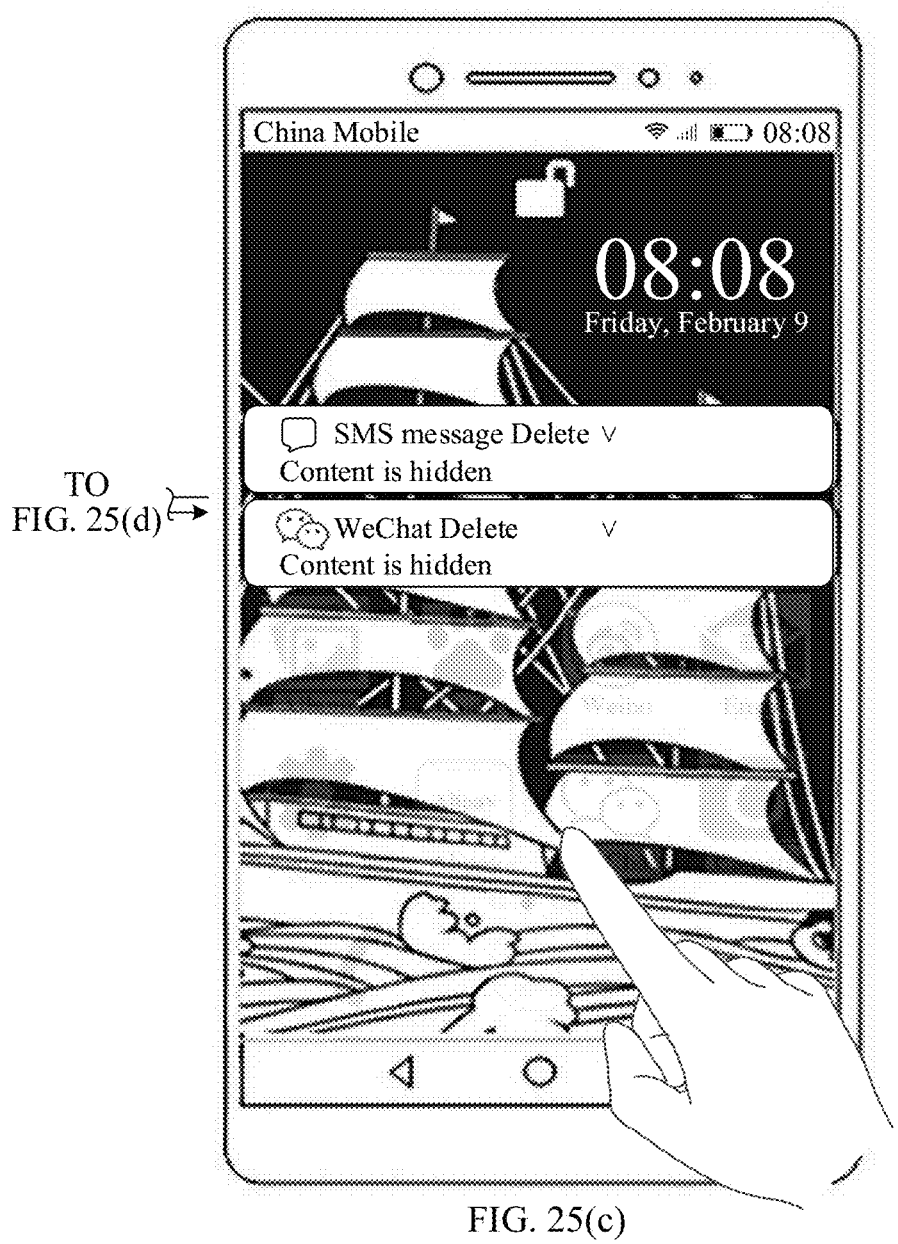
Figure 25H:
Figure 25K:
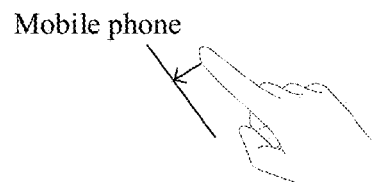
Figure 25D:
Figure 25G:
Figure 25J:
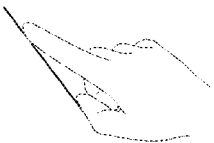
Figure 25E:
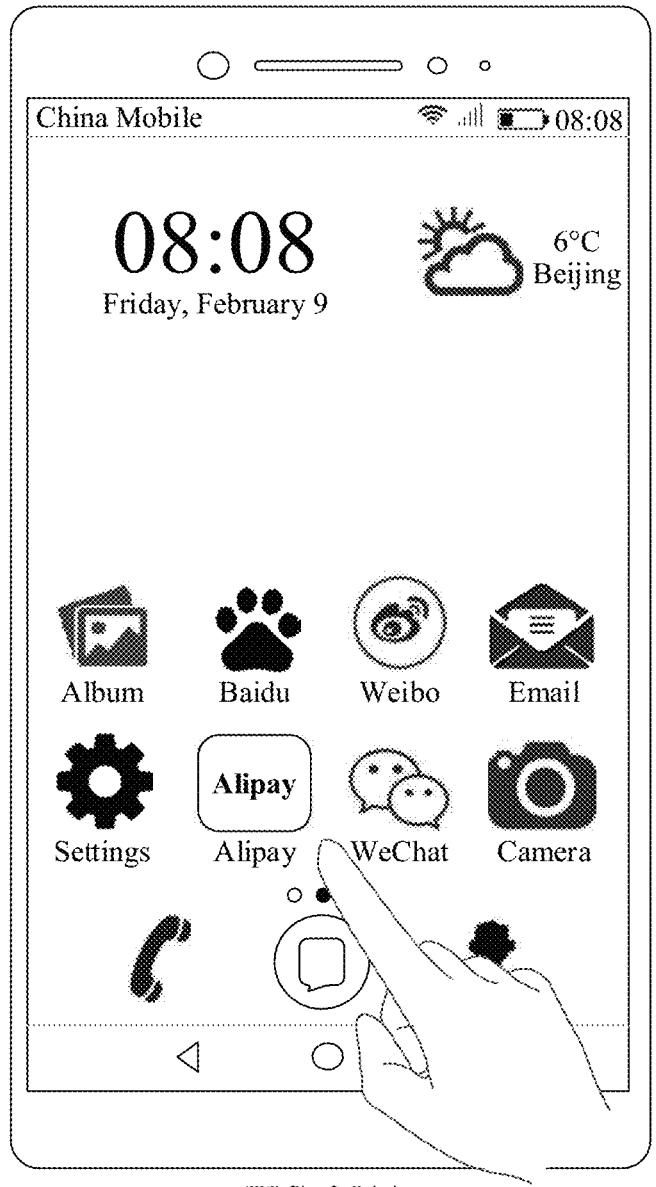
Figure 25F:
Figure 26A:
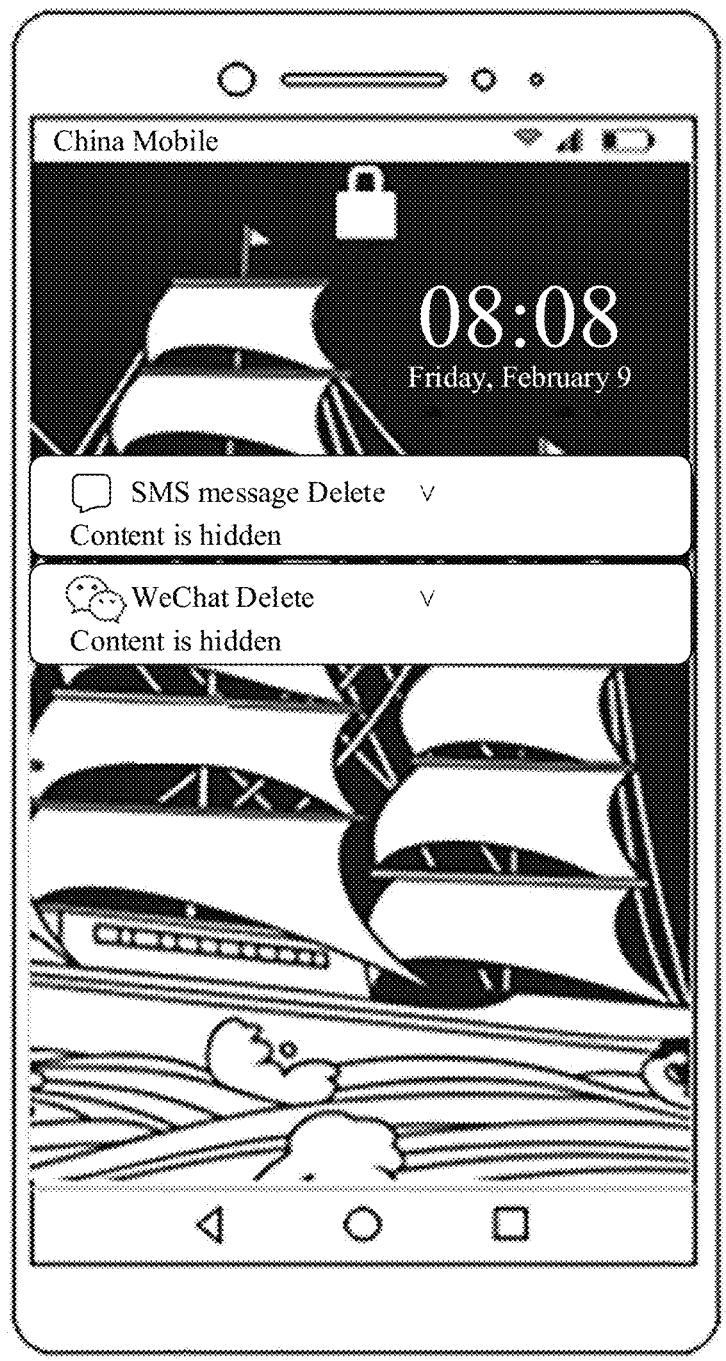
FIG. 26(a) to FIG. 26(f) are a schematic diagram of another group of screens according to an embodiment of this application.
Figure 26B:
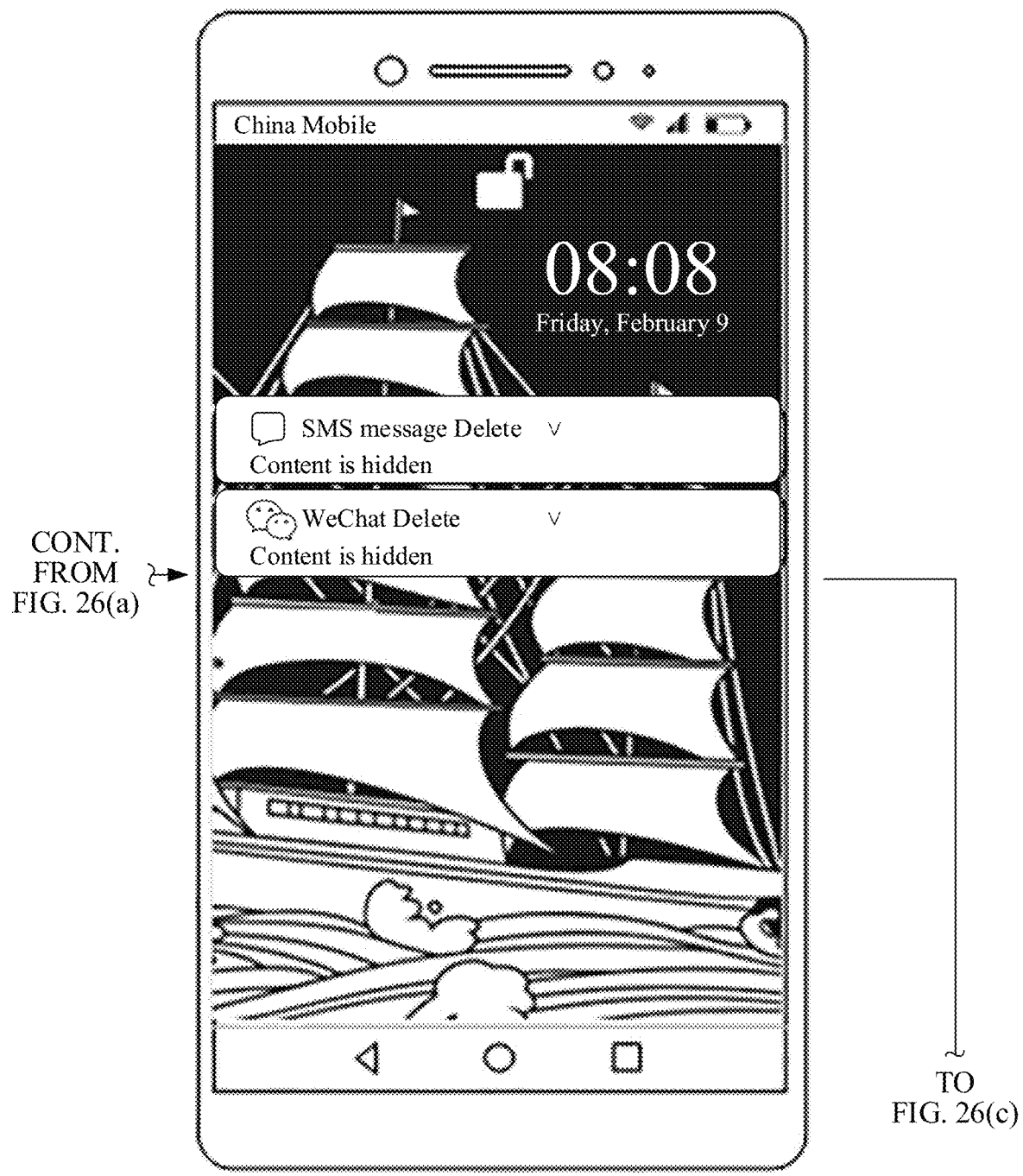
Figure 26C:
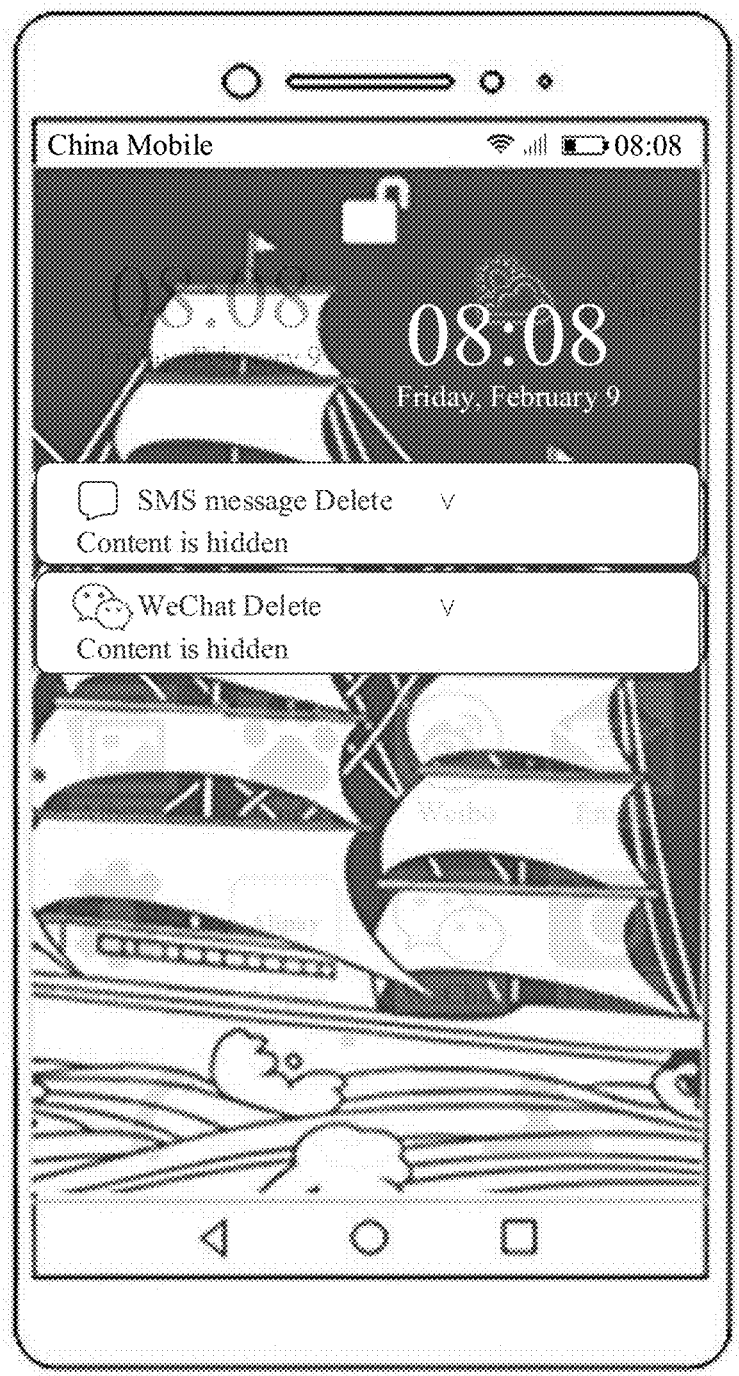
Figure 26D:
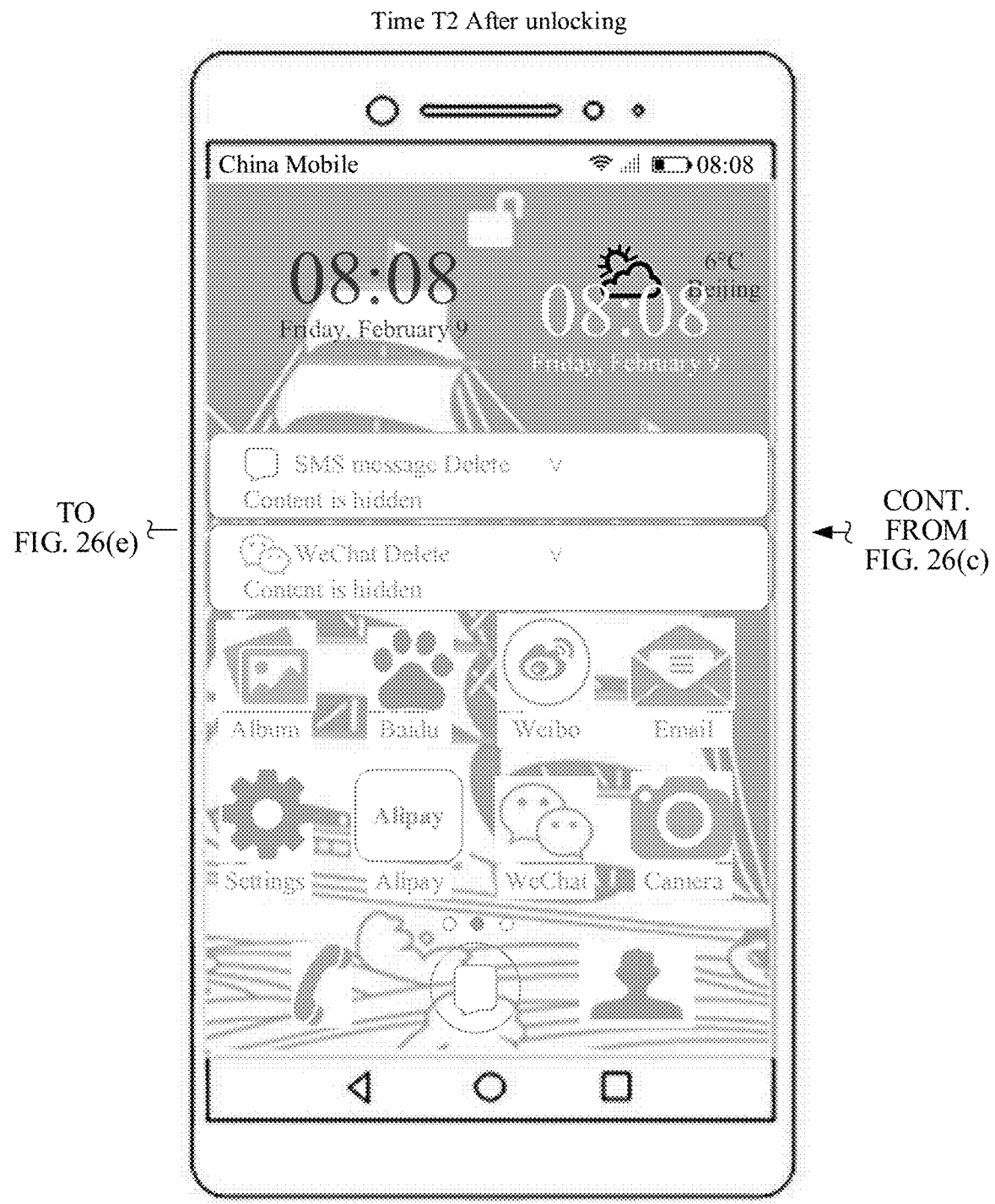
Figure 26E:
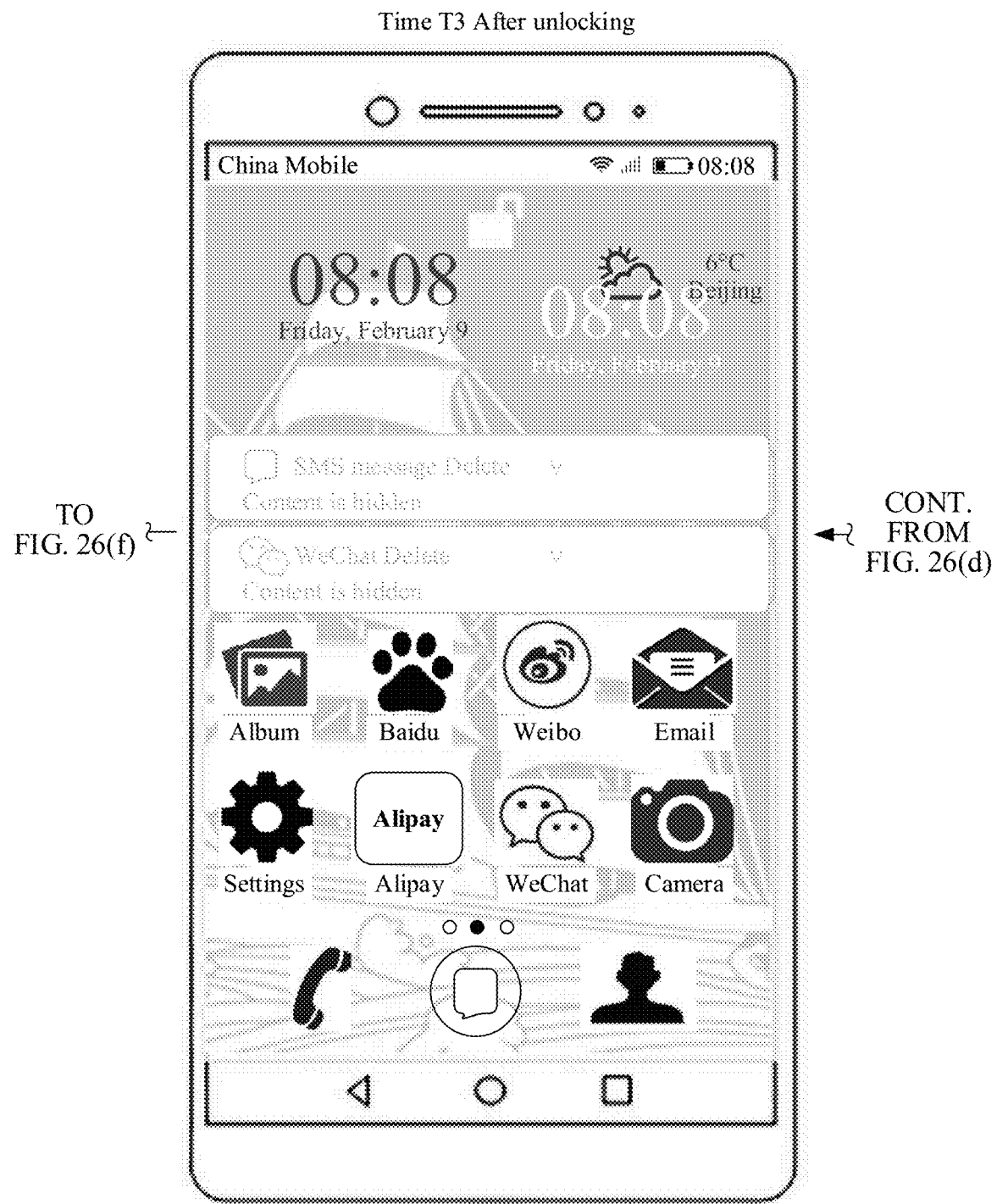
Figure 26F:
Figure 27F:
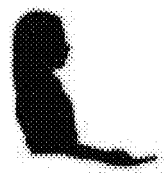
FIG. 27(a) to FIG. 27(j) are a schematic diagram of another group of screens according to an embodiment of this application.
Figure 27A:
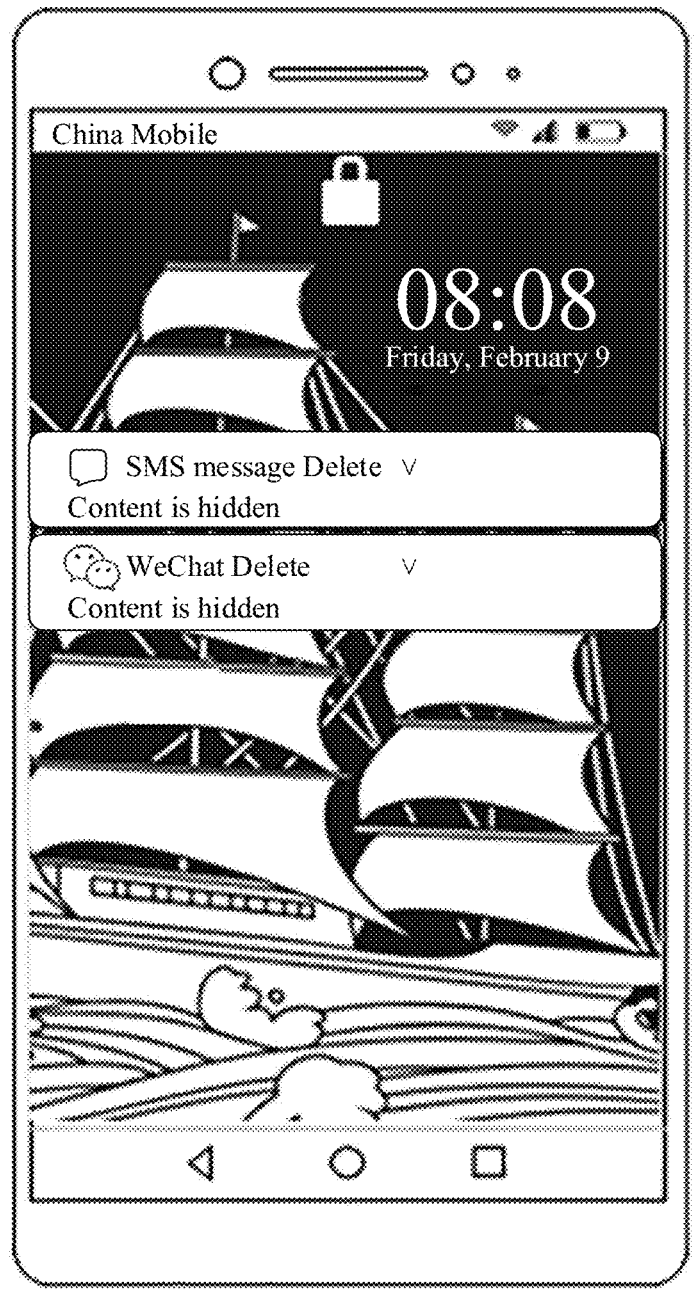
Figure 27G:
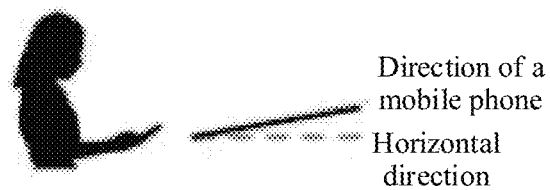
Figure 27B:
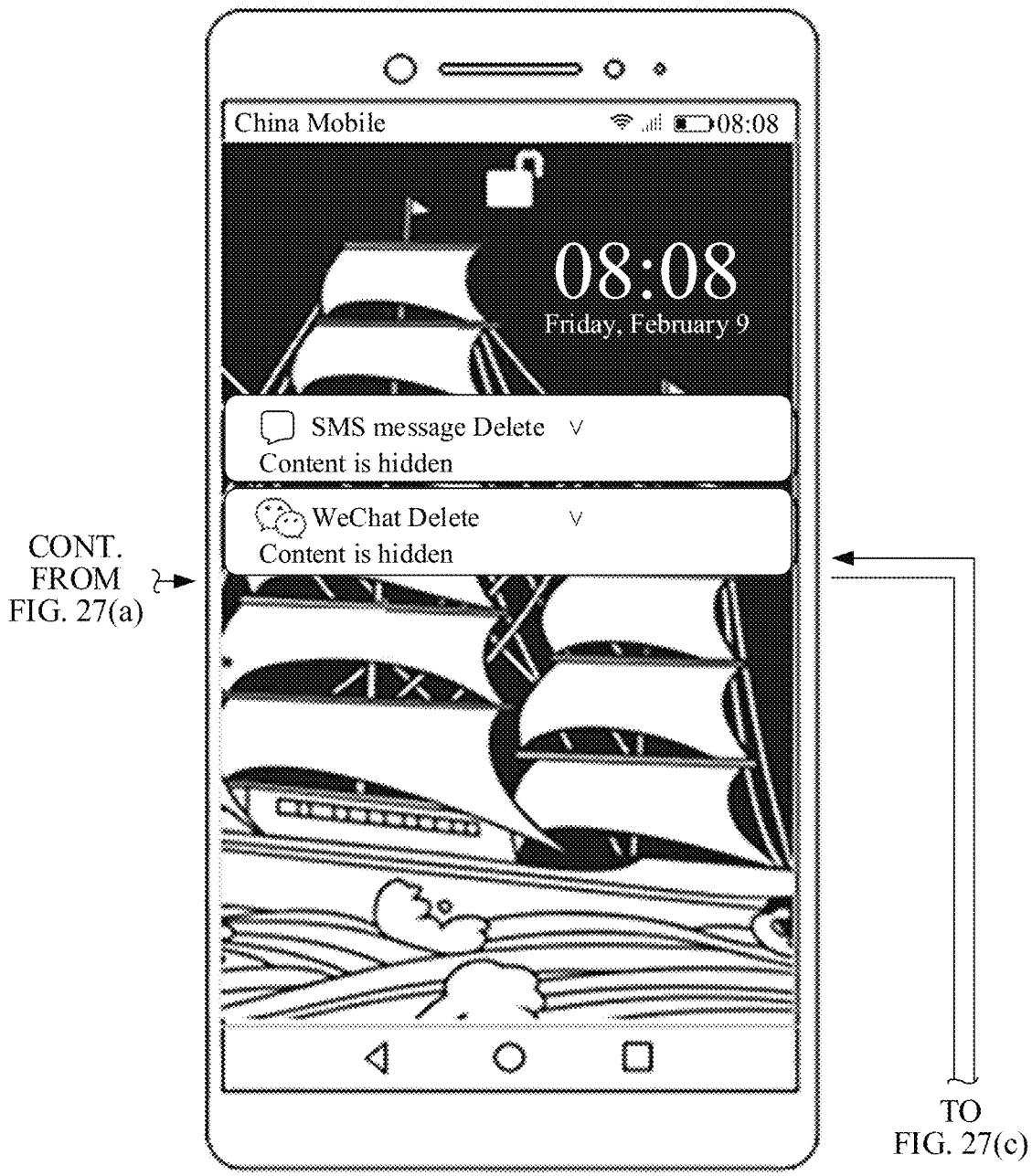
Figure 27H:
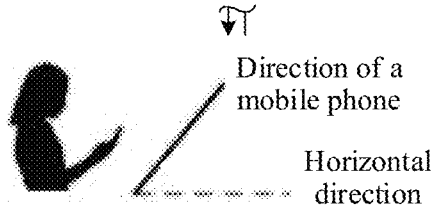
Figure 27C:
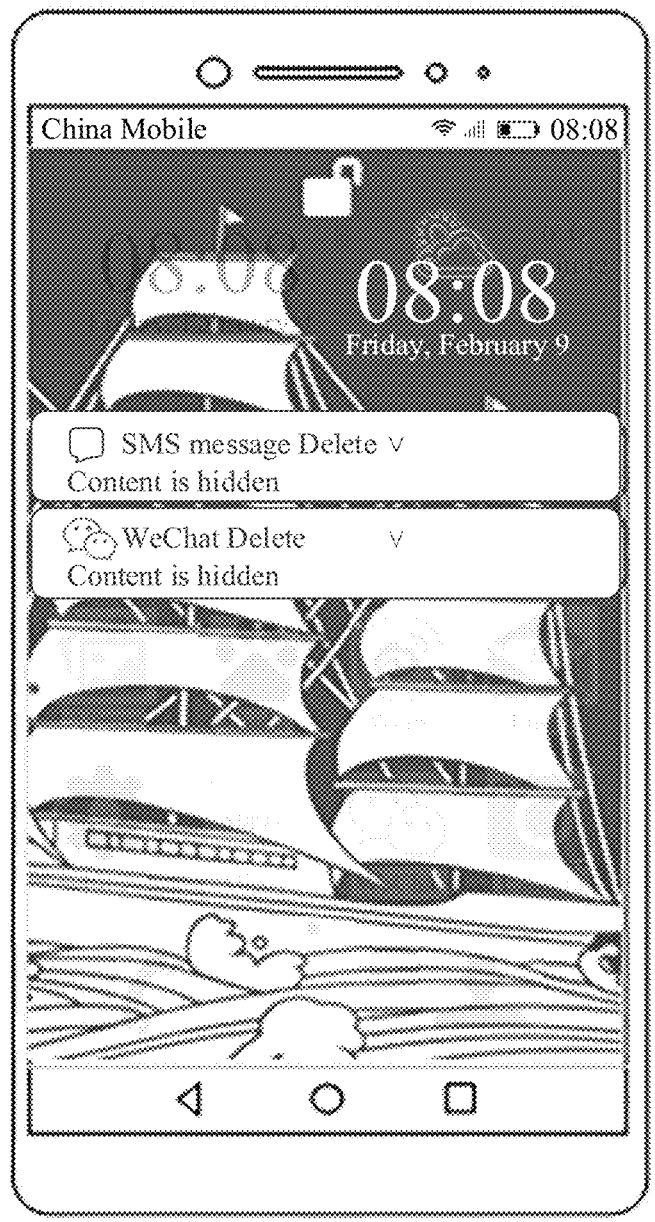
Figure 27I:
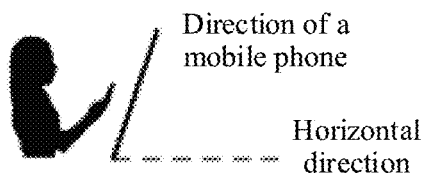
Figure 27D:
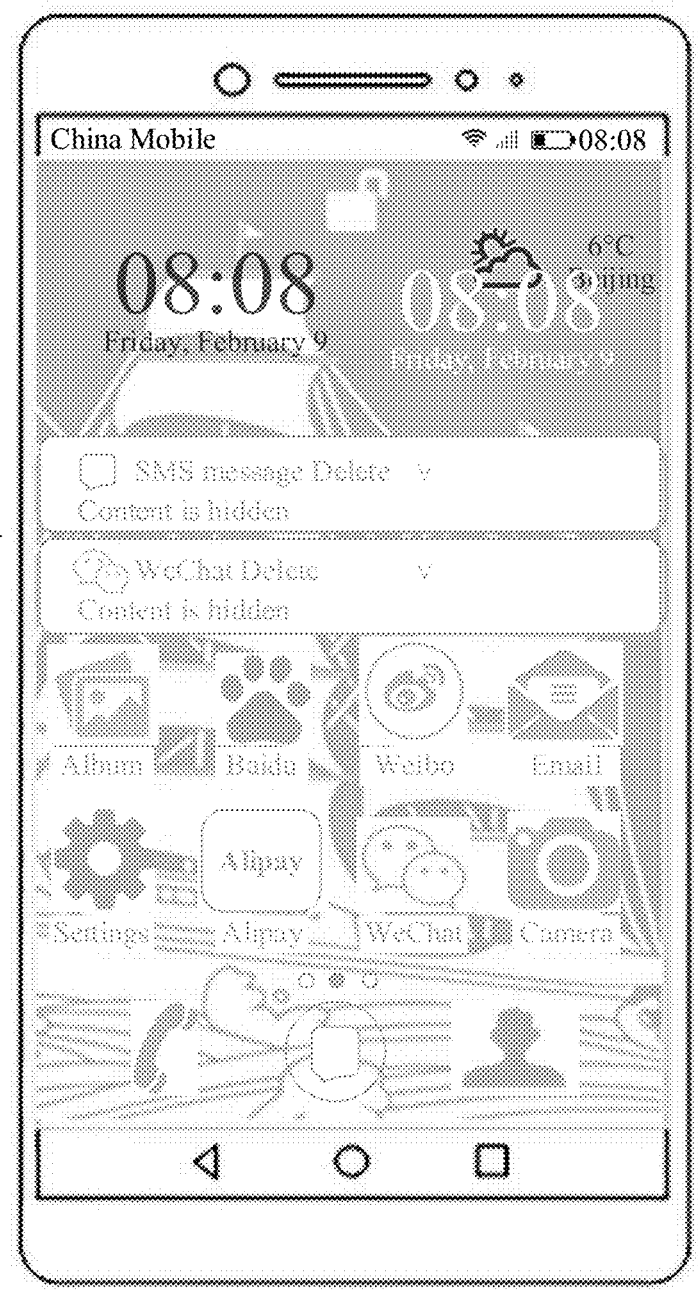
Figure 27J:
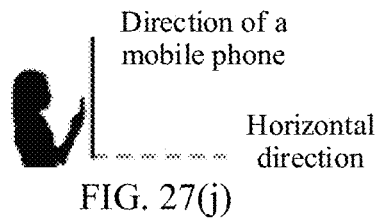
Figure 27E:
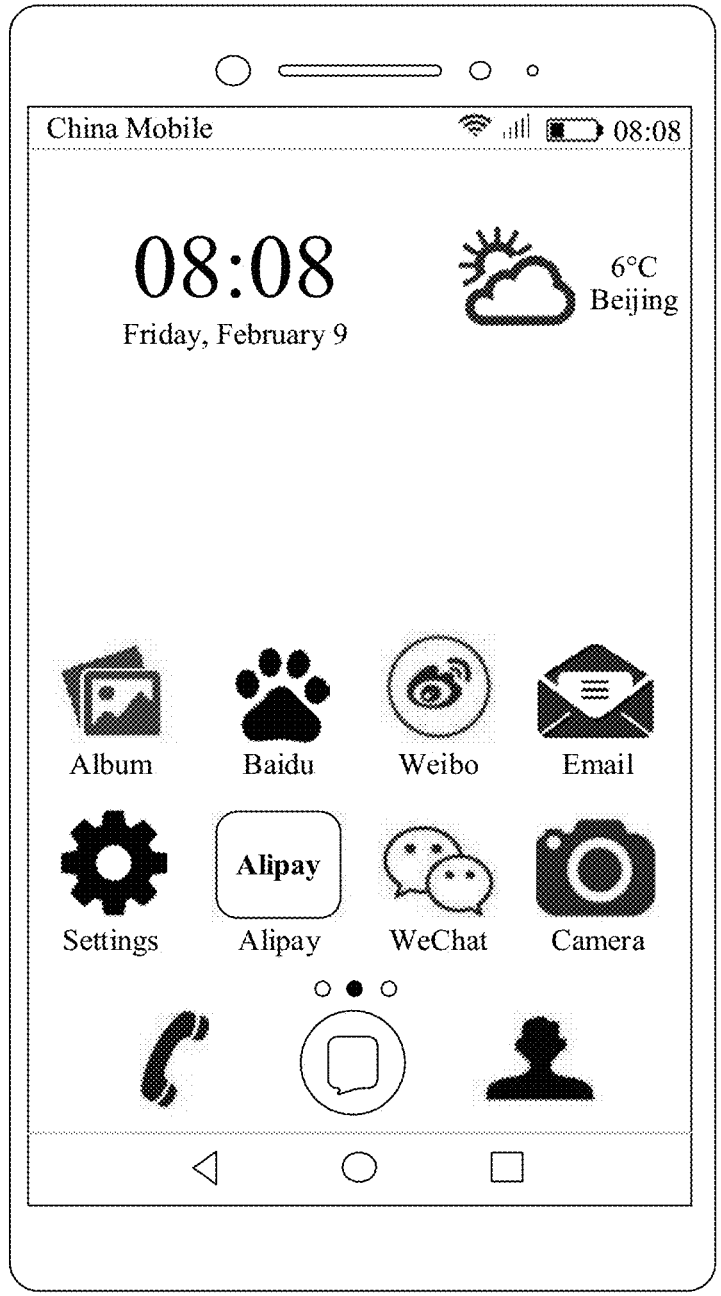

For example, referring to FIG. 20(a) and FIG. 20(b), when the third screen is a desktop, a third screen function area 2000 may include areas occupied by an application icon, a service icon, and a widget plug-in icon on the desktop.

The preset operation detected in the third screen function area may include a preset operation on the second control and a preset operation on the third screen. If the electronic device detects the preset operation on the second control in the third screen function area, the electronic device displays an application screen corresponding to the second control. If the electronic device detects the preset operation on the third screen in the third screen function area, the electronic device displays a screen corresponding to the third screen.

When the unlock screen includes the second screen and the third screen, in a sixth solution in step 404, when the electronic device detects a preset operation performed on the unlock screen, if a first response event corresponding to the preset operation exists on the second screen, the electronic device displays a screen corresponding to the first response event, where the screen is the screen corresponding to the first control, and the screen corresponding to the first control includes an application screen corresponding to the first control and a screen corresponding to the second screen on which the first control is located; and if a second response event corresponding to the preset operation exists on the third screen, but the first response event corresponding to the preset operation does not exist on the second screen, the electronic device displays another screen corresponding to the second response event, where the another screen is the screen corresponding to the second control, and the screen corresponding to the second control includes an application screen corresponding to the second control and a screen corresponding to the third screen on which the second control is located.

In other words, the electronic device may preferably respond to a response event of the second screen for the preset operation, to preferably display the screen corresponding to the second screen. For example, referring to FIG. 16-1(*a*) and FIG. 16-1(*b*), when the electronic device detects a tap operation, a first response event in response to the tap operation exists on the second screen, that is, a WeChat notification screen is opened; and a second response event in response to the tap operation also exists on the third screen, that is, a Baidu application screen is opened. In this case, the electronic device preferably processes the first response event, to display the WeChat notification screen.

When the unlock screen includes the second screen and the third screen, in a seventh solution in step 404, when the electronic device detects a preset operation performed on the unlock screen, if a response event corresponding to the preset operation exists on the second screen and a response event corresponding to the preset operation exists on the third screen, the electronic device preferably displays a screen corresponding to a response event corresponding to a screen that is in the second screen and the third screen and that is disposed in the front. For example, referring to FIG. 16-1(*a*) and FIG. 16-1(*b*), when the electronic device detects a tap operation, a first response event in response to the tap operation exists on the second screen, that is, a WeChat notification screen is opened; and a second response event in response to the tap operation also exists on the third screen, that is, a Baidu application screen is opened. If the second screen is disposed in the front of the third screen, the electronic device preferably processes the first response event, to display the WeChat notification screen. If the third screen is disposed in the front of the second screen, the electronic device preferably processes the second response event, to open the Baidu application screen.

In some embodiments of this application, referring to FIG. 21(*a*) to FIG. 21(*d*), the displaying an unlock screen in step 404 specifically includes: displaying, by the electronic device, the second screen; and displaying the third screen by superimposing the third screen on the second screen, to form the unlock screen. After the electronic device is unlocked, the user is usually accustomed to first viewing the "lock screen obtained after unlocking". Therefore, after being unlocked, the electronic device may first display the second screen, so that the user can clearly view the second screen, then display the unlock screen, and display the first screen when a preset condition is met. A time for independently displaying the second screen may be relatively short, for example, may be 2 s. After displaying the second screen for 2 s, the electronic device may automatically display the unlock screen.

In some other embodiments of this application, the displaying, by the electronic device, an unlock screen in step 403 may include: referring to FIG. 22(*a*) to FIG. 22(*d*), when the electronic device detects that a preset condition is met, increasing, by the electronic device, transparency of a part of an area or an entire area of the second screen or transparency of a part of an area or an entire area of the third screen, to display the unlock screen. Based on this, step 404 may specifically include: displaying, by the electronic device, the first screen when the transparency of the part of the area or the entire area of the second screen or the transparency of the part of the area or the entire area of the third screen is greater than or equal to a first preset value (for example, may be 85%), where the first screen is specifically the third screen; and displaying, by the electronic device, the first screen in a corresponding solution when the conditions described in the second to the seventh solutions in step 404 are met. Details are not described herein again.

Alternatively, the displaying, by the electronic device, an unlock screen in step 403 may include: referring to FIG. 23(*a*) to FIG. 23(*e*), displaying, by the electronic device, the second screen; and when detecting that a preset condition is met, increasing, by the electronic device, transparency of a part of an area or an entire area of the second screen or transparency of a part of an area or an entire area of the third screen, to display the unlock screen. Based on this, step 404 may specifically include: displaying, by the electronic device, the first screen when the transparency of the part of the area or the entire area of the second screen or the transparency of the part of the area or the entire area of the third screen is greater than or equal to a first preset value, where the first screen is specifically the third screen; and displaying, by the electronic device, the first screen in a corresponding solution when the conditions described in the second to the seventh solutions in step 404 are met.

The following specifically describes a display process of the first screen by using an example in which the second screen is disposed in the front of the third screen in the solution shown in FIG. 23(*a*) to FIG. 23(*e*).

For example, in a possible manner, when the electronic device detects that a finger of the user approaches a screen, the electronic device increases transparency of the second screen. For example, referring to FIG. 24(*a*) to FIG. 24(*j*), after a screen is unlocked, the electronic device displays a second screen whose transparency is 0. In a process in which a finger of a user approaches the screen, the transparency of the second screen is increased, and when the finger is closer to the screen, the transparency of the second screen is higher. When the transparency of the second screen is greater than or equal to a first preset value (for example, 85% or 100%), the electronic device exits the second screen and displays only the third screen. In a specific implementation, when a distance between the finger and the screen is less than or equal to a preset value c (or the finger touches the screen), the transparency of the second screen is greater than or equal to the first preset value. Alternatively, the finger may be a finger wearing a glove. For example, the preset value c may be 1 cm (centimeter).

In this implementation, after the screen is unlocked, in a process in which the user operates the second screen or the third screen by using the finger, the transparency of the second screen may be increased when the finger moves to the screen, and the user does not need to perform a dedicated operation by using the finger to increase the transparency of the second screen. When the finger of the user moves to the screen, it may indicate that the user has an intention to operate the second screen or the third screen instead of just expecting to browse information such as a time and a date on the second screen. Therefore, the electronic device may increase the transparency of the second screen in the process in which the finger moves to the screen, so as to display the second screen and the third screen in a superimposition manner, so that the user can conveniently and directly operate the second screen or the third screen, to improve interaction efficiency and user experience.

For example, after the screen is unlocked, the second screen whose transparency is 0 is displayed on the screen. When the user expects to use a WeChat application on a desktop, the user needs to tap a WeChat icon (a shortcut) on the desktop, and the finger of the user needs to move to the screen. In the process in which the finger of the user moves to the screen, the transparency of the second screen is increased, the desktop behind the second screen is presented through the second screen, and the user can see the WeChat icon on the desktop, so that the user can directly tap the WeChat icon to open the WeChat application, and the electronic device displays a WeChat application screen. Therefore, compared with the prior art in which an application on a desktop can be used only by performing such a multi-step operation in which the second screen is first exited by performing a finger sliding operation and then an application icon on the desktop is tapped, in the solution provided in this embodiment of this application, after the screen is unlocked, the user can directly view the second screen, and can directly use the application on the desktop by performing a one-step operation in which the finger taps the application icon on the desktop. Therefore, a quantity of operation steps and a time of the user can be reduced, and convenience, efficiency, and experience of using the electronic device by the user can be improved.

Further, referring to FIG. 25(a) to FIG. 25(k) and FIG. 25(m), when transparency of an entire second screen is increased when the finger approaches the screen, transparency of a second screen of a coverage area of the finger may be higher, and transparency of an area that is on the second screen and that is close to the coverage area of the finger is greater than transparency of an area that is on the second screen and that is away from the coverage area of the finger. In other words, the transparency of the entire second screen is in a gradient effect.

Specifically, a value of the transparency of the second screen may be inversely proportional to a distance between the finger and the screen. A smaller distance between the finger and the screen indicates higher transparency of the second screen. Alternatively, the electronic device may periodically detect whether the finger approaches the screen, and if the finger approaches the screen, the electronic device increases the transparency of the second screen based on a preset step. Alternatively, when detecting that a distance by which the mobile phone moves to the screen is greater than a preset value d (for example, 2 mm), the electronic device increases the transparency of the second screen based on a preset step (for example, 5%).

In another possible implementation, the electronic device may increase the transparency of the second screen based on a time after being unlocked. For example, referring to FIG. 26(a) to FIG. 26(f), the electronic device may gradually increase the transparency of the second screen as the time after being unlocked is prolonged, where T1<T2<T3<T4 In a specific implementation, the transparency is increased by 10% each time the time is prolonged by 0.5 s. When the transparency of the second screen is greater than or equal to a first preset value, the electronic device exits the second screen and displays only the third screen.

Alternatively, the electronic device does not immediately increase the transparency of the second screen after being unlocked. If the electronic device determines that a time difference between a current moment and a moment at which facial information is successfully recognized is greater than a preset value e, the electronic device gradually increases the transparency of the second screen. When the transparency of the second screen is greater than or equal to a first preset value, the electronic device exits the second screen and displays only the third screen. In this implementation, in a time period corresponding to the preset value e, the user may have sufficient time to view and operate the second screen. If the user does not operate the second screen in the time period corresponding to the preset value e, the user may intend to operate the third screen. Therefore, the electronic device may automatically increase the transparency of the second screen to present the third screen behind the second screen, so that the user can directly operate the third screen. In this case, the electronic device can exit the second screen and display the third screen without a same additional sliding operation performed by the user for operating the third screen as that in the prior art.

In this possible implementation, the electronic device may increase the transparency of the second screen without participation of the user, to display the second screen and the third screen in a superimposition manner, so that the user can directly operate the second screen and the third screen, so as to reduce a quantity of operation steps of the user, and improve user experience.

In another possible implementation, the electronic device may increase the transparency of the second screen based on an included angle between the electronic device and a horizontal plane. For example, if the electronic device determines that the included angle between the electronic device and the horizontal plane is greater than a preset angle value (for example, which may be 45°), the electronic device increases the transparency of the second screen to a relatively large value at a time, for example, 50%. Alternatively, if the electronic device determines that the included angle between the electronic device and the horizontal plane is increased, the electronic device gradually increases the transparency of the second screen.

Alternatively, if the electronic device determines that an amplitude by which the included angle between the electronic device and the horizontal plane is increased is greater than a preset value f (for example, which may be 10°), the electronic device increases the transparency of the second screen based on a preset step (for example, 15%) (that is, increases the transparency by 15%). When the transparency of the second screen is greater than or equal to a first preset value, the electronic device exits the second screen and displays only the third screen. For example, referring to FIG. 27(a) to FIG. 27(j), when the included angle between the electronic device and the horizontal plane is increased, the transparency of the second screen is increased, and the third screen may be relatively clearly presented on a screen through the second screen.

In a process of lifting the electronic device such as a mobile phone, head information recognition may be completed to unlock the screen; and the transparency of the second screen may be increased to display the second screen and the third screen in a superimposition manner, so that the user can directly operate the second screen and the third screen. In this case, the electronic device can exit the second screen and display the third screen without a dedicated sliding operation performed by the user, thereby reducing a quantity of operation steps of the user, and improving use efficiency and use experience.

In another possible implementation, the electronic device may increase the transparency of the second screen based on an expression or a facial action of the user. For example, after detecting a preset expression of the user, the electronic device may increase the transparency of the second screen to a relatively large value (for example, 50%), so that the third screen can be relatively clearly presented through the second screen. When the transparency of the second screen is greater than or equal to a first preset value, the electronic device exits the second screen and displays only the third screen. For another example, after detecting a preset expression of the user, the electronic device may gradually increase the transparency of the second screen. For example, referring to FIG. 28-1(a) to FIG. 28-1(f) and FIG. 28-1(h), after a screen is unlocked, the electronic device displays a second screen whose transparency is 0. When detecting the expression that the user closes one eye, the electronic device gradually increases the transparency of the second screen.

Alternatively, different expressions may correspond to transparency with different values. When detecting an expression, the electronic device increases the transparency of the second screen to transparency corresponding to the expression.

Figures 1A, 28:
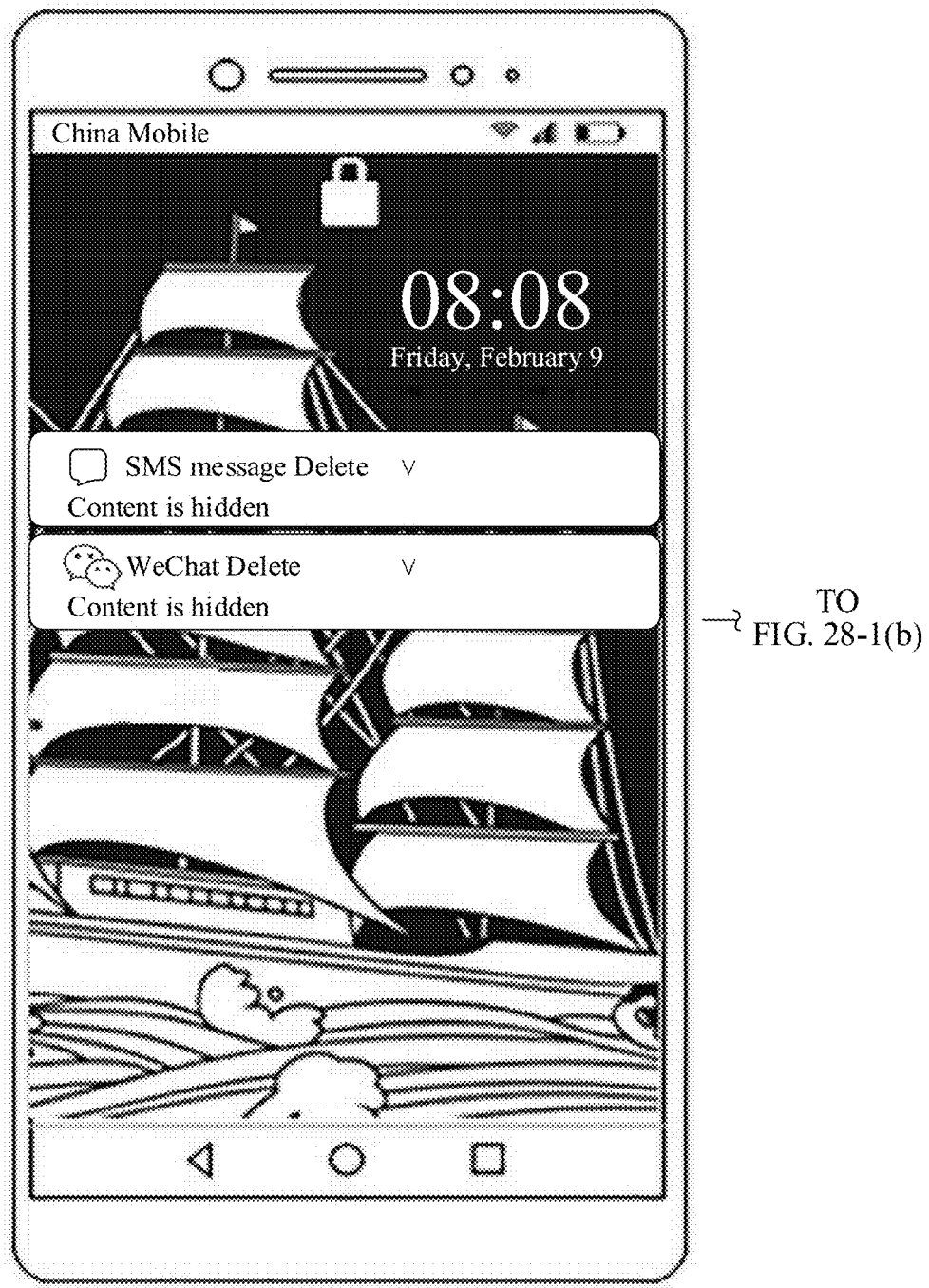
Figures 1F, 28:
Figures 1B, 28:
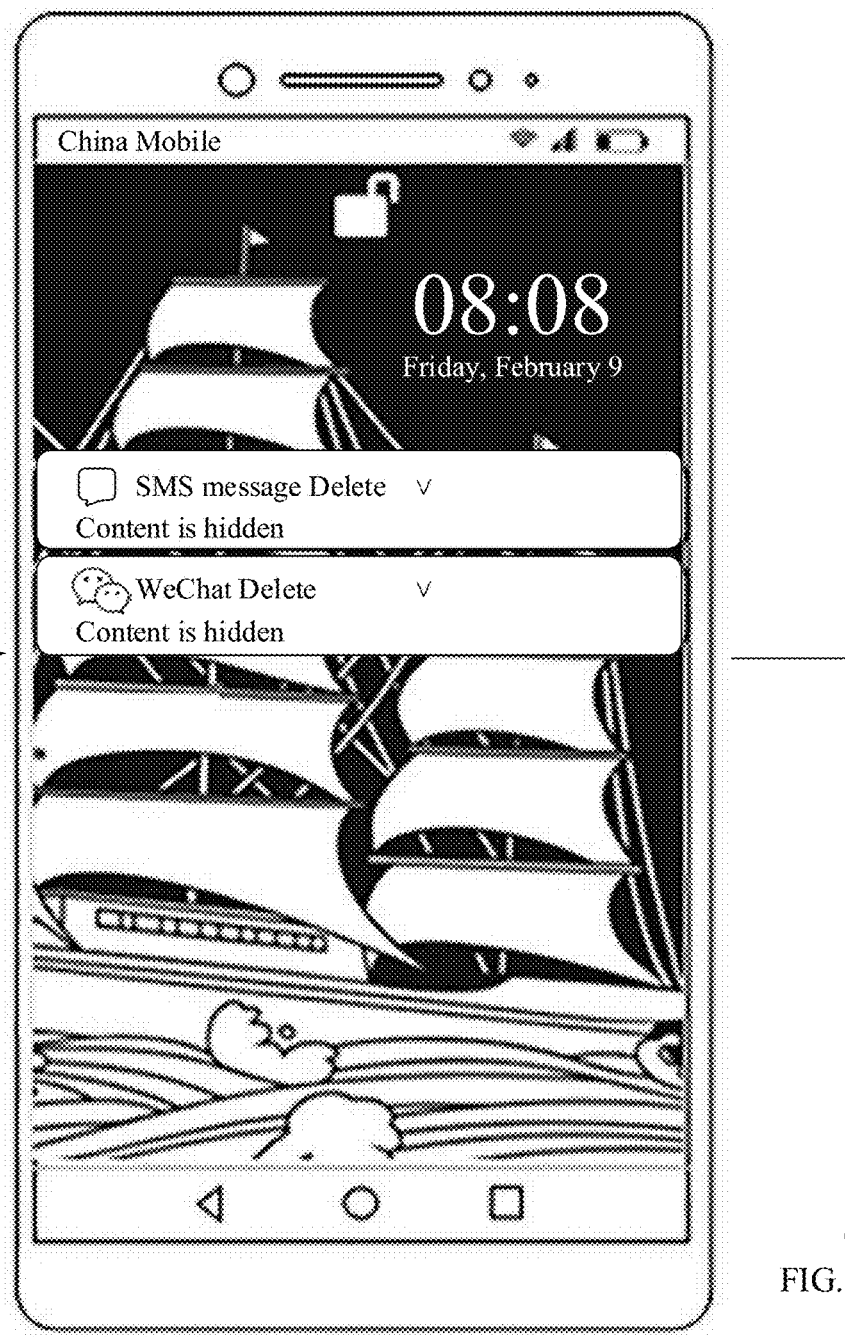
Figures 1H, 28:
Figures 1C, 28:
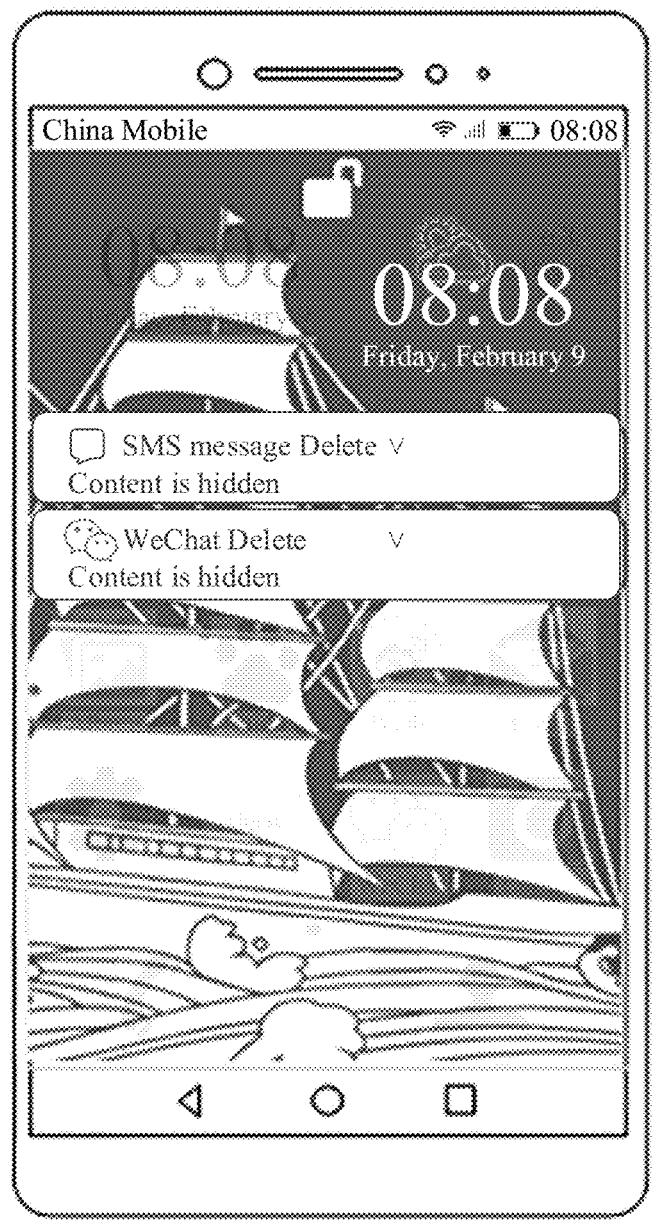
Figures 1D, 28:
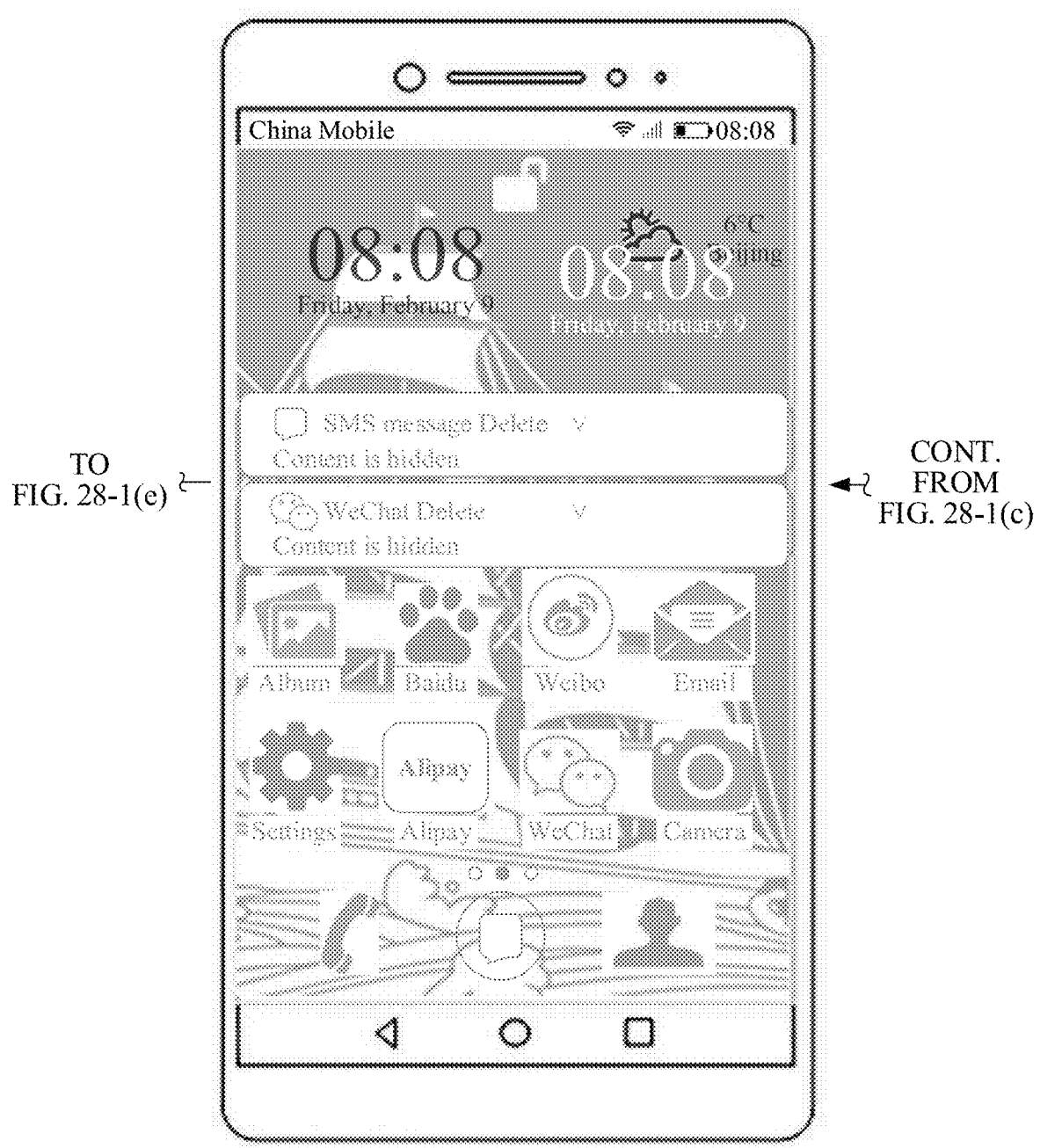
Figures 1E, 28:
Figures 2A, 28:
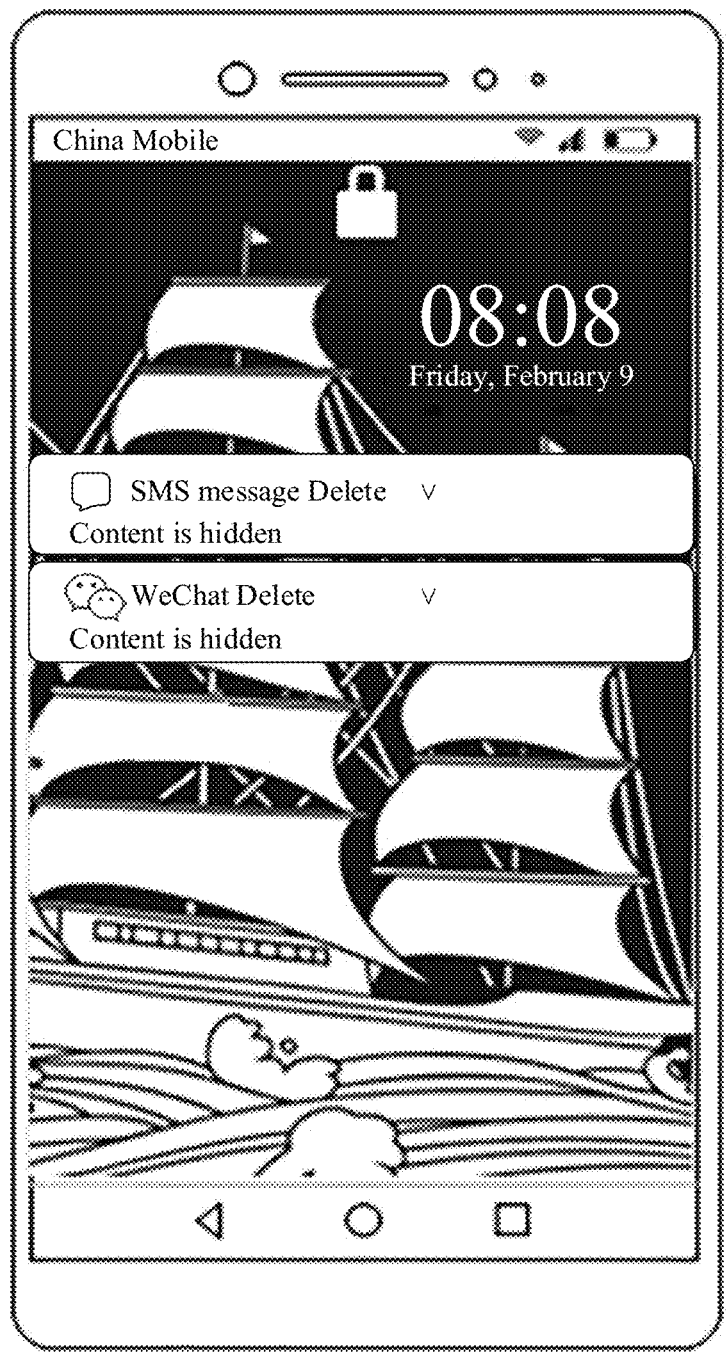
Figures 2E, 28:
Figures 2B, 28:
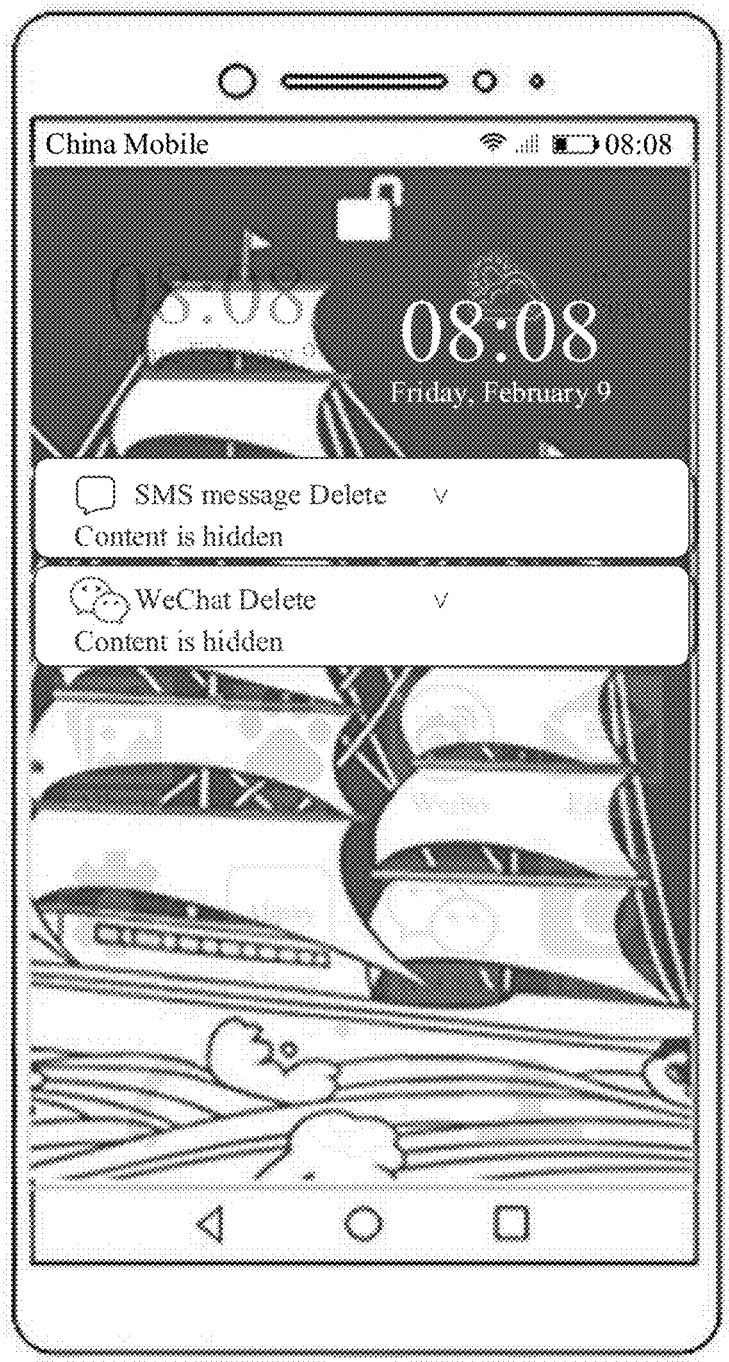
Figures 2F, 28:
Figures 2C, 28:
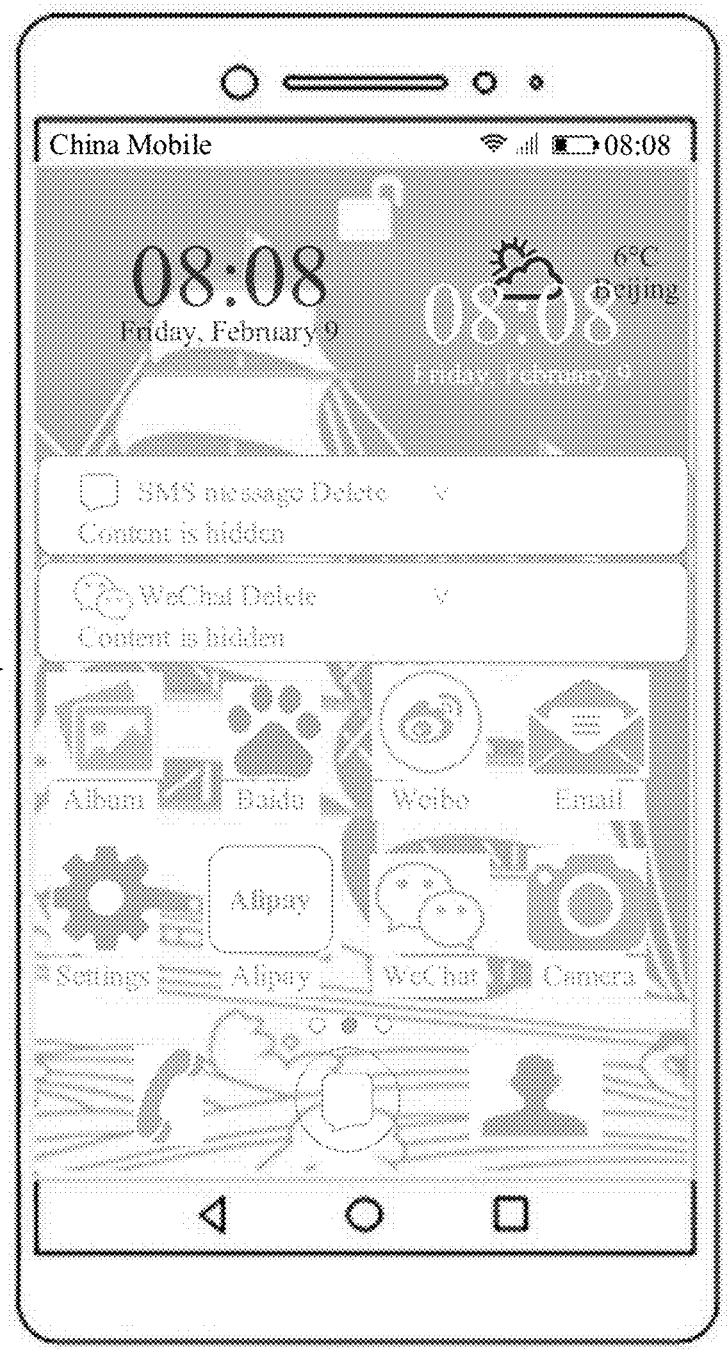
Figures 2G, 28:
Figures 2D, 28:
Figure 29A:
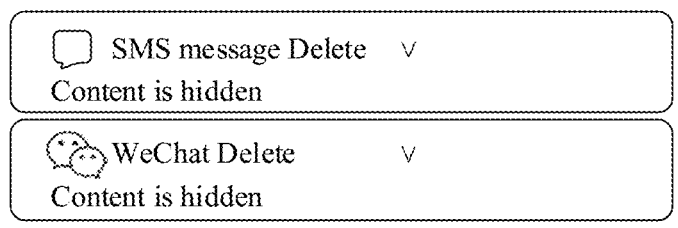
Figure 29H:
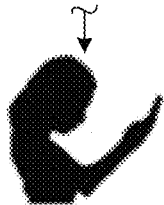
Figure 29C:
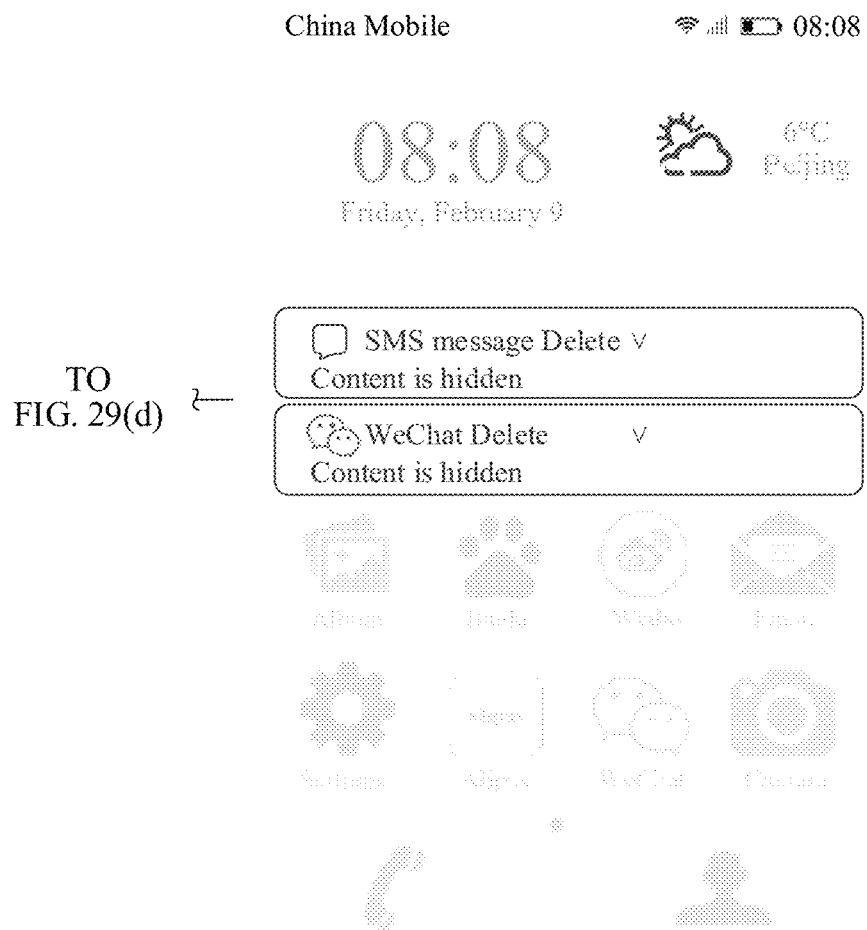
Figure 29D:
Figure 29D:
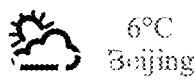
Figure 29D:
Figure 29D:
Figure 29D:
Figure 29D:
Figure 29D:
Figure 29D:
Figure 29D:
Figure 29D:
Figure 29D:
Figure 29D:
Figure 29D:
Figure 29D:
Figure 29D:
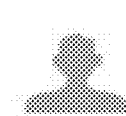
Figure 29E:

For example, a smile may correspond to 50% transparency, and a laugh may correspond to 100% transparency. For example, referring to FIG. 28-2(a) to FIG. 28-2(g), after a screen is unlocked, when detecting the expression of a user smile, the electronic device increases the transparency of the second screen to 50%; or when detecting the expression of a user laugh, the electronic device increases the transparency of the second screen to 100%.

Alternatively, when detecting a preset facial action (for example, fast blinking) of the user, the electronic device may increase the transparency of the second screen based on a preset step (for example, 20%), or increase the transparency of the second screen to a relatively large value.

In a process of lifting the electronic device such as a mobile phone, head information recognition may be completed to unlock the screen; and the transparency of the second screen may be increased based on a natural action such as a user expression to display the second screen and the third screen in a superimposition manner, so that the user can directly operate the second screen and the third screen. In this case, the electronic device can exit the second screen and display the third screen without a dedicated sliding operation performed by the user, thereby reducing a quantity of operation steps of the user, and improving use efficiency and use experience.

In another possible implementation, the electronic device may increase the transparency of the second screen based on a head action of the user. For example, after detecting a preset head action of the user, the electronic device may increase the transparency of the second screen to a relatively large value (for example, 50%), so that the third screen can be relatively clearly presented through the second screen. When the transparency of the second screen is greater than or equal to a first preset value, the electronic device exits the second screen and displays only the third screen. Alternatively, after detecting a preset head action, the electronic device may gradually increase the transparency of the second screen. For example, referring to FIG. 29(a) to FIG. 29(f) and FIG. 29(h), after a screen is unlocked, the electronic device displays a second screen whose transparency is 0. When detecting the action that the user lowers a head, the electronic device gradually increases the transparency of the second screen.

Alternatively, different head actions may correspond to transparency with different values. When detecting a head action, the electronic device increases the transparency of the second screen to transparency corresponding to the head action. For example, a lower head may correspond to 50% transparency, a raised head may correspond to 80% transparency, and a left turn may correspond to 100% transparency.

In a process of lifting the electronic device such as a mobile phone, head information recognition may be completed to unlock the screen; and the transparency of the second screen may be increased based on a natural action such as a head action of the user to display the second screen and the third screen in a superimposition manner, so that the user can directly operate the second screen and the third screen. In this case, the electronic device can exit the second screen and display the third screen without a dedicated sliding operation performed by the user, thereby reducing a quantity of operation steps of the user, and improving use efficiency and use experience.

In addition, in an implementation that is of increasing the transparency of the second screen to display the second screen and the third screen in a superimposition manner and that is provided in this embodiment of this application, both hands of the user can be freed as much as possible, and user experience can be better improved especially when the user unwillingly or inconveniently performs an operation by using a hand. For example, the transparency of the second screen may be increased without a manual operation of the user in a scenario in which the user is driving and cannot spare a hand to perform an operation; or in a scenario in which on a bus or subway, the user needs to hold a handrail by using one hand and hold a mobile phone by using the other hand, but because a screen of the mobile phone is increasingly larger, it is difficult for the user to perform an operation when holding the mobile phone by using the hand; or in a scenario in which in winter, because weather is very cold, the user unwillingly performs an operation by using a hand; or in a scenario in which a mobile phone is not easily reached by using a hand; or in a scenario in which the user does not expect to perform a manual operation. For example, when the third screen is a web page browsed before screen locking, the user does not need to perform a manual operation to unlock the screen and increase the transparency of the second screen to a relatively large value, so as to continue to browse the web page browsed before screen locking.

Further, when the transparency of the second screen is less than a second preset value, the electronic device may further reduce transparency of a screen that is on an unlock screen and that is disposed in the front, where the second preset value is less than the first preset value. To be specific, when the second screen is disposed in the front, and the transparency of the second screen is less than the second preset value, the second screen and the third screen are displayed on the screen in a superimposition manner, and the electronic device has not exited the second screen, so that the electronic device can reduce the transparency of the second screen. When the transparency of the second screen is reduced, the user may clearly view information on the second screen and conveniently operate the second screen. In addition, when the transparency of the second screen is reduced to 0, the third screen is completely blocked by the second screen, and the user cannot see the third screen.

When the transparency of the second screen is reduced to 0, the electronic device may further automatically lock the screen.

Specifically, a method for reducing the transparency of the second screen by the electronic device may be opposite to a method for increasing the transparency of the second screen by the electronic device. For example, referring to FIG. 24(a) to FIG. 24(j), when detecting that a finger of the user is away from a screen, the electronic device reduces the transparency of the second screen. Alternatively, referring to FIG. 27(a) to FIG. 27(j), when an included angle between the electronic device and a horizontal plane is reduced, the electronic device reduces the transparency of the second screen. A specific implementation process in which the electronic device reduces the transparency of the second screen is not described in detail in this embodiment of this application.

In a possible implementation, the second to the seventh solutions in step 404 are implemented in this condition: Transparency of a screen that is in the second screen and the third screen and that is disposed in the front is greater than or equal to a third preset value (for example, 15%), where the third preset value is less than the first preset value. When transparency of a screen disposed in the front is less than a third preset value, if a preset operation is detected, the electronic device displays only a screen corresponding to a control on the screen disposed in the front and a screen corresponding to the screen disposed in the front, but does not display a screen corresponding to a control on a screen disposed in the rear and a screen corresponding to the screen disposed in the rear.

Figure 30:
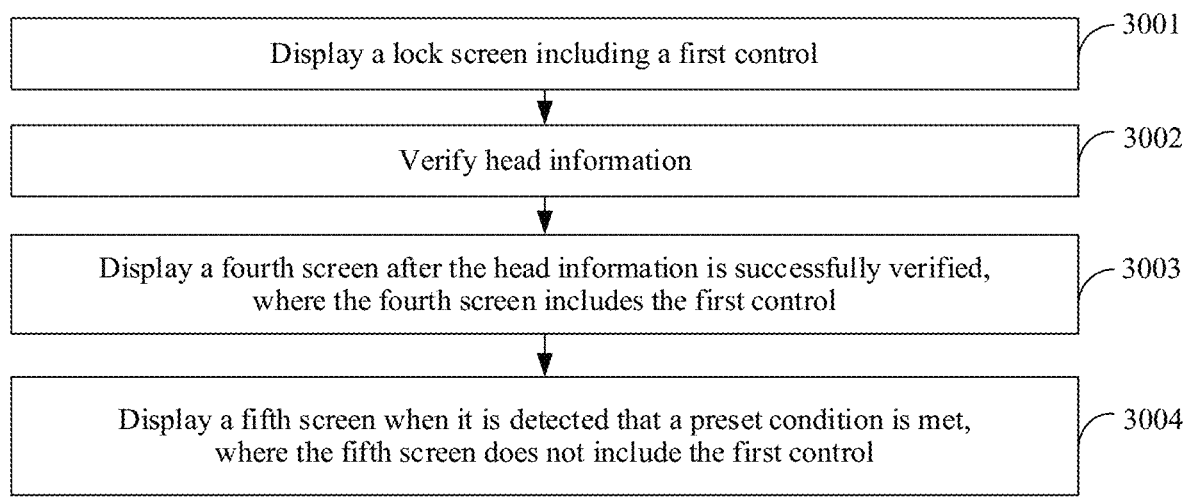
FIG. 30 is a flowchart of another display control method according to an embodiment of this application.

Another embodiment of this application provides a display control method, applied to an electronic device with a touch display screen. Referring to FIG. 30, the method may include the following steps:

3001: The electronic device displays a lock screen including a first control.

3002: The electronic device verifies head information.

3003: The electronic device displays a fourth screen after the head information is successfully verified, where the fourth screen includes the first control.

3004: The electronic device displays a fifth screen when detecting that a preset condition is met, where the fifth screen does not include the first control.

The fourth screen may be the same as the foregoing second screen, and may be understood as a "lock screen obtained after unlocking". The fifth screen may be the same as the foregoing third screen, and may be specifically a desktop, an application screen opened before screen locking, a shortcut screen, HiBoard, or the like. A difference from the foregoing embodiment lies in that the electronic device does not display an unlock screen after being unlocked, but directly displays a first screen when the preset condition is met.

It should be noted that the preset condition does not include that a user touches a surface of a screen to perform an operation. For details, refer to the foregoing description of the preset condition in step 404. For example, the fifth screen is displayed when a floating event, a preset expression, or a preset head action is detected. Details are not described herein again. To be specific, in this embodiment of this application, after the electronic device is unlocked, when the user does not need to touch the surface of the screen to perform the operation, the electronic device may conveniently enter, automatically or based on a natural expression or head action used in a process in which the user lifts the electronic device, a screen such as a desktop, an application screen opened before screen locking, a shortcut screen, or HiBoard. Therefore, a quantity of manual operations of the user may be reduced or the user does not need to perform a manual operation, to improve interaction efficiency and user experience.

Figure 31A:
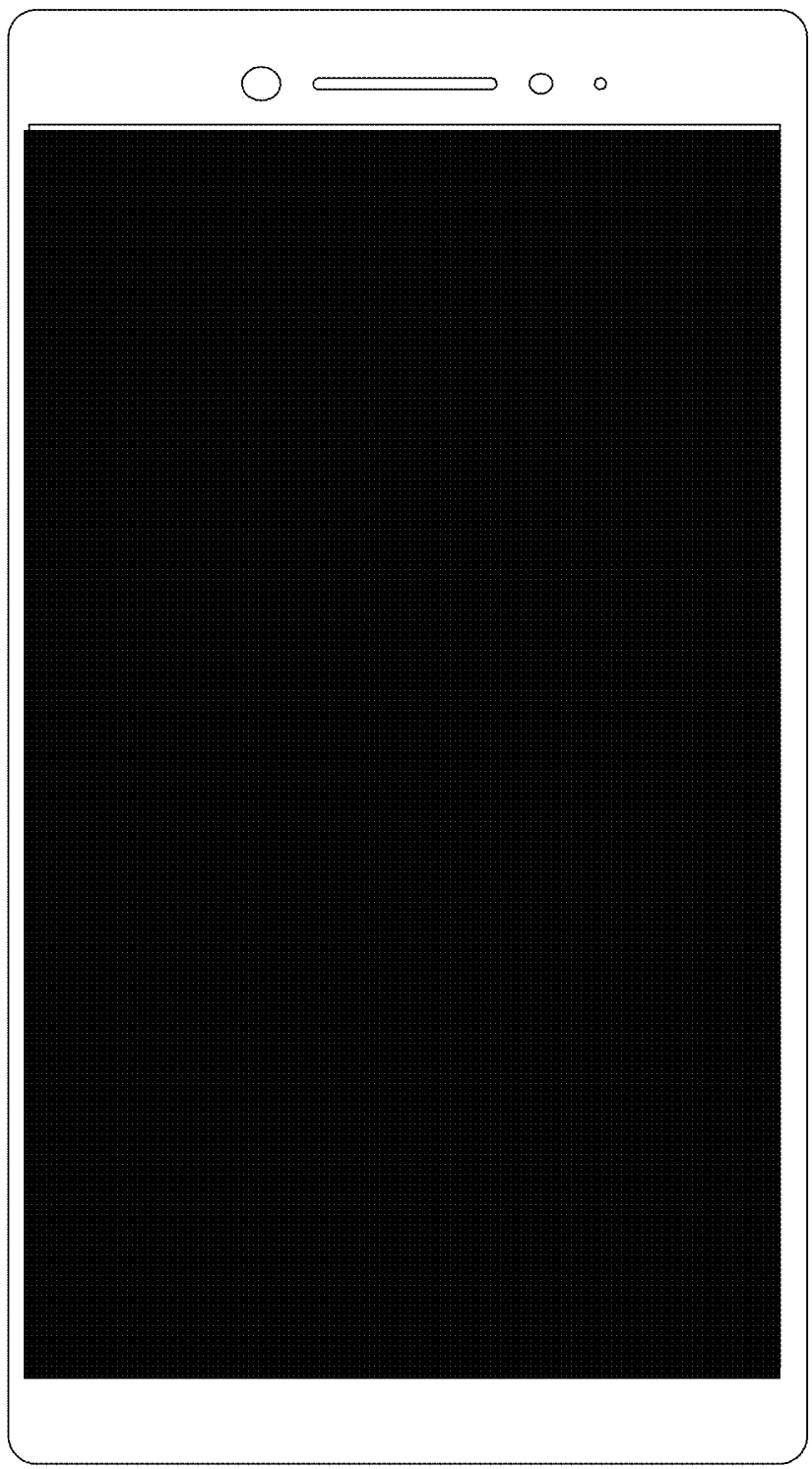
FIG. 31A and FIG. 31B are a schematic diagram of unlocking in a screen-off state according to an embodiment of this application.
Figure 31B:
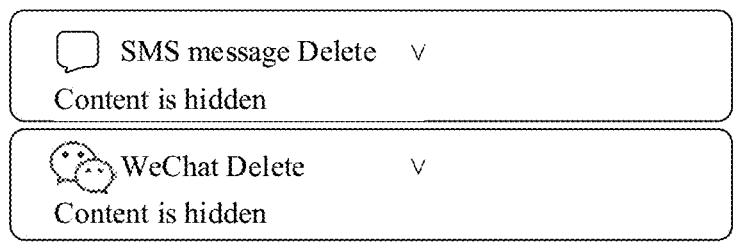

In addition, it should be further noted that in the method described in the foregoing embodiment, the electronic device verifies the head information after displaying the lock screen, in other words, the electronic device verifies the head information in a screen-on state. In some other embodiments of this application, referring to FIG. 31A and FIG. 31B, the electronic device may also verify head information and may be unlocked in a screen-off state.

It may be understood that to implement the foregoing functions, the electronic device includes a corresponding hardware structure and/or software module for performing each function. A person skilled in the art should be easily aware that algorithms and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device or the server may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 32:
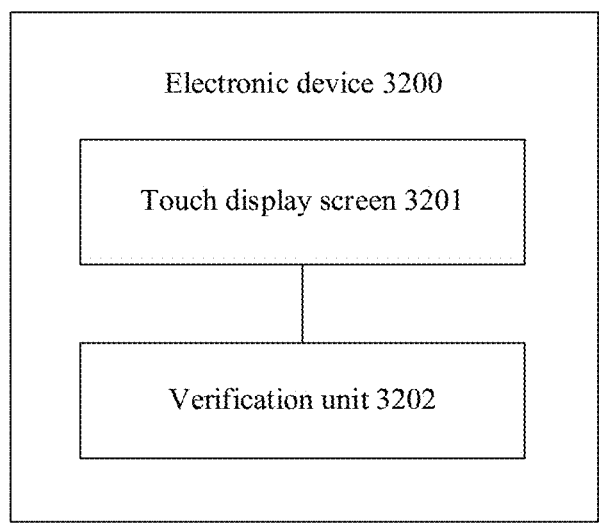
FIG. 32 is a schematic structural diagram of an electronic device according to an embodiment of this application.

When each function module is obtained through division based on each corresponding function, FIG. 32 is a possible schematic composition diagram of the electronic device in the foregoing embodiment. As shown in FIG. 32, the electronic device 3200 may include a touch display screen 3201 and a verification unit 3202.

The touch display screen 3201 may be configured to support the electronic device 3200 in performing step 401, step 403, and step 404 in the display control method shown in FIG. 2. The verification unit 3202 may be configured to support the electronic device 3200 in performing step 402 in the display control method shown in FIG. 2.

Alternatively, the touch display screen 3201 may be configured to support the electronic device 3200 in performing step 3001, step 3003, and step 3004 in the display control method shown in FIG. 30. The verification unit 3202 may be configured to support the electronic device 3200 in performing step 3002 in the display control method shown in FIG. 30.

In addition, the touch display screen 3201 and the verification unit 3202 may be further configured to perform another process of the technology described in this specification.

It should be noted that all related content of the steps in the foregoing method embodiments may be cited in function descriptions of corresponding function modules. Details are not described herein again.

The electronic device provided in this embodiment of this application is configured to perform the foregoing display control method. Therefore, a same effect as the foregoing display control method can be achieved.

When an integrated unit is used, the verification unit 3202 may be integrated into a processing module, and the touch display screen 3201 may be integrated into a display module.

The processing module is configured to: control and manage an action of the electronic device. For example, the processing module is configured to support the electronic device in performing step 402 in FIG. 2, or performing step 3002 in FIG. 30, may be further configured to support the electronic device in determining, in step 404 and step 3004, whether a preset condition is met, and/or is configured to perform another process of the technology described in this specification. The display module may be configured to support the electronic device in performing step 401, step 403, and step 404 in FIG. 2, or performing step 3001, step 3003, and step 3004 in FIG. 30, and may further display a graphical user interface, an image, a control, an icon, or the like to a user.

Specifically, the processing module may be a processor or a controller, for example, may be a central processing unit (central processing unit, CPU), a graphics processing unit (graphics processing unit, GPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The display module may be a display, and may be a device configured to display information entered by the user, information provided for the user, and various menus of the terminal. Specifically, the display may be configured in a form such as a liquid crystal display or an organic light-emitting diode. In addition, a touchpad may be further integrated into the display, and is configured to: collect a touch event on or near the touchpad, and send collected touch information to another device (for example, the processor).

In addition, the electronic device may further include a storage module and a communications module. The storage module is configured to store program code of the electronic device, parameters in a display control process, and the like. The communications module may be configured to support the electronic device in communicating with another network entity, for example, communicating with another electronic device.

The storage module may be a memory. The memory may include a high-speed RAM, or may include a nonvolatile memory, for example, a magnetic disk storage device, a flash memory device, or another volatile solid-state storage device.

The communications module may be specifically a device that interacts with another electronic device, such as a radio frequency circuit, a Bluetooth chip, or a WI-FI chip.

In a specific implementation, when the processing module is a processor, the display module is a display, and the storage module is a memory, the electronic device in this embodiment of this application may be specifically the mobile phone shown in FIG. 1.

An embodiment of this application further provides a computer storage medium. The computer storage medium stores a computer instruction, and when the computer instruction is run on an electronic device, the electronic device performs the foregoing related method steps to implement the display control method in the foregoing embodiments.

An embodiment of this application further provides a computer program product. When the computer program product is run on a computer, the computer is enabled to perform the foregoing related method steps to implement the display control method in the foregoing embodiments.

In addition, an embodiment of this application further provides an apparatus. The apparatus may be specifically a chip, a component, or a module. The apparatus may include a processor and a memory that are connected. The memory is configured to store a computer execution instruction, and when the apparatus runs, the processor may execute the computer execution instruction stored in the memory, so that the chip performs the display control method in the foregoing method embodiments.

The electronic device, the computer storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

In the descriptions in the foregoing implementations, a person skilled in the art may clearly understand that for the purpose of convenient and brief description, division into the foregoing function modules is merely used as an example for description. In actual application, the foregoing functions can be allocated to different function modules for implementation based on a requirement. To be specific, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may be one or more physical units, and may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display control method, implemented by an electronic device with a touch display wherein the display control method comprises:
   displaying a lock screen comprising a first control, wherein the lock screen does not comprise a second control;
   verifying head information;
   changing from the lock screen to an unlock screen in response to verifying the head information, wherein the unlock screen comprises a superpositioned display of a second screen and a third screen and a second screen function area, wherein the second screen comprises the first control and does not comprise the second control, and wherein the third screen comprises the second control and does not comprise the first control;
   displaying a first screen on the unlock screen when a preset condition is met, wherein the first screen does not comprise the first control, wherein the first screen comprises the second control, wherein the first screen corresponds to the first control, or wherein the first screen corresponds to the second control,
   wherein displaying a first screen on the unlock screen when a preset condition is met, wherein the first screen does not comprise the first control, wherein the first screen comprises the second control, wherein the first screen corresponds to the first control, or wherein the first screen corresponds to the second control comprises:
   displaying an eighth screen corresponding to a first response event in response to a seventh preset operation on the unlock screen and when the first response event exists on the second screen, wherein the eighth screen corresponds to the first control and comprises a sixth application screen corresponding to the first control and a ninth screen corresponding to the second screen.

2. The display control method of claim 1, wherein the second screen is the lock screen.

3. The display control method of claim 1, wherein the third screen comprises a desktop, a first application screen opened before screen locking, or a desktop assistant.

4. The display control method of claim 1, wherein the first screen is the third screen, and wherein the preset condition comprises at least one of, detecting a floating event, equaling or exceeding a preset time difference between a current moment and a moment at which the head information was recognized, continuously detecting the head information within a first preset duration after the head information is recognized, detecting that an included angle between the electronic device and a horizontal plane is greater than or equal to a preset angle value, detecting a preset expression, detecting a preset head action, or detecting a preset voice indication.

5. The display control method of claim 1, further comprising displaying the first screen when detecting a first preset operation on the first control.

6. The display control method of claim 1, wherein the display control method further comprises
   displaying the first screen when a fourth preset operation is in another area, wherein the first screen comprises a third application screen corresponding to the second control and a fifth screen corresponding to the third screen.

7. The display control method of claim 1, wherein the unlock screen comprises a third screen function area, and wherein the display control method further comprises:
   displaying the first screen when a fifth preset operation is in the second screen function area, wherein the first screen comprises a fourth application screen corresponding to the first control and a sixth screen corresponding to the second screen; or
   displaying the first screen when a sixth preset operation is in the third screen function area, wherein the first screen comprises a fifth application screen corresponding to the second control and a seventh screen corresponding to the third screen.

8. The display control method of claim 1, further comprising
   displaying a tenth screen corresponding to a second response event corresponding to the seventh preset operation in response to the second response event existing on the third screen and the first response event does not exist on the second screen, wherein the tenth screen corresponds to the second control, and wherein the tenth screen comprises a seventh application screen corresponding to the second control and an eleventh screen corresponding to the third screen.

9. An electronic device, comprising:
   a processor; and
   a memory coupled to the processor and configured to store instructions that, when executed by the processor, cause the electronic device to be configured to:
   display a lock screen comprising a first control, wherein the lock screen does not comprise a second control;
   verify head information;
   change from the lock screen to an unlock screen in response to verifying the head information, wherein the unlock screen comprises a superpositioned display of a second screen and a third screen and a second screen function area, wherein the second screen comprises the first control and does not comprise the second control, and wherein the third screen comprises the second control and does not comprise the first control;

display a first screen on the unlock screen when a preset condition is met, wherein the first screen does not comprise the first control, wherein the first screen comprises the second control, the first screen corresponds to the first control, or the first screen corresponds to the second control, wherein displaying a first screen on the unlock screen when a preset condition is met, wherein the first screen does not comprise the first control, wherein the first screen comprises the second control, wherein the first screen corresponds to the first control, or wherein the first screen corresponds to the second control comprises:

displaying an eighth screen corresponding to a first response event in response to a seventh preset operation on the unlock screen and when the first response event exists on the second screen, wherein the eighth screen corresponds to the first control and comprises a sixth application screen corresponding to the first control and a ninth screen corresponding to the second screen.

10. A computer program product comprising computer-executable instructions for storage on a non-transitory computer-readable medium that, when executed by a processor, cause an information processing apparatus to:

display a lock screen comprising a first control;
verify head information;
display an unlock screen in response to verifying the head information, wherein the unlock screen comprises a superpositioned display of a second screen and a third screen and a second screen function area, wherein the second screen comprises the first control and does not comprise a second control, and wherein the third screen comprises the second control and does not comprise the first control; and
display a first screen on the unlock screen when a preset condition is met,
wherein displaying a first screen on the unlock screen when a preset condition is met, wherein the first screen does not comprise the first control, wherein the first screen comprises the second control, wherein the first screen corresponds to the first control, or wherein the first screen corresponds to the second control comprises:
displaying an eighth screen corresponding to a first response event in response to a seventh preset operation on the unlock screen and when the first response event exists on the second screen, wherein the eighth screen corresponds to the first control and comprises a sixth application screen corresponding to the first control and a ninth screen corresponding to the second screen.

11. The electronic device of claim 9, wherein the second screen is the lock screen.

12. The electronic device of claim 9, wherein the third screen comprises a desktop, a first application screen opened before screen locking, a shortcut screen, or a desktop assistant.

13. The electronic device of claim 9, wherein the first screen is the third screen, and wherein the preset condition comprises at least one of:
a floating event is detected;
a time difference between a current moment and a moment at which the head information is recognized is greater than or equal to preset duration; the head information is continuously detected within a first preset duration after the head information is recognized;
an included angle between the electronic device and a horizontal plane is greater than or equal to a preset angle value;
a preset expression is detected; a preset head action is detected; or
a preset voice indication is detected.

14. The electronic device of claim 9, wherein the instructions further cause the electronic device to be configured to:
display the first screen in response to the first screen corresponding to the first control and detecting a first preset operation on the first control; or
display the first screen in response to the first screen corresponding to the second control and detecting a second preset operation on the second control.

15. The electronic device of claim 9, wherein the instructions further cause the electronic device to be configured to
display the first screen when a fourth preset operation is in another area, wherein the first screen comprises a third application screen corresponding to the second control and a fifth screen corresponding to the third screen.

16. The electronic device of claim 9, wherein the unlock screen comprises a third screen function area, wherein the instructions further cause the electronic device to be configured to:
display the first screen in response to the first screen corresponds to the first control and a fifth preset operation is in the second screen function area, wherein the first screen comprises a fourth application screen corresponding to the first control and a sixth screen corresponding to the second screen; or
display the first screen in response to the first screen corresponds to the second control and a sixth preset operation is in the third screen function area, wherein the first screen comprises a fifth application screen corresponding to the second control and a seventh screen corresponding to the third screen.

17. The electronic device of claim 9, wherein the instructions further cause the electronic device to be configured to
display a tenth screen corresponding to a second response event corresponding to the seventh preset operation in response to the second response event existing on the third screen and the first response event does not exist on the second screen, wherein the tenth screen corresponds to the second control and comprises a seventh application screen corresponding to the second control and an eleventh screen corresponding to the third screen.

18. The display control method of claim 1, further comprising displaying the first screen when detecting a second preset operation on the second control.

19. The computer program product of claim 10 wherein the computer-executable instructions, when executed by a processor, further cause the information processing apparatus to display the first screen when a fourth preset operation is in another area, wherein the first screen comprises a third application screen corresponding to the second control and a fifth screen corresponding to the third screen.

20. The computer program product of claim 10 wherein the computer-executable instructions, when executed by a processor, further cause the information processing apparatus to:
display the first screen in response to the first screen corresponds to the first control and a fifth preset operation is in the second screen function area, wherein the first screen comprises a fourth application screen corresponding to the first control and a sixth screen corresponding to the second screen; or display the first screen in response to the first screen corresponds to the second control and a sixth preset operation is in the third screen function area, wherein the first screen comprises a fifth application screen corresponding to the second control and a seventh screen corresponding to the third screen.

\* \* \* \* \*

UNITED STATES PATENT AND TRADEMARK OFFICE
CERTIFICATE OF CORRECTION

| | | |
|---|---|---|
| PATENT NO. | : 11,567,637 B2 | |
| APPLICATION NO. | : 17/041885 | |
| DATED | : January 31, 2023 | |
| INVENTOR(S) | : Jie Xu | |

It is certified that error appears in the above-identified patent and that said Letters Patent is hereby corrected as shown below:

In the Claims

Claim 12, Column 35, Line 56: "locking, a shortcut screen, or" should read "locking or"

Signed and Sealed this
Twenty-first Day of March, 2023

*Katherine Kelly Vidal*

Katherine Kelly Vidal
*Director of the United States Patent and Trademark Office*